(12) United States Patent
Bai et al.

(10) Patent No.: US 10,270,936 B2
(45) Date of Patent: *Apr. 23, 2019

(54) ENCODING SIGNALS IN COLOR DESIGNS FOR PHYSICAL OBJECTS

(71) Applicant: Digimarc Corporation, Beaverton, OR (US)

(72) Inventors: Yang Bai, Beaverton, OR (US); Kristyn R. Falkenstern, Portland, OR (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,878

(22) Filed: May 25, 2017

(65) Prior Publication Data

US 2017/0331976 A1 Nov. 16, 2017

Related U.S. Application Data

(63) Continuation of application No. 14/932,645, filed on Nov. 4, 2015, now Pat. No. 9,667,829, which is a continuation-in-part of application No. 14/616,686, filed on Feb. 7, 2015, now Pat. No. 9,380,186.

(60) Provisional application No. 62/164,479, filed on May 20, 2015, provisional application No. 62/102,247, filed on Jan. 12, 2015, provisional application No.
(Continued)

(51) Int. Cl.
| | |
|---|---|
| *G06K 9/00* | (2006.01) |
| *H04N 1/32* | (2006.01) |
| *G06T 1/00* | (2006.01) |
| *H04N 1/60* | (2006.01) |

(Continued)

(52) U.S. Cl.
CPC ........ *H04N 1/32309* (2013.01); *G06T 1/005* (2013.01); *G06T 1/0028* (2013.01); *H04N 1/32229* (2013.01); *H04N 1/32251* (2013.01); *H04N 1/32267* (2013.01); *H04N 1/54* (2013.01); *H04N 1/60* (2013.01); *H04N 1/6008* (2013.01); *H04N 1/6013* (2013.01); *H04N 1/622* (2013.01); *H04N 1/628* (2013.01);
(Continued)

(58) Field of Classification Search
None
See application file for complete search history.

(56) References Cited

U.S. PATENT DOCUMENTS

| | | |
|---|---|---|
| 5,394,483 A | 2/1995 | Daly |
| 5,636,292 A | 6/1997 | Rhoads |

(Continued)

FOREIGN PATENT DOCUMENTS

WO   WO2016025631   2/2016

OTHER PUBLICATIONS

U.S. Appl. No. 14/932,645, filed Nov. 4, 2015.
(Continued)

*Primary Examiner* — Tahmina N Ansari
(74) *Attorney, Agent, or Firm* — Digimarc Corporation

(57) ABSTRACT

The present disclosure relates generally to encoding signals for spot colors. In one implementation a substitute spot color+CMY tint is selected to replace an original spot color. The CMY tint can be transformed to carry an encoded signal. Of course, other features, combinations and technology are described herein.

25 Claims, 27 Drawing Sheets
(20 of 27 Drawing Sheet(s) Filed in Color)

Related U.S. Application Data

62/063,790, filed on Oct. 14, 2014, provisional application No. 62/063,360, filed on Oct. 13, 2014, provisional application No. 62/036,444, filed on Aug. 12, 2014.

(51) Int. Cl.
*H04N 1/62* (2006.01)
*H04N 1/54* (2006.01)

(52) U.S. Cl.
CPC ............... *G06T 2201/0051* (2013.01); *G06T 2201/0202* (2013.01)

(56) References Cited

U.S. PATENT DOCUMENTS

| | | |
|---|---|---|
| 5,721,788 A | 2/1998 | Powell |
| 5,862,260 A | 1/1999 | Rhoads |
| 5,905,819 A | 5/1999 | Daly |
| 6,122,403 A | 9/2000 | Rhoads |
| 6,130,741 A | 10/2000 | Wen |
| 6,157,735 A * | 12/2000 | Holub .................. G01J 3/50 348/E17.004 |
| 6,345,104 B1 | 2/2002 | Rhoads |
| 6,408,082 B1 | 6/2002 | Rhoads et al. |
| 6,449,377 B1 | 9/2002 | Rhoads |
| 6,559,975 B1 | 5/2003 | Tolmer et al. |
| 6,590,996 B1 | 7/2003 | Reed et al. |
| 6,614,914 B1 | 9/2003 | Rhoads et al. |
| 6,631,198 B1 | 10/2003 | Hannigan et al. |
| 6,718,046 B2 | 4/2004 | Reed et al. |
| 6,721,439 B1 | 4/2004 | Levy et al. |
| 6,763,123 B2 | 7/2004 | Reed et al. |
| 6,763,124 B2 * | 7/2004 | Alattar .................. G06Q 40/04 375/E7.018 |
| 6,792,129 B1 | 9/2004 | Zeng |
| 6,885,757 B2 | 4/2005 | Bloom |
| 6,891,959 B2 | 5/2005 | Reed et al. |
| 6,912,295 B2 | 6/2005 | Reed et al. |
| 6,947,571 B1 | 9/2005 | Rhoads et al. |
| 6,993,149 B2 * | 1/2006 | Brunk .................. G06K 15/02 382/100 |
| 7,027,614 B2 | 4/2006 | Reed |
| 7,070,252 B2 | 7/2006 | DeQueiroz et al. |
| 7,298,865 B2 | 11/2007 | Lubin |
| 7,352,878 B2 | 4/2008 | Reed et al. |
| 7,783,130 B2 | 8/2010 | Watson |
| 8,094,869 B2 * | 1/2012 | Reed .................. G06T 1/0042 382/100 |
| 8,199,969 B2 | 6/2012 | Reed |
| 8,310,718 B2 | 11/2012 | Chapman |
| 8,422,795 B2 | 4/2013 | Pahalawatta |
| 8,437,403 B2 | 5/2013 | Babonneau |
| 8,743,158 B2 * | 6/2014 | Kang .................. G09G 3/3413 345/690 |
| 8,913,780 B2 | 12/2014 | Reed |
| 8,971,567 B2 | 3/2015 | Reed |
| 9,129,277 B2 | 9/2015 | MacIntosh |
| 9,136,300 B2 | 9/2015 | Rhoads |
| 9,179,033 B2 | 11/2015 | Reed et al. |
| 9,224,184 B2 | 12/2015 | Bai |
| 9,245,308 B2 | 1/2016 | Reed |
| 9,380,186 B2 * | 6/2016 | Reed .................. H04N 1/32309 |
| 9,401,001 B2 | 7/2016 | Reed et al. |
| 9,449,357 B1 | 9/2016 | Lyons et al. |
| 9,565,335 B2 | 2/2017 | Reed |
| 9,665,919 B2 | 5/2017 | Reed |
| 9,667,829 B2 * | 5/2017 | Bai .................. H04N 1/54 |
| 9,747,656 B2 | 8/2017 | Stach |
| 9,754,341 B2 | 9/2017 | Falkenstern |
| 9,805,435 B2 | 10/2017 | Reed |
| 9,864,919 B2 | 1/2018 | Reed |
| 2002/0126872 A1 | 9/2002 | Brunk |
| 2003/0058477 A1 | 3/2003 | Brunk |
| 2003/0189568 A1 * | 10/2003 | Alkouh .................. G06T 15/50 345/422 |
| 2005/0114667 A1 | 5/2005 | Haas |
| 2006/0072778 A1 | 4/2006 | Harrington |
| 2006/0165311 A1 | 7/2006 | Watson |
| 2008/0149713 A1 | 6/2008 | Brundage |
| 2009/0135013 A1 | 5/2009 | Kushida |
| 2010/0150434 A1 | 6/2010 | Reed |
| 2012/0014557 A1 | 1/2012 | Reed et al. |
| 2013/0289941 A1 | 10/2013 | Keydar |
| 2013/0329006 A1 * | 12/2013 | Boles .................. H04N 1/40056 348/42 |
| 2013/0335783 A1 | 12/2013 | Kurtz |
| 2014/0119593 A1 | 5/2014 | Filler |
| 2014/0240533 A1 * | 8/2014 | Hirooka .................. H04N 9/646 348/223.1 |
| 2015/0156369 A1 * | 6/2015 | Reed .................. H04N 1/32309 382/100 |
| 2015/0187039 A1 | 7/2015 | Reed et al. |
| 2016/0198064 A1 * | 7/2016 | Bai .................. H04N 1/54 382/100 |

OTHER PUBLICATIONS

U.S. Appl. No. 62/102,247, filed Jan. 12, 2015.
Written Opinion of the International Searching Authority dated Nov. 25, 2015 from PCT/US2015/044904 (application published as WO 2016/025631 A1).
International Search Report dated Nov. 25, 2015 from PCT/US2015/044904 (application published as WO 2016/025631 A1).
Wyble et al., "A critical review of spectral models applied to binary color printing," Color Research & Application, 25(1):4-19, 2000.
Scott J. Daly, "Visible differences predictor: an algorithm for the assessment of image fidelity", Proc. SPIE 1666, Human Vision, Visual Processing, and Digital Display III, 2 (Aug. 27, 1992).
X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif, USA, Jun. 1996.
Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
Reed et al., "Full-color visibility model using CSF which varies spatially with local luminance." In Q. Lin, J. P. Allebach, and Z. Fan, editors, Proceedings SPIE 9027, Imaging and Multimedia Analytics in a Web and Mobile World 2014, vol. 9027, 2014.
A. Wächter and L. T. Biegler, "On the implementation of a primal-dual interior point filter line search algorithm for large-scale nonlinear programming." Mathematical Programming, vol. 106, issue (1): pp. 25-57, 2006.
Fleet et al., "Embedding Invisible Information in Color Images," Proc. Int. Conf. on Image Processing, vol. 1, pp. 532-535, Oct. 1997.
Reed et al, "Adaptive Color Watermarking," Proc. SPIE, vol. 4675, pp. 222-229, 8 pages, Jan. 21, 2002.
Vidal, "Non-Noticeable Information Embedding in Color Images: Marking and Detection," 1999 IEEE, pp. 293-297.
Piva et al., "Exploiting the Cross-Correlation of RGB-Channels for Robust Watermarking of Color Images," 1999 IEEE, pp. 306-310.
Battialo et al., "Robust Watermarking for Images Based on Color Manipulation," IH/99 LNCS 1768, pp. 302-317, 2000.
Deshpande, K. and Green, P. "A simplified method of predicting the colorimetry of spot color overprints," 18th Color Imaging Conference: Color Science and Engineering Systems, Technologies and Applications, p. 213-216, San Antonio, USA 2010.
A. B. Watson, J. Hu, and J.F. McGowan III, "Digital Video Quality Metric Based on Human Vision," Journal of Electronic Imaging, vol. 10, No. 1, pp. 20-29 (2001).
Daly, 'Application of a Noise-Adaptive Contrast Sensitivity Function to Image Data Compression,' Optical Engineering, Aug. 1990, vol. 29. No. 8, pp. 977-987.

(56) References Cited

OTHER PUBLICATIONS

Feb. 1, 2016 Non-final Action, dated Feb. 12, 2016 Amendment, dated Mar. 4, 2016 Notice of Allowance, dated May 20, 2016 Amendment after Notice of Allowance and Applicant Summary of interview with Examiner, all from parent U.S. Pat. No. 9,401,001.
G.J. van der Horst and M.A. Bouman, 'Spatiotemporal chromaticity discrimination', Journal of Optical Society of America, 59, 1969. (7 pages).
International Preliminary Report on Patentability Chapter I, dated Feb. 14, 2017, from PCT/US2015/044904 (application published as WO 2016/025631 AI).
International Search Report and Written Opinion dated Nov. 25, 2015 from PCT/US2015/044904 (published as WO 2016025631 AI).
Jan. 4, 2016 Amendment and Dec. 30, 2015 non-final Action, each from assignee's U.S. Appl. No. 14/616,686 (now U.S. Pat. No. 9,380,186).
L. van Nes and M.A. Bouman, 'Spatial modulation transfer in the human eye', Journal of Optical Society of America, 57(3):401-406, Mar. 1967. (6 pages).
R. Lyons et al, 'Geometric enumerated chrominance watermark for spot colors,' In Q. Lin, J.P. Alleback and Z. Fan, editors, Proceedings SPIE 8664, Imaging and Printing in a Web 2.0 World IV, vol. 8664, Mar. 2013.
Reed et al., 'Watermarking Spot Colors in Packaging,' Media Watermarking, Security and Forensics 2015, edited by Adnan M. Alattar, Nasir D. Memon, Chad D. Heitzenrater, Proc. of SPIE—IS&T vol. 9409, 940906.
U.S. Appl. No. 13/975,919, filed Aug. 26, 2013.
U.S. Appl. No. 61/923,060, filed Jan. 2, 2014.
WO 2016025631 AI, published Feb. 18, 2016.
EP3164849, which is the EP National Stage of PCT/US2015044904, Extract from the Register of European Patents, including Search Results. Printed Jun. 14, 2018.
Amended Claim Set in EP3164849, appln. No. 15832448.3, which is the EP National Stage of PCT/US2015044904.
Written Opinion of the International Search Authority, dated Feb. 18, 2016 from PCT/US2015/044904 (application published as WO 2016/025631 AI).
Applicant Response dated Aug. 24, 2018 in response to the European search report and communication dated Feb. 2018, in EP3164849, appln. No. 15832448.3, which is the EP National Stage of PCT/US2015044904.
Extended European Search Report in EP3164849, which is the EP National Stage of PCT/US2015044904. dated Feb. 2, 2018.
Amended claims accompanying Applicant Response dated Aug. 24, 2018, in response to the European search report and communication dated Feb. 2018, in EP3164849, appln. No. 15832448.3, which is the EP National Stage of PCT/US2015044904.

* cited by examiner

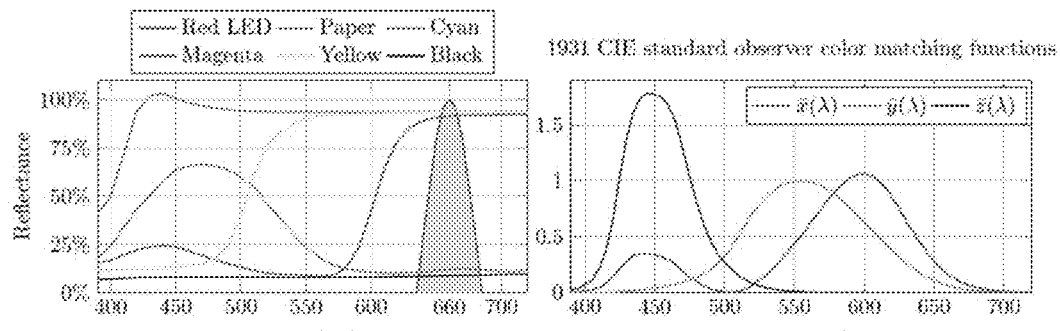
FIG. 1a
FIG. 1b
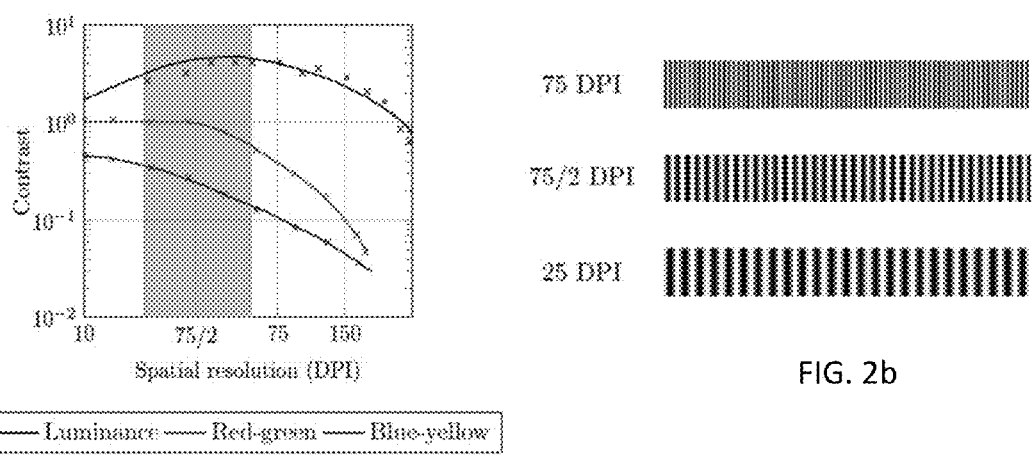
FIG. 2a
FIG. 2b

Fig. 5a  Fig. 5b  Fig. 5c
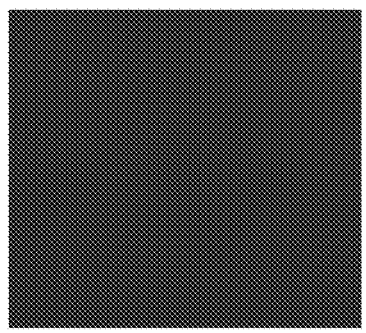 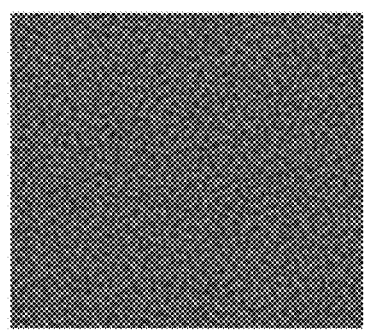 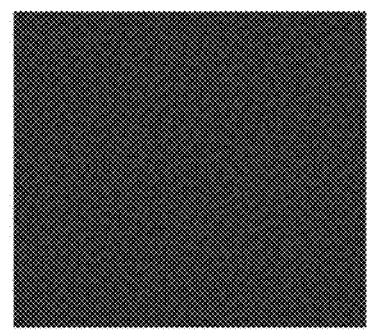
max min  max min
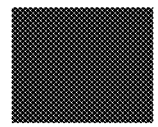 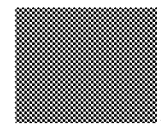  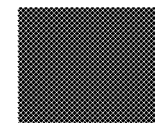 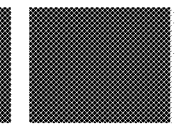
Fig. 5d  Fig. 5e
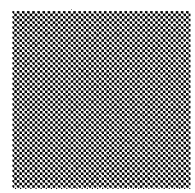  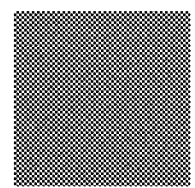
Fig. 6a  Fig. 6b

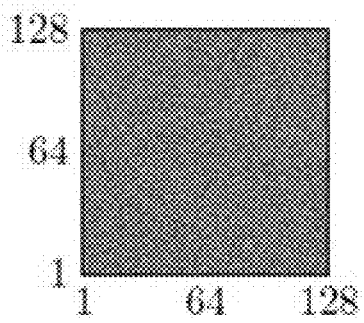
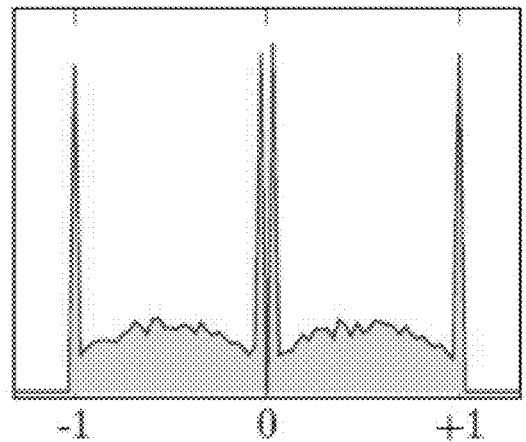
Fig. 8a　　　　　　　　　　Fig. 8b
Mid-gray CMY patch
Chrominance watermark　　　　Cyan only
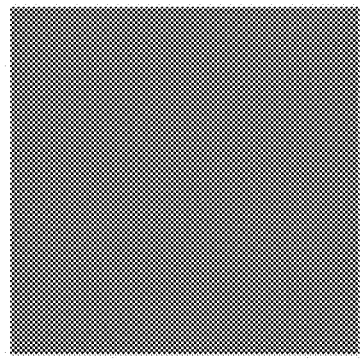
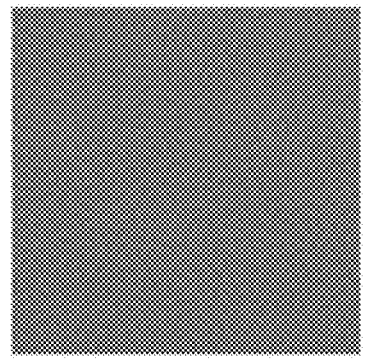
Fig. 9

Compressed white – 4%C 2%M 2%Y
Chrominance watermark 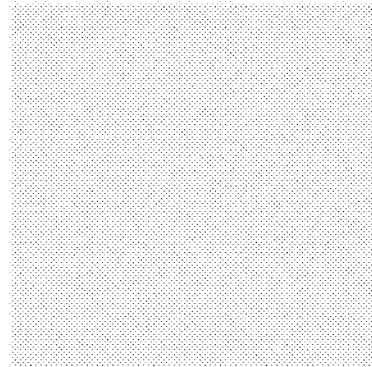 Cyan only 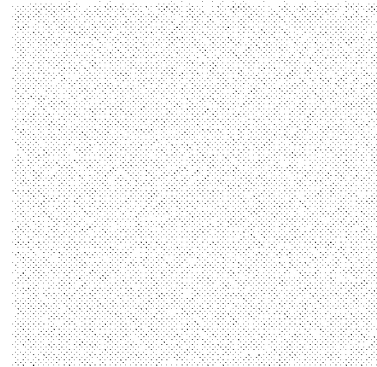
Fig. 10

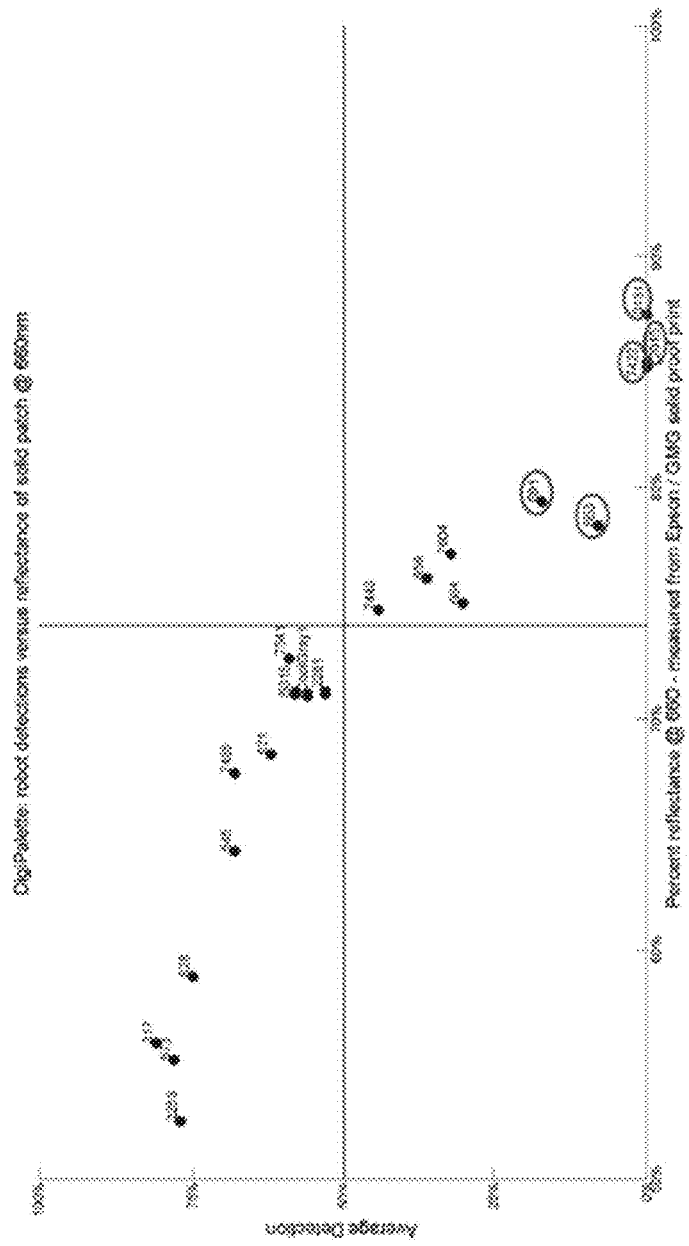

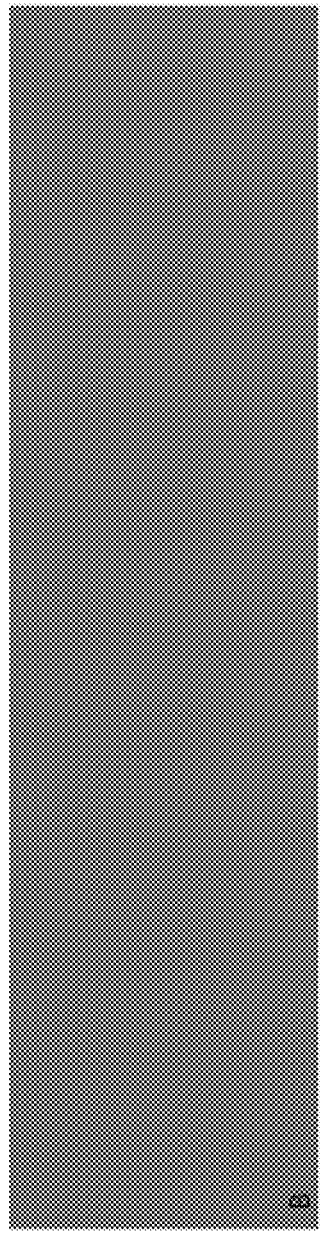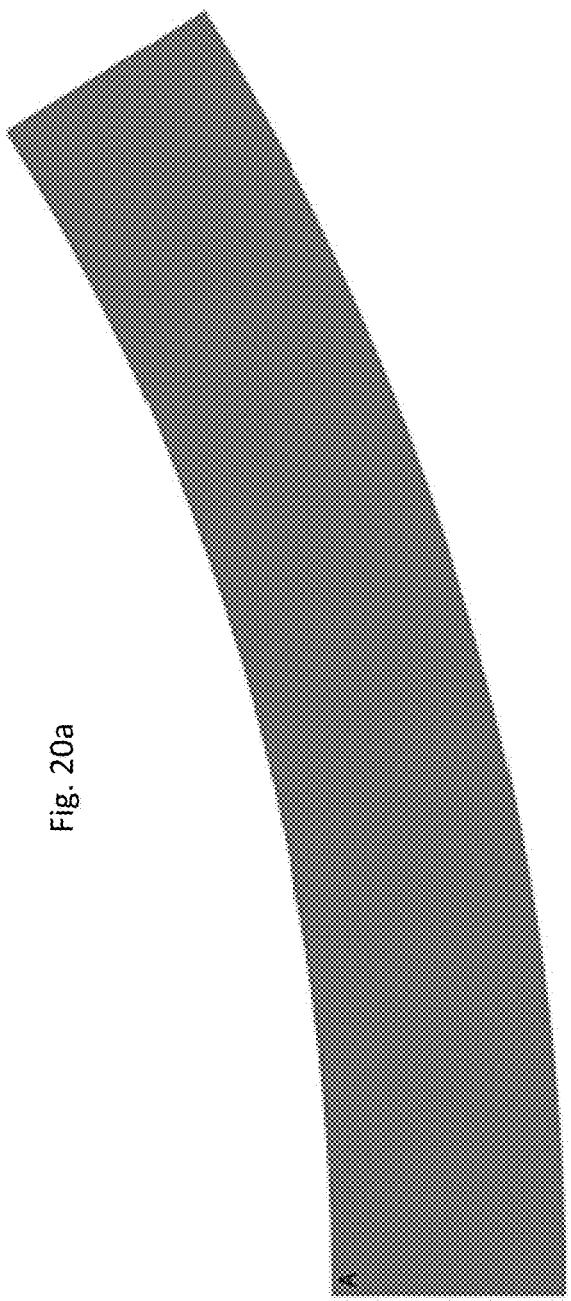
Fig. 20a

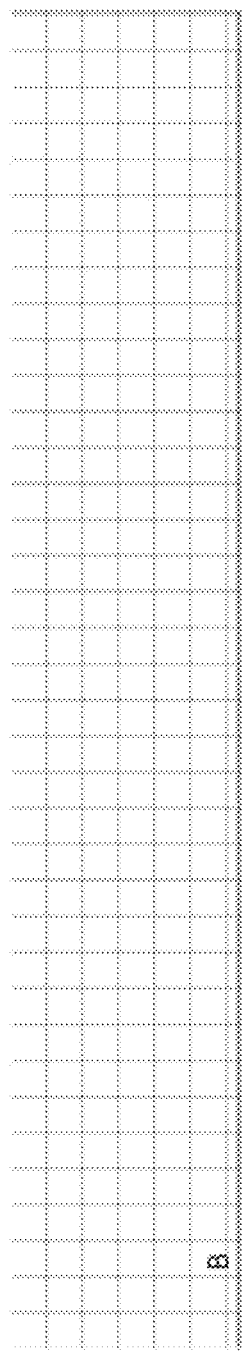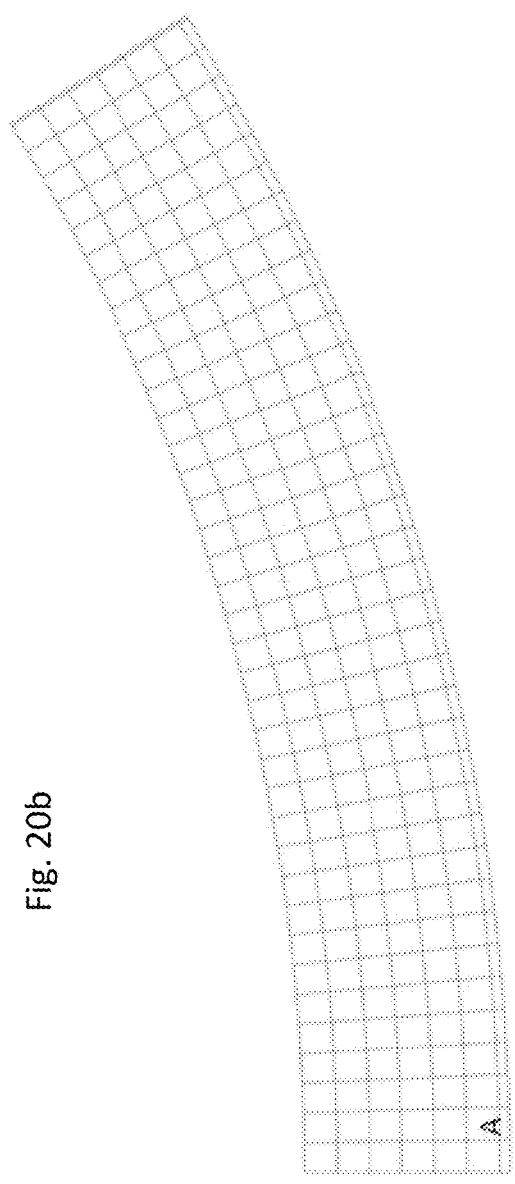
Fig. 20b

Fig. 24

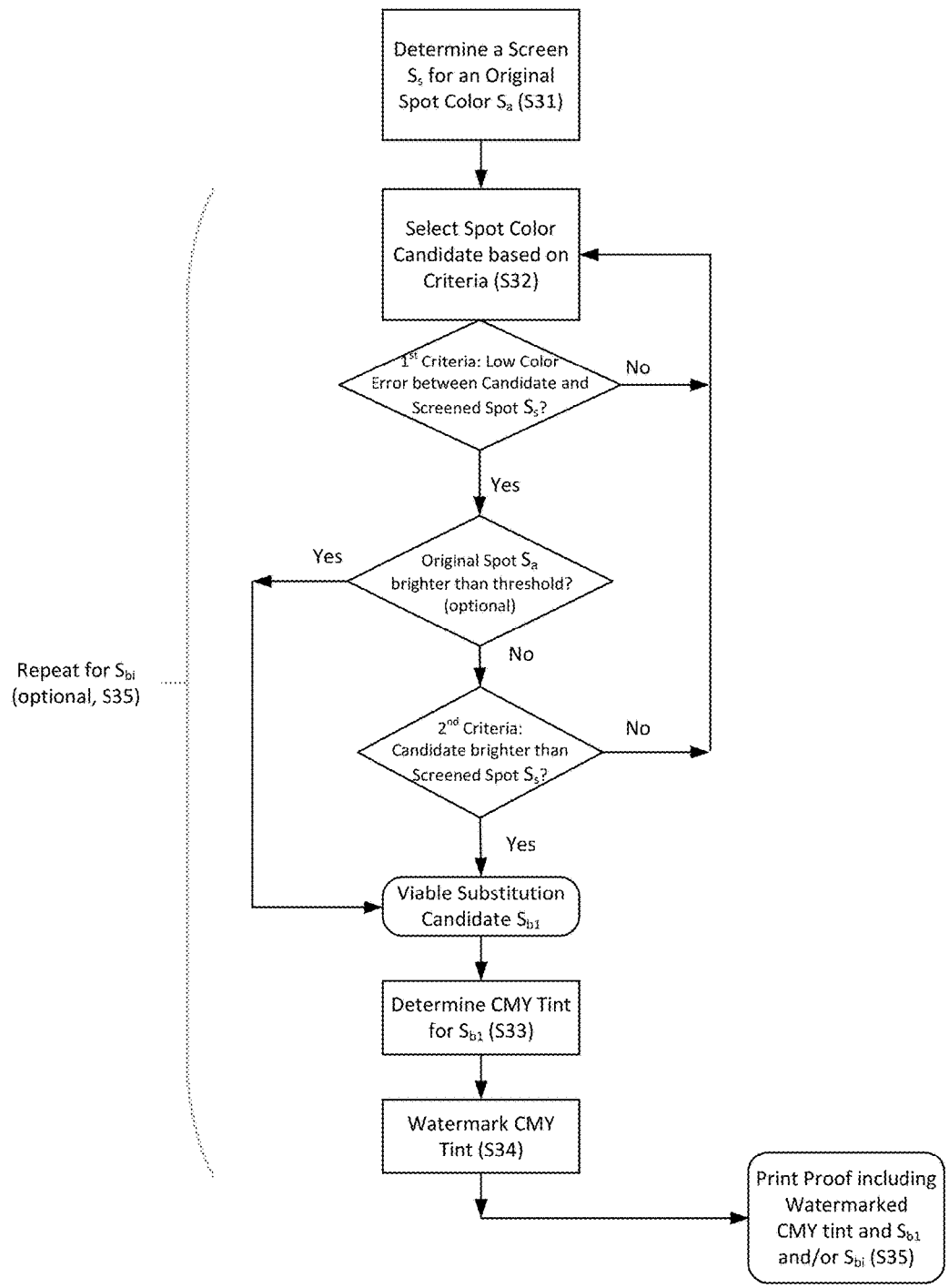

ENCODING SIGNALS IN COLOR DESIGNS FOR PHYSICAL OBJECTS

RELATED APPLICATION DATA

This application is a continuation of U.S. patent application Ser. No. 14/932,645, filed Nov. 4, 2015 (U.S. Pat. No. 9,667,829), which claims the benefit of U.S. Provisional Patent Application No. 62/164,479, filed May 20, 2015, which are each hereby incorporated herein by reference in its entirety. This Ser. No. 14/932,645 application is also a continuation in part of U.S. patent application Ser. No. 14/616,686, filed Feb. 7, 2015 (U.S. Pat. No. 9,380,186), which claims the benefit of U.S. Patent Application Nos. 62/102,247, filed Jan. 12, 2015, 62/063,790, filed Oct. 14, 2014, 62/063,360, filed Oct. 13, 2014, and 62/036,444, filed Aug. 12, 2014. Each of the above patent documents is hereby incorporated herein by reference in its entirety.

This application is related to International Patent Application No. PCT/US15/44904 filed Aug. 12, 2015 (published as WO 2016/025631), which are each hereby incorporated herein by reference in its entirety.

This application is also related to U.S. patent application Ser. No. 14/588,636, filed Jan. 2, 2015 (published as US 2015-0187039 A1, issued as U.S. Pat. No. 9,401,001), which claims the benefit of U.S. Provisional application No. 61/923,060, filed Jan. 2, 2014. This application is also related to U.S. patent application Ser. No. 13/975,919, filed Aug. 26, 2013 (U.S. Pat. No. 9,449,357), which claims the benefit of US Provisional Application Nos. 61/749,767, filed Jan. 7, 2013 and 61/693,106, filed Aug. 24, 2012. This application is also related to US Provisional Patent Application Nos. 62/152,745, filed Apr. 24, 2015, and 62/136,146, filed Mar. 20, 2015. This application is also related to U.S. Pat. No. 8,199,969, US Published Patent Application Nos. US 2010-0150434 A1 and US 2013-0329006 A1; and US Provisional Application Nos. 62/106,685, filed Jan. 22, 2015, 62/102,547, filed Jan. 12, 2015, 61/693,106, filed Aug. 24, 2012, 61/716,591, filed Oct. 21, 2012, and 61/719,920, filed Oct. 29, 2012. Each of the above patent documents is hereby incorporated herein by reference in its entirety.

Each of the above patent documents is hereby incorporated herein by reference in its entirety. Such incorporation by reference, and all following incorporations by reference, are intended to incorporate the entire application including the entire specification, all drawings and any appendices, even if a patent document is only discussed with respect to a specific portion thereof.

TECHNICAL FIELD

The present disclosure relates generally to color science technology, printing technology, data hiding, color visibility models and digital watermarking, particularly for product packaging and other printed objects.

BACKGROUND AND SUMMARY

The term "steganography" generally implies data hiding. One form of data hiding includes digital watermarking. For purposes of this disclosure, the terms "digital watermark," "watermark" and "data hiding" are used interchangeably. We sometimes use the terms "embedding," "embed," and "data hiding" (and variants thereof) to mean modulating or transforming data representing imagery or video to include information therein. For example, data hiding may seek to hide or embed an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. One way to modulate a host signal, as described in detail herein, is to overprint a first color with additional colors. The additional colors may carry or represent the information signal. We use the terms "decode," "detect," and "read" (and variants thereof) interchangeably to mean detecting or recovering an embedded digital watermark.

Some of the present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. No. 6,449,377 and U.S. Pat. No. 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

This disclosure focuses on data hiding with printed colors, e.g., embedding information signals in so-called spot colors and process colors. Of course, our techniques, methods and systems will be useful for other color schemes as well, e.g., digital printing.

Spot colors may include premixed inks for use instead of or in addition to process color inks. In many print environments, each spot color ink typically uses its own printing plate on a print press. Spot colors can be used instead of or in addition to process colors for better color accuracy, better color consistency, and colors outside of process ink gamut and for technologies which are prone to specific printing errors. A common spot color system is PANTONE (http://www.pantone.com/). The PANTONE system defines several hundred different inks.

Process colors can be printed using a combination of four standard process inks: Cyan, Magenta, Yellow and Black (CMYK). Considering that every color used in some printing presses uses its own plate, it is highly impractical to print using every color in a design. Process color printing was developed, in part, to address this impracticality, since most colors can be accurately approximated with a combination of these four process colors, CMYK. To create a process color which includes multiple inks, overprinting can be used.

Similar to CMYK, it is usually possible to print a percentage of a given spot color. We refer to printing less than 100% of a spot color as "screening" (or "a screen") the spot color or as a "spot color tint". There are sometimes advantages to using process color equivalent tint. The process color equivalent tint can be a combination of CMYK percentages which produce an approximation color for an original spot color or spot color tint. Process colors can be printed with, e.g., half tone dots.

Overprinting is the process of printing one or more colors on top of another in the reproduction of a design. Because of physical differences between inks and substrate, the result of printing directly onto the substrate versus onto another ink may differ and can be considered in a print run. In some situations, it is necessary to print the desired color using a single ink or a spot color.

Various materials and techniques can be used in the printing process which can be considered for data hiding for spot colors and process colors, these materials include:

substrate, process colors, overprinting, spot colors, spot tint (screening) and process equivalent tints. In printing, the term "substrate" refers to a base material which a design is printed onto. Most often, a substrate comprises paper which can be a variety of weights and finishes. Other common substrates in commercial printing include films, plastics, laminated plastics and foils.

Some color science background along with our improvements and additions are provided, below.

The color of an object is often the result of an interaction between a light source, an object and a detector (e.g., the human visual system). Other detectors include point of sale captured systems, mobile phone cameras, barcode readers, etc.

Light is radiation which can be seen, in the wavelength range of about 380 to 780 nm.

Spectral reflectance can be used to describe how an object interacts with light. When reflected light is detected and interpreted through the human visual system it results in an object having a particular color. The most common way to capture spectral data with a device is by using a spectrophotometer.

FIG. 1(a) shows spectral reflectance of PANTONE process color inks as measured using an i1Pro spectrophotometer, from X-Rite Corporation, headquartered in Grand Rapids, Mich., USA. FIG. 1(a) also shows spectrum emitted by red LED illumination at or around 660 nm. FIG. 1(b) shows 931 CIE 2° standard observer matching functions used for converting spectral reflectance to CIE XYZ color space.

Often color is described by artists and designers in terms of mixing paint or inks. An artist often starts with white paper, which reflects most of the light. Different colored pigments are applied on top of the paper, which reduce the amount of light reflected back. Current trends for printing describe subtractive four color mixing using process color combinations of CMYK. Yellow, for instance, reflects most of the light, it absorbs only the lower wavelengths.

In 1931, the CIE (Commission Internationale de l'Eclairage) developed a way to link between wavelengths in the visible spectrum and colors which are perceived by the human visual system. The models which the CIE developed made it possible to transform color information between physical responses to reflectance in color inks, illuminated displays, and capture devices such as digital cameras into a perceptually (nearly) uniform color space. The CIE XYZ color space was derived by multiplying the color matching functions† with the spectral power of the illuminant and the reflectance of an object, which results in a set of XYZ tristimulus values for a given sample. Within the CIE model, CIE Y describes the luminance or perceived brightness. While the CIE X and CIE Z plane contain the chromaticities, which describes the color regardless of luminance.

Chromaticity can be described by two parameters, hue and colorfulness. Hue or hue angle, describes the perceived color name, such as: red, green, yellow and blue. Colorfulness is the attribute which describes a color as having more or less of its hue. A color with 0 colorfulness would be neutral. The CIE took the CIE XYZ space to propose a pseudo-uniform color space, where calculated differences are proportional to perceptual differences between two color stimuli, formally referred to as the CIE 1976 L* a* b* (CIELAB) color space. The L* coordinate represents the perceived lightness, an L* value of 0 indicates black and a value of 100 indicates white. The CIE a* coordinate position goes between "redness" (positive) and "greenness" (negative), while the CIE b* goes between "yellowness" (positive) and "blueness" (negative).

To describe how perceptually similar two colors are, the CIE developed a color difference model, CIE $\Delta E_{76}$. The first model developed was simply the Euclidean distance in CIELAB between two color samples. Since then, other more complex models have been developed to address some of the non-uniformity within the CIELAB Color-space, most notably the sensitivity to neutral or near neutral colors.

The CIELAB color difference metric is appropriate for measuring the color difference of a large uniform color region, however, the model does not consider the spatial-color sensitivity of the human eye. The luminance and chrominance CSF (Contrast Sensitivity Function) of the human visual system has been measured for various retinal illumination levels. The luminance CSF variation was measured by van Nes and Bouman (1967) and the chrominance CSF variation by van der Horst and Bouman (1969) and the curves are plotted in FIG. 2a for a single typical illumination level. See, e.g., Johnson et al, "Darwinism of Color Image Difference Models," Proc. of IS&T/SID, 9th Color Imaging Conference, November 2001, p. 108-11, for an additional discussion of CSFs. The Johnson et al. document is hereby incorporated herein by reference in its entirety.

A digital watermark may contain signal energy, e.g., over the spatial resolutions shown by the gray box in FIG. 2a. If the luminance and chrominance contrast sensitivity functions are integrated over this gray box region, the resultant energy ratios calculate the uniform perceptual scaling for CIELAB L*, a* and b*. Thus the watermark perceptual error $\Delta E_{WM}$ can be calculated as:

$$\Delta E_{WM} = (\Delta L^2 + (\Delta a/8)^2 + (\Delta b/10)^2)^{1/2}, \quad (1)$$

where $\Delta L$ is the luminance variation and $\Delta a$ and $\Delta b$ the two chrominance variations introduced by a watermark.

Ink overprint models predict final color obtained by overprinting several inks on a specific press and substrate. These models can be used digital watermark embedding algorithm to predict (1) color of the overprint for visibility evaluation, and (2) color of the overprint as seen by the imaging device for signal robustness evaluation. Ink overprint models can be obtained in practice by combining two main factors (1) set of measured color patches printed on a real press, and (2) mathematical model interpolating the measured values while making some simplifying assumptions. One model can be obtained by measuring a set of color patches obtained by sampling the space of all possible ink combinations, possibly printed multiple times and averaged. For example, for k inks and n steps of each ink, $n^k$ color patches would have to be printed and measured. This process, known as press profiling or press fingerprinting, is often used with process inks, where a few thousand patches are used to characterize the press. Measured values are then interpolated and assembled into k-dimensional look-up table which is further consumed by software tools. ICC profiles are standardized and industry-accepted form of such look-up tables converting k ink percentages into either CIE XYZ or CIELAB space. For process inks, 4-channel CMYK profiles are standardized to maintain consistency between different printers. For example, the GRACoL ("General Requirements for Applications in Commercial Offset Lithography") specification includes CMYK ICC profiles recommended for commercial offset lithography. Unfortunately, full color spectral data is often not available as standardization is still in progress. This methodology quickly becomes impractical as spot colors are introduced due to exponential increase of the number of patches used to print and large number of spot colors available. A previous mathematical model for ink overprint was described by Neugebauer. For example, see, e.g., Wyble et al., "A critical review of spectral models applied to binary color printing," Color Research & Application, 25(1):4-19, 2000, which is hereby incorporated herein by reference in its entirety. The model expresses the spectral reflectance of a print as the sum of the reflectance of each combination of ink (called Neugebauer primaries) weighted by the relative proportion of the paper it occupies. For example, for spot ink S, Cyan, and Magenta, we have:

$$R(\lambda) = \alpha_o R_o(\lambda) + \alpha_s R_s(\lambda) + \alpha_o R_o(\lambda) + \alpha_M R_M(\lambda) + \alpha$$

$$R_{SC}(\lambda) + \alpha R_{SM}(\lambda) + \alpha R_{CM}(\lambda) + \alpha_{SCM} R_{SCM}(\lambda) \quad (2)$$

Where $R_o(\lambda)$, $R_c(\lambda)$, $R_{SC}(\lambda)$ is a reflectance of substrate, 100% Cyan ink, and overprint of 100% spot and Cyan all printed on substrate at wavelength $\lambda$, respectively. Other overprints, such as $R_{SCM}$, are similarly defined. Weights $\alpha$ satisfy Demichel equation $$\alpha_o = (1-\alpha_s)(1-\alpha_c)(1-\alpha_M) \quad \alpha_M = (1-\alpha_s)(1-\alpha_c)\alpha_M$$
$$\alpha_{CM} = (1-\alpha_s)\alpha_c \alpha_M$$

$$\alpha_S = \alpha_S(1-\alpha_C)(1-\alpha_M) \quad \alpha_{SC} = \alpha_S \alpha_C (1-\alpha_M)$$
$$\alpha_{SCM} = \alpha_S \alpha_C \alpha$$

$$\alpha_c = (1-\alpha_S)\alpha_C(1-\alpha_M) \quad \alpha_{SM} = \alpha_S(1-\alpha_o)\alpha_M \quad (3)$$

where $\alpha_S$, $\alpha_c$, $\alpha_M$ is spot, Cyan, Magenta ink percentage, respectively.

In order to use the Spectral Neugebauer model with k inks in practice, there is typically a reflectance of $2^k$ Neugebauer primary colors including the color of the substrate, 100% of each ink on its own on the substrate, and all 100% ink overprint combinations printed on substrate. Reflectance of substrate, and any overprint of process inks can be derived (or at least approximated) from CIE XYZ values obtained from ICC profile. Reflectance of 100% of the spot color can be measured or taken from an external source such as PANTONE Live (www.pantone.com/live). Reflectance of multiple spot color overprint or process and spot ink overprint may be either measured from a printed test patch or, for transparent inks, approximated using product of reflectances. For example, reflectance of Cyan and spot color overprint can be approximated by:

$$R_{SC}(\lambda) = R_0(\lambda) \frac{R_S(\lambda)}{R_0(\lambda)} \frac{R_C(\lambda)}{R_0(\lambda)}. \quad (4)$$

Reflectance of process inks overprint can either be derived from an ICC profile CIE XYZ value or approximated as a product of individual reflectances normalized for substrate reflectance based on the formula above. When inks are approximated by Eq. (4), we obtain:

$$R(\lambda) = R_0(\lambda) \prod_{i=1}^{k} \left(1 - \left(1 - \frac{R_i(\lambda)}{R_0(\lambda)}\right)\alpha_i\right). \quad (5)$$

Coefficients $\alpha_s$ in Spectral Neugebauer model are linear ink percentages before any dot gain correct ion. Demichel equation (3), linear ramp in $\alpha_i$ results in a linear change of reflectance and thus linear change of CIE XYZ. To correct for any single-ink non-linearity caused by the press (often called dot gain), we substitute $\alpha_i$ in the above model with gain corrected values $g_i^{-1}(\alpha_i)$. Function $g_i^{-1}$ inverts the dot-gain effect such that linear ramp in $\alpha_i$ leads back to linear increase of reflectance. Several patches of single screened ink can be used to estimate $g_i^{-1}$ for i-th ink.

Further combinations, aspects, features and description will become even more apparent with reference to the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1a is a diagram showing spectral reflectance of various PANTONE process inks as measured using an X-Rite i1Pro spectrophotometer. It also shows spectrum emitted by red LED at or around 660 nm.

FIG. 1b is a diagram showing a 1931 CIE 2° standard observer matching functions used for converting spectral reflectance to CIE XYZ color space.

FIG. 2a is a diagram showing a contrast sensitivity function of human eye (luminance, red-green, and glue-yellow), with plots of inverse of magnitude for luminance, red-green, and blue-yellow sine wave to become just noticeable to a human eye as a function of frequency.

FIG. 2b shows printing at different dots per inch (DPI).

FIG. 5a is an un-watermarked patch of spot color (PANTONE 221 C).

FIG. 5b is a watermarked version of the FIG. 5a patch, with modulating the spot color itself.

FIG. 5c is a watermarked version of the FIG. 5a patch, using CMY overprinting+a screened version of the FIG. 5a patch.

FIG. 5d shows min/max tweaks used to carry the watermark signal in FIG. 5b.

FIG. 5e shows min/max CMY overprint tweaks used to carry the watermark signal in FIG. 5c.

FIG. 6a shows a grayscale image as seen by a red LED scanner for the FIG. 5b patch; FIG. 6b shows a grayscale image as seen by a red LED scanner for the FIG. 5c patch.

FIG. 8a shows a grayscale representation of a watermark tile printed at 75 watermark pixels per inch; FIG. 8b shows a corresponding signal value histogram of the FIG. 8a tile.

FIG. 9 illustrates two (left and right) mid gray patches, with the left patch embedded using CMY tweaks, and the right patch using only Cyan tweaks.

FIG. 10 illustrates two tints that can be used for marking white, text based or open spaces. The left tint includes a cyan, magenta and yellow inks whereas the right patch only includes cyan.

FIG. 17 is a plot showing various colors and their reflectance percentages.

FIG. 18 is a color palette corresponding to the plot in FIG. 17.

FIG. 20a is a diagram showing warping for a design when packaged.

FIG. 20b is a diagram showing distortion due to packaging corresponding to the designs in FIG. 20a.

FIG. 24 shows an example user interface for a plugin to achieve spot color embedding.

FIG. 37 is a flow diagram for a related process for determining one or more substitute spot colors.

Figure 3:
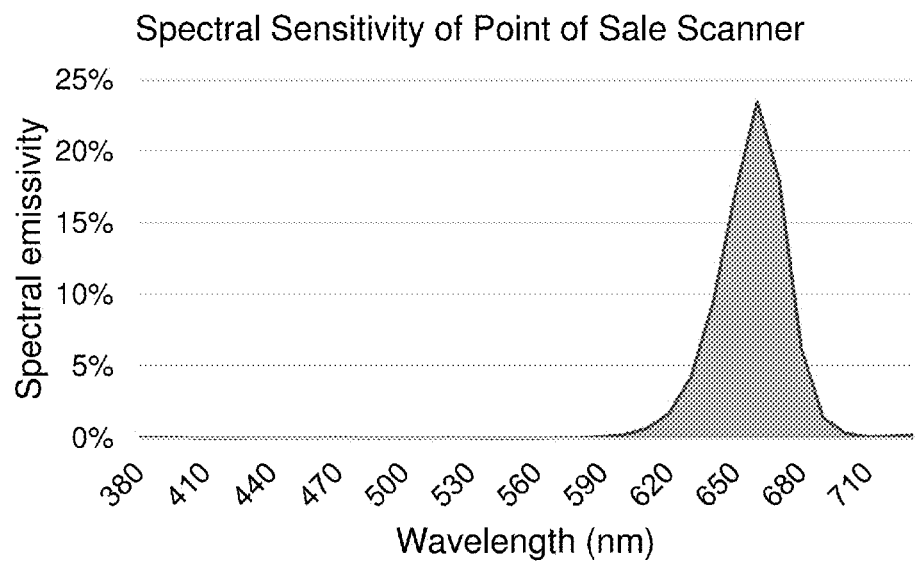
FIG. 3 shows spectral sensitivity of a Red LED scanner, with a peak at or around 660 nm.

Other drawings are included throughout the text in Appendix A, Reed et al., "Watermarking Spot Colors in Packaging," which is hereby incorporated herein by reference.

DETAILED DESCRIPTION

There are four (4) main sections that follow in this Detailed Description (I. Adaptive Embedding Framework; II. Spot Color and Process Color Data Hiding; III. Additional Implementations and Description; and IV. Implementations of Adaptive Embedding Framework). These sections and their assigned headings are provided merely help organize the Detailed Description. Of course, description and implementations under one such section is intended to be combined and implemented with the description and implementations from the other such section. Thus, the sections and headings in this document should not be interpreted as limiting the scope of the description.

I. Adaptive Embedding Framework

Portions of this disclosure are described in terms of, e.g., data hiding for product packaging (sometimes just referred to herein as "packaging" or "package") and other printed objects. These techniques can be used, e.g., to alter or transform how color inks are printed on various physical substrates. The alterations or transformations preferably result in a printed design carrying machine readable indicia. Such data hiding techniques may beneficially interrelate with the adaptive embedding framework below.

1. Design of Human Visual System (HVS) Models:

A human visual system model is used to indicate the extent to which changes to an image will be visible. While a watermark signal may be designed so that it is less noticeable by constructing the signal with less noticeable colors or spatial structure, the more sophisticated model analyzes the change in visibility relative to the host signal. Thus, a watermark embedding process should consider the extent to which the changes made to an existing image are visible. The host image may have little or no variation, or even no color content, in which case the visibility model assesses visibility of the watermark signal itself and produces output providing a measure of visibility. A watermark embedder function adapts the watermark signal amplitude, color and spatial structure to achieve a visibility target which depends on the application. For example, a fashion magazine would have a lower visibility target than packaged goods. The host image may have regions of color tones, in which case, the embedder considers color errors introduced by the embedding process in those regions. In many cases, a host image includes regions with different color and spatial attributes, some uniform, others variable. In areas of the host image with variability, the changes due to embedding should be adapted to take into account not only visibility of a watermark signal, but in particular, visibility relative to the host signal, and its masking of changes due to the watermark embedding.

a. Watermark Signal Design:

The watermark signal is designed to be minimally visible within the types of host image content in which it will be embedded. This design includes selecting attributes like spatial frequency content and pseudorandom spatial patterns that tend to be less visible. Some examples of such implementations are described in U.S. Pat. No. 6,614,914, which is hereby incorporated by reference in its entirety. The watermark signal need not have random properties, however. It may have a regular or repeated pattern structure that facilitates robust detection and reliable data extraction as detailed in our application 62/106,685, entitled Differential Modulation for Robust Signaling and Synchronization, which is hereby incorporated by reference in its entirety. The watermark design also preferably leverages encoding in color channels to optimize embedding for visibility and robustness as described in US Published Application 20100150434, which is also incorporated by reference in its entirety.

b. Human Visual System (HVS) Models for Watermarking:

Prior work in HVS modeling provides at least a starting point for designing HVS models for watermarking systems. See, in particular, Scott J. Daly, "Visible differences predictor: an algorithm for the assessment of image fidelity", Proc. SPIE 1666, Human Vision, Visual Processing, and Digital Display III, 2 (Aug. 27, 1992); doi:10.1117/12.135952, and U.S. Pat. No. 5,394,483 to Daly, entitled, Method and apparatus for determining visually perceptible differences between images, which are hereby incorporated by reference in their entirety. Daly's HVS model addresses three visual sensitivity variations, namely, as a function of light level, spatial frequency, and signal content. The HVS model has three main components: an amplitude non-linearity function in which visual sensitivity is adapted as a non-linear function of luminance, a Contrast Sensitivity Function (CSF) model of the eye that describes variations in visual sensitivity as a function of spatial frequency, and a model of masking effects. The first component is an amplitude non-linearity implemented as a point process. The CSF can be implemented as a filtering process. The third in the sequence of operations is a detection process. The output is a map of the probability of detecting visible differences as a function of pixel location.

Daly used the HVS in U.S. Pat. No. 5,394,483 to develop a method of hiding one image in another image. See, U.S. Pat. No. 5,905,819 to Daly, Method and apparatus for hiding one image or pattern within another, which is hereby incorporated by reference in its entirety. Another HVS is described in U.S. Pat. No. 7,783,130 to Watson (also published as US Application Publication 20060165311), entitled Spatial Standard Observer, which is hereby incorporated by reference in its entirety.

In our prior work, we developed a perceptual masking model for watermarking that incorporates a CSF of the eye as well as a method for directional edge analysis to control perceptibility of changes due to watermark embedding around directional edges in a host signal. See U.S. Pat. No. 6,631,198, which is hereby incorporated by reference in its entirety.

We found that the Daly and Watson methods were useful but further work was needed for our watermarking techniques in color channels. Therefore, we developed HVS methods that incorporate color visibility models.

Our application Ser. No. 13/975,919 (U.S. Pat. No. 9,449,357) describes a full color visibility model for watermarking in color channels. U.S. application Ser. No. 13/975,919, entitled Geometric Enumerated Watermark Embedding for Spot Colors, is hereby incorporated by reference in its entirety. One particular usage is watermarking in color channels corresponding to color inks used to print a host image. The watermark modulations of color values are modeled in terms of CIE Lab values, where Lab is a uniform perceptual color space where a unit difference in any color direction corresponds to an equal perceptual difference. The Lab axes are scaled for the spatial frequency of the watermark being encoded into the image, in a similar manner to the Spatial CieLab model. See, X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif., USA, June 1996, which is hereby incorporated by reference in its entirety.

This scaling provides a uniform perceptual color space, where a unit difference in any color direction corresponds to an equal perceptual difference due to the change made to encode a watermark signal at that spatial frequency. The allowable visibility magnitude is scaled by spatial masking of the cover image. This masking is computed based on a masking function. Examples of masking functions include the masking components of the Spatial Standard Observer model of Watson or the HVS models of Daly referenced above, as well as our prior patents, such as U.S. Pat. Nos. 6,631,198 and 6,614,914, referenced above.

Relatedly, our application Ser. No. 14/588,636 (U.S. Pat. No. 9,401,001), describes techniques for embedding watermarks in color channels that employ full color visibility models. Patent application Ser. No. 14/588,636, entitled Full-Color Visibility Model Using CSF Which Varies Spatially with Local Luminance, is hereby incorporated by reference in its entirety. This approach uses a full color visibility model for watermarking in color channels. This visibility model uses separate CSFs for contrast variations in luminance and chrominance (red-green and blue-yellow) channels. The width of the CSF in each channel can be varied spatially depending on the luminance of the local image content. The CSF is adjusted so that more blurring occurs as the luminance of the local region decreases. The difference between the contrast of the blurred original and marked image is measured using a color difference metric.

The luminance content of the host image provides potential masking of changes due to watermarking in chrominance as well as luminance. Likewise, the chrominance content of the host image provides potential masking of changes due to watermarking in chrominance as well as luminance. In our watermarking systems that embed by changes in luminance and chrominance, or just chrominance, of the host image, the embedding function exploits the masking potential of luminance and chrominance content of the host image. The masking potential at a given region in an image depends in part on the extent to which the host image includes content at that region that masks the watermark change. For example, where the watermark signal comprises mostly high frequency components, the masking potential of the host image is greater at regions with high frequency content. We observe that most high frequency content in a host image is in the luminance channel. Thus, the luminance content of the host is the dominant contributor to masking potential for luminance changes and chrominance changes for high frequency components of the watermark signal.

In some applications, the watermark signal has lower spatial frequency content, and the embedding function computes the masking capability of that low frequency content on the watermark signal as well, taking into account both luminance and chrominance masking on luminance and chrominance components of the watermark signal.

Our watermarking techniques in luminance and chrominance channels also leverage masking of spatial structure particular to those channels. Such visibility effects originate both from the host image as well as the print technology. The host image content can have strong spatial frequencies at an angle, which masks similar spatial structure of the watermark at that angle. Likewise directional edges in the host image control watermarking along the edge as noted in U.S. Pat. No. 6,631,198.

The print technology sometimes prints with halftone screen or raster for different inks with different orientation, shape, and structure. Black inks, for example, are sometimes printed with halftone dots at screen angle of 45 degrees to achieve a higher print quality because black is most noticeable to the eye and it is desirable to make the spatial pattern of black dots less noticeable. These types of print structures for different color inks provide an opportunity to hide the watermark signal differently in the color channel or channels that correspond to that ink. For more on watermarking that exploits the halftone structure and Raster Image Processor used in printing, please see our US Patent Publication 2014-0119593, which is hereby incorporated by reference in its entirety.

2. Robustness Modeling:

Optimizing the embedding for robustness adds another constraint in which the encoding is controlled not only to achieve a desired visual quality, but also to achieve reliability in decoding the watermark. A simple view of robustness may be to set a floor on the gain or signal level of the watermark signal, but this is potentially less useful if it does not consider how well watermark signal structure is maintained within a host image, or opportunities to apply less gain where signal structure is maintained due to attributes of the host image that are inherently better at carrying data with less or no modification. A more sophisticated view is to consider how the watermark signal conveys data through its color and structure or the color and structure created when it exploits host signal structure to mask watermark variations and/or carry data (e.g., where signal data is encoded in the relationship among values or an attribute derived from a region in an image, how is that relationship or attribute impacted by modifications made to reduce visibility?) Thus, controlling the strength of the watermark signal should also ensure that such control does not undermine its reliability. A robustness metric can be designed based on readability of the watermark, e.g., through a detection metric: modification of the signal to remain within a visibility constraint should maintain the structure of the signal that conveys digital data. Our application Ser. No. 13/975,919 (U.S. Pat. No. 9,449,357) describes a framework for watermark embedding that optimizes embedding based on visibility and robustness models. See Appendix A of Ser. No. 13/975,919: Bradley, Reed, Stach, "Chrominance watermark embed using a full color visibility model."

3. Modeling the Distortion of the Channel:

Related to robustness optimization, the embedding process should take into account the impact of anticipated distortion introduced by printing, use or scanning of the printed object. A particular concern is the extent to which a change to embed an image will become more visible due to the technology used to render the image, such as the display or printer. This type of rendering distortion may be incorporated into the model to predict the change in visibility and/or robustness after distortion, and adjust the embedding to compensate for this change. Likewise, the rendering distortion may also impact robustness. As such, robustness modeling should account for it as well.

See in particular, our U.S. Pat. No. 7,352,878, which describes a model that incorporates a model of the rendering device (e.g., display or printer) within an adaptive embedding function. The embedder uses this model to adapt the visibility mask used to control the watermark signal, so that it takes into account the effects of the rendering device on visibility. U.S. Pat. No. 7,352,878 is hereby incorporated by reference in its entirety. These techniques may be further combined with full color visibility models and robustness models referenced in this document.

Other examples of modeling distortion include adding noise, applying a geometric distortion, compressing the image, and modeling image capture distortion. For package images to be printed on a 3D object with known shape, the geometric distortion applied to the image is known and its effect can be compensated for in the embedding of the watermark in the package design. Examples include labels wrapped around a curved object (e.g., a yogurt cup or soup can). The watermark signal (and in some cases the host signal itself) may be pre-distorted to compensate for the geometric transformation caused by application of it to the object. This and other noise sources may be modeled and applied to the watermarked image to measure its reliability in the robustness model. The watermarking process is then corrected or iterated as necessary to achieve reliable detection metrics.

4. Printing Technology Limitations:

Another related constraint is the limitation of the print technology. As noted, it may cause distortion that impacts visibility and robustness. It may have limitations in the manner in which it is able to represent a color or spatial structure of the watermark signal. It may not be able to print a particular color, dot structure, orientation or size/resolution, or may introduce registration errors among different ink layers that make encoding in color directions not viable. Distortion due to dot gain and other limitations of replicating an image on a substrate need to be accounted for. Dot gain distortion can be modeled in the robustness model such that the watermark signal is embedded to be robust to the distortion.

5. Image Capture Device Limitations:

Another design consideration is the image capture device. Some forms of image capture devices, such as barcode scanners, do not capture full color images. For example, some barcode scanners have monochrome image sensors and illuminate an object with red LED illumination. This type of limitation requires that the watermark signal be designed so that it can be "seen" by the capture device, meaning that at least a portion of the watermark signal is readable in the spectral band or bands captured by the image sensor. We discuss these limitations and methods for addressing them in our US Application Publication 2013-0329006 and U.S. Provisional Application 62/102,247, which are hereby incorporated by reference in their entirety.

6. Color Appearance and Attention Models:

Attention (also referred to as "saliency") models may also be included to adjust visibility model for controlling watermark modification at a particular location within an image. See our U.S. patent application Ser. No. 14/588,636 for description of how to use this type of model in a watermark embedder. An attention model generally predicts where the human eye is drawn to when viewing an image. For example, the eye may seek out flesh tone colors and sharp contrast areas. One example attention model is described in Itti et al., "A Model of Saliency-Based Visual Attention for Rapid Scene Analysis," IEEE TRANSACTIONS ON PATTERN ANALYSIS AND MACHINE INTELLIGENCE, VOL. 20, NO. 11, NOVEMBER 1998, pgs. 1254-1259, which is hereby incorporated herein by reference in its entirety. High visual traffic areas identified by the attention model, which would otherwise be embedded with a relatively strong or equal watermark signal, can be avoided or minimized by a digital watermark embedder, e.g., through adjustment of the visibility map used to control application of the watermark signal to a host image. In many application scenarios, it is advantageous for the embedding system to take into account a Color Appearance Model (CAM) to assess the extent to which a change in color is likely to be noticeable relative to colors present in the host image. For information on CAM, please see Fairchild, Mark D. Color Appearance Models. Chichester: John Wiley & Sons, 2013. Our application of digital watermarking in packaging provides methods in which CAM is automated and applied in embedding functions for advantageous effect.

Package designs typically include colors for which the package designer attaches importance over other colors. For example, a consumer product brand may have a color or combination of colors that are strongly associated with the brand. The designer, thus, seeks to achieve consistency and accuracy in representing this color across all of its packages. This may be achieved through the use of a spot color. Another example is where the designer selects a particular color or color combination to evoke a particular theme for the product (e.g., a pineapple flavored product might use a yellow color). This color might be modified by the watermark, but the modification should not undermine the intent of the designer, nor appear objectionable to the consumer. Finally, the remaining colors on package may be less important, and thus, more available for modification. Among these parts of the package design, there may be regions in which a tint may be applied to convey the digital watermark or the host image may be modulated in a particular color or set of colors. Overall, none of the image should be modified in a manner that undermines the designer's objective for the dominant brand colors, or an important thematic color.

To illustrate, consider an implementation of adaptive watermark embedding in a plug in of a design program used for designing the package image. The plug in allows the designer to specify importance of colors, which in turn, dictates whether the plug in will modify a color, and if so, the extent to which the modification are allowed to deviate from the original color. For the colors in a design, the CAM takes their priority and provides constraints for color modifications that are applied in the embedding function. The color match error for use of a substitute color for an original color (e.g., process inks for spot color) and the color error introduced by the watermark are weighted according to the priority of the color. Additionally, the CAM places a constraint on the direction in color space of the modification to a particular color. The following examples will illustrate.

If a bright background area is available for conveying a data signal, the CAM detects the bright area by their pixel values and provides specification for the tint used to fill that area that satisfies the CAM constraint relative to the color of other features in the design. This bright background is intended to look white or nearly white and a light tint added to it will not be noticeable so long as it is uniform in the design and not modulated in a color direction that is incompatible with the color of neighboring features. So long as the area covered by the tint remains substantially brighter than the rest of the design elements, it will not be noticeable. It would only be noticeable if it were positioned next to a blank area with no tint. The CAM constraints preclude noticeable changes of appearance of regions and can also be set so that the modulation of such areas are smoothly tapered near regions with other colors of higher importance.

Another example is a package design where there is a thematic color for which the CAM limits the direction of color modulation or alternatively specifies a black tint to convey the watermark signal. The example of the yellow for a pineapple product is appropriate to illustrate. For such a case, the CAM takes the priority weighting for the yellow and further constrains the modulation color direction to preclude objectionable color changes within the yellow region of the package. Green is an example of a color that would be incompatible and thus precluded by the constraint set by the CAM for the yellow region of the design. Alternatively, the embedder substitutes a black ink tint if a robustness measure indicates that a reliable signal cannot be achieved in allowable chrominance modulation directions or channels.

II. Spot Color and Process Color Data Hiding

A significant number of packages in commerce are printed to include at least some areas using "spot colors" as discussed above. Spot colors may include, e.g., custom premixed ink designed to achieve a certain color when printed on a specified substrate. PANTONE is one example of a spot color system that is commonly used in the product packaging industry. Packages may also include so-called process colors. As discussed above, process colors typically refers to Cyan (C), Magenta (M), Yellow (Y) and/or Black (K) inks that are used to simulate a wide range of colors by mixing these various inks on a substrate. Process colors can be printed with, e.g., half tone dots.

Data hiding within a spot color can be challenging since the spot color can be viewed as a flat patch, with little or no variance. Modulating a flat color patch to carry an information signal may introduce color shifts and noticeable visible artifacts. Also, many package designers use spot colors to achieve a distinctive color. Altering a specific spot color may result in aesthetic complaints from the designers and deviation for the distinctive color.

This disclosure provides, e.g., methods, systems, software plugins and applications, and apparatus for hiding information in spot colors and other color areas while minimizing color shifts and visibility concerns. In some cases we prefer to hide data in spot colors in a chrominance domain rather than with luminance to reduce the visibility of the hidden data.

Figure 12:
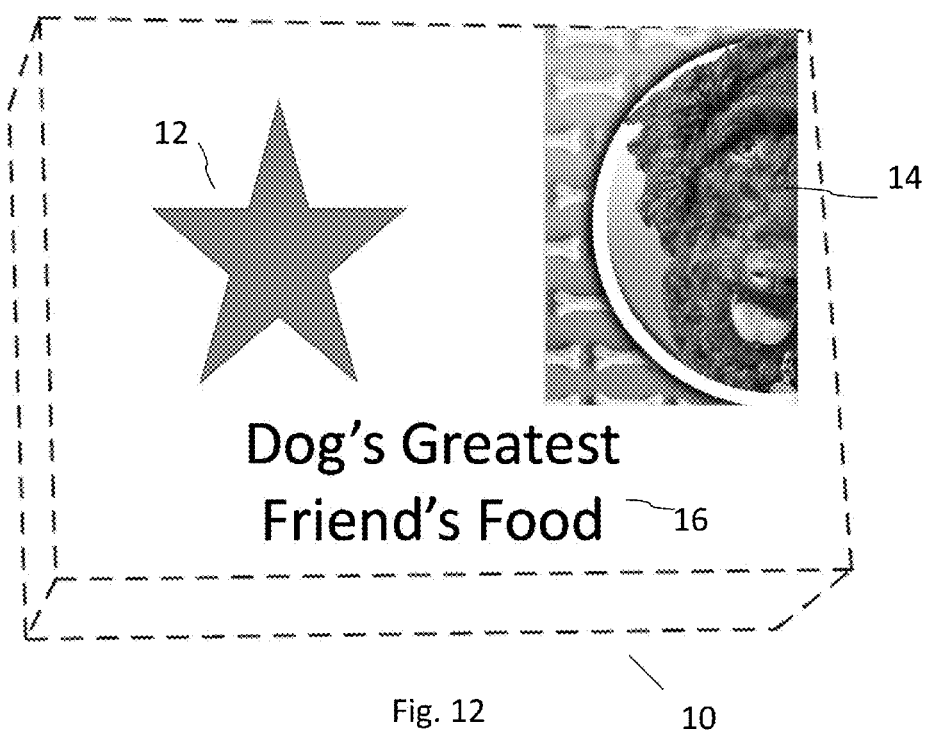
FIG. 12 depicts a product package including multiple different areas, the different areas including different data hiding therein.

With reference to FIG. 12, a product package 10 may include multiple different printed areas 12, 14, 16. Area 12 may include spot color ink, area 14 may include one or more process color inks and area 16 may include printed text. Package 10 may include multiple different forms of data hiding to convey machine-readable indicia over a substantial portion of the package. For example, the area 12 spot color may be screened and then overprinted with CMY process colors to covey a watermark signal, the area 14 may already include process colors, which can be modulated to convey an information signal. For area 16 (and any white spaces) a subtle tint of CMY(K) may be printed which includes an information signal. The information signals in theses area preferably include overlapping (or the same) information such that the information signal can be obtained from signal detection in one or more of the areas 12, 14, 16. In fact, for many package designs we prefer to redundantly embed an information signal over substantially all package surfaces (e.g., 80-100% coverage).

One form of an information signal used to guide embedding can be a robust spread spectrum digital watermark signal. One instance may carry a plural-bit payload, e.g., a 47-bit payload, enough to encode the same information as is carried in a Global Trade Item Number (GTIN-14) often found in a linear UPC barcode. A watermark payload may also include additional error correction bits, checksums, payload version bits and other information. A watermark carrying a specific payload can be represented, e.g., at a spatial resolution of 75 DPI, as a 128×128 pixel grayscale image, called a watermark tile. FIG. 8a shows one instance of a watermark tile with a histogram (FIG. 8b) of watermark signal values. Of course, different instances of watermarking and other types of machine-readable indicia can be used instead of the illustrated watermark tile. In the illustrated case, the watermark tile includes a zero-mean signal with positive and negative values referred to as "waxels" (e.g., watermark pixels). Watermark tiles can be concatenated next to each other to cover larger area. As opposed to a traditional UPC barcode, portions of a single watermark tile can be cropped and still successfully be decoded due to its repetitive structure. When print resolution is different from 75 DPI (e.g., see FIG. 2, shaded area), the watermark tile can be up-sampled to match the print resolution.

Figure 4:
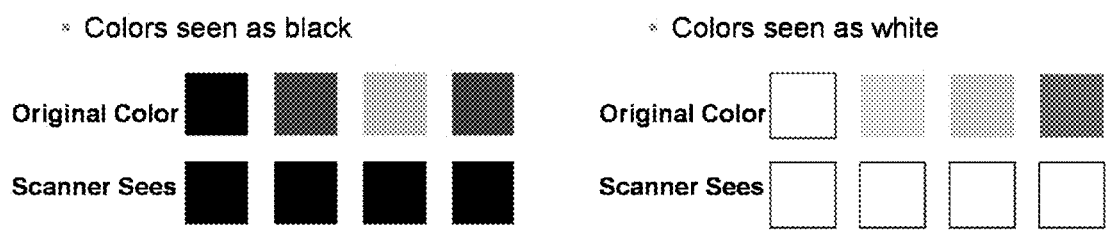
FIG. 4 shows various colors and their grayscale representation ("scanner sees") as seen by a POS scanner with a 660 nm red LED illumination.

Point of Sale (POS) scanners with red LEDs typically include a narrow-band monochromatic imager with a peak response at or around 660 nm. Such red LED scanners are often found at grocery checkout lanes, looking for traditional UPC barcodes. See FIG. 3 for a spectral response of a typical red LED capture device; see also FIG. 1a. A red LED capture device (e.g., a point of sale scanner or camera) only "sees" colors which reflect at or around 660 nm. If a color strongly reflects at this wavelength the captured device 'sees' white. Bright yellows, magenta, pink, orange and white are all 'seen' as white by a red LED capture device. If a color has a low reflection at this wavelength (e.g., absorbs the wavelength) the captured device "sees" black. Dark blue, Cyan, green, purple and black are all 'seen' as black by the camera. FIG. 4 illustrates these arrangements. Thus, changes made to colors of low spectral reflectance at or around 660 nm are visible (e.g., register as black pixel values) to the scanner and thus are suitable for carrying information signals. Due to the combination of a narrow-band illumination and monochromatic sensors, a typical barcode scanner can only see grayscale images created by spatial changes in ink reflectance at 660 nm. If more inks are overprinted, the grayscale value G can be obtained from a 660 nm component of the Spectral Neugebauer model as:

$$G = \text{sensitivity} \cdot R(660 \text{ nm}) + \text{offset} \quad (6)$$

Two approaches are now considered when introducing an information signal into a spot color. With reference to FIG. 5a, FIG. 5b and FIG. 5d, a first approach modulates the spot color itself (FIG. 5a). Max (FIG. 5d, left patch) and Min (FIG. 5d, right patch) tweaks (e.g., pixel or color changes, color value amounts, and/or signal or color channel modulations or modulation changes) are determined to carry a signal. The Max patch can be a 100% version of the spot color, and the Min patch can be a screened back version of the spot color (e.g., 85% screen). The min/max tweaks are substituted for (or interpolated according to an information signal) the original spot color values across the spot color patch according to an information signal, e.g., the original signal is modulated with the min/max tweaks to convey the information signal.

A second approach uses CMY min and max tweaks (See FIG. 5e) as a tint applied (e.g., printed) over a screened back version of the spot color in FIG. 5a. The resulting watermarked patch (see FIG. 5c) is a closer approximation to FIG. 5a relative to FIG. 5b. Thus, an information signal can be conveyed through a CMY tint in a combined screened spot color+process colors. The combined screened spot color+process colors are provided to approximate the original spot color. CMY tweaks or signal modulations can be added with a tint over (or, in some cases, beneath) a spot color screen. As discussed above, the term "screen" implies that a spot color is scaled back or reduced, e.g., in terms of its color percentage or chrominance values. Watermark tweaks (ΔC, ΔM, ΔY) can be provided to achieve a scanner signal, AGRAY, as seen by a monochrome scanner. One optimization combines a CMY tint including min (e.g., negative) and max (e.g., positive) watermark signal tweaks that combine to approximate an original spot color.

FIG. 6a and FIG. 6b presents a red LED capture device grayscale view point of the FIG. 5b and FIG. 5c embedded patches. The detectable signals from each patch are very similar in terms of standard deviation, 2.2 (FIG. 6a) and 2.1 (FIG. 6b). Yet the improvement in visibility reduction in FIG. 5c vs FIG. 5b is tremendous. This points to an advantage of the combined screened spot color+process color tint.

This second approach is described even further below with respect to FIG. 7. See also Appendix A, Reed et al., "Watermarking Spot Colors in Packaging," which is hereby incorporated herein by reference in its entirety, for a related disclosure.

Figure 7:
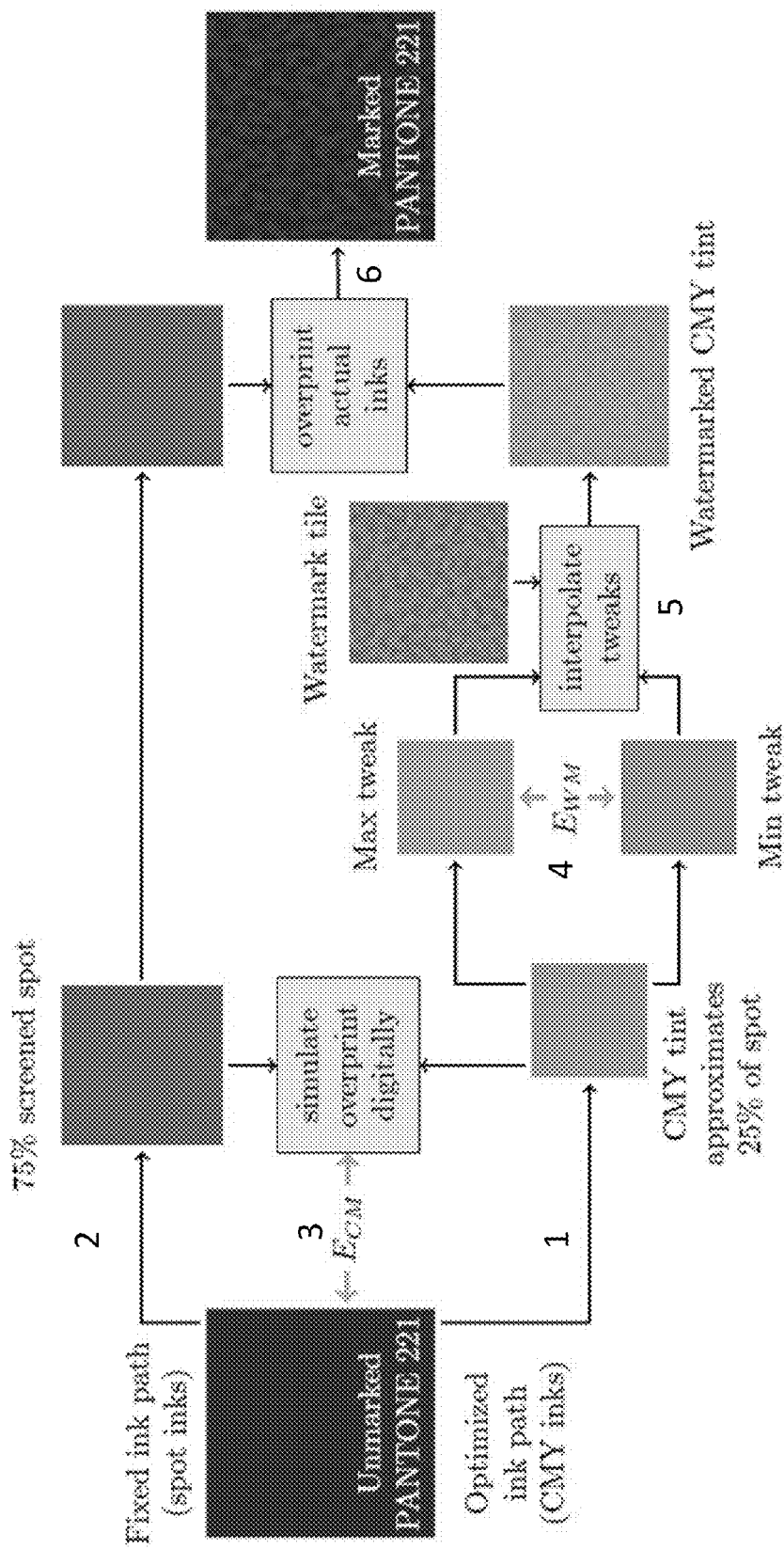
FIG. 7 is a diagram showing a spot color data hiding process using CMY overprints.

With reference to FIG. 7, an embedding process is shown relative to an un-watermarked spot color, PANTONE 221 C. The below numbered 1-6 paragraphs correspond to numbers 1-6 in FIG. 7.

1. Determine CMY values for overprinting with a screened spot color. The combined screened spot color+process colors (CMY) are provided to approximate the original spot color. We generally use the term "tint" to refer to the selected CMY process colors. The CMY approximation or tint can be determined by testing, or models of overprinting can also be used as discussed, e.g., in Deshpande, K. and Green, P. "A simplified method of predicting the colorimetry of spot colour overprints," 18th Color Imaging Conference: Color Science and Engineering Systems, Technologies and Applications, pg. 213-216, San Antonio, USA 2010, which is hereby incorporated herein by reference in its entirety. Or, for a given substrate, a PANTONE ink swatch can be scanned with a spectrophotometer to determine corresponding process color (or L*a*b*) correspondence. Libraries, table and/or indices of such approximations, predictions or measurements can be built for rapid consultation. Interpolation can be employed to estimate process color tint percentages for values not explicitly represented in the table. For example, a table or library can be accessed to find CMY values, which when combined with a screened back version of a particular spot color, will yield a close approximation to the original spot color.

2. Screen spot color. Screening provides information signal headroom for an over (or under) printed CMY tint. Recall from above that the CMY tint will carry the information signal. An amount of screening may depend, e.g., at least in part on an amount of cyan absorption associated with the original spot color. In the illustrated PANTONE 221 example, the spot color is screened to 75%. Of course, this percentage screen is not limiting as other percentages may be chosen based on, e.g., visibility, robustness and masking considerations. For this example, it was determined that a color approximation of the illustrated PANTONE 221 spot color in terms of percent (%) spot, C, M and Y: 75%, 13, 57, 8.

3. Simulate the CMY overprint+screened spot color to evaluate color match error $E_{CM}$ between the original spot color and the CMY overprint+screened spot color. This process can be used to iterate selection of the CMY tint values to minimize error of the selected process colors and screen. For example, $\Delta E_{76}$, $\Delta E_{94}$, $\Delta E_{2000}$, metrics can be used to minimize color error between the process color tint+screened spot color and the original 100% spot color. Different screen percentages and CMY tint values at or around the predicted colors can be investigated to find values with minimized error.

4. Decompose CMY tint into Min and Max Tweaks. For example, a gradient search process or least squares distance process can be conducted to find optimum tweaks. These processes may consider other factors as well. For example, an optimization process may consider the original spot color, visibility constraints, robustness requirements at a particular spectral response (e.g., at 660 nm), a k (black) channel, other spot colors, etc. For the illustrated example, Min Tweak (%): 75, 27, 42, 16; and Max Tweak (%): 75, 0, 73, 0 were determined. In FIG. 7, $E_{WM}$=watermark error, which can be a weighted sum of $\Delta L^*$, $\Delta a^*$ and $\Delta b^*$ where CIE $\Delta L^*$ can be weighted heaviest to account for greater visibility of the watermark signal in lightness, followed by $\Delta a^*$ (red-green) and then $\Delta b^*$ (yellow-blue). Some goals of the Min and Max CMY Tweak may include, e.g., i) similar perceived visibility to original spot color when overprinted with screened spot, ii) maximum tweak difference at 660 nm (corresponding to red LED scanner), which maximizes scanner visibility; iii) minimum luminance (CIE L*) difference, recall that human visual system is most sensitive to luminance changes and color difference (CIE a* and b*) should be kept under control.

5. Embed an information signal by spatially and variously changing some or all of the CMY tint between Min and Max tweaks. The tweaks can be used to modulate or transform the CMY tint to convey an information signal. An information signal (e.g., as carried by a watermark title in FIG. 7) can be embedded into CMY tint by interpolating between min and max tweaks based on watermark tile values. For example, the following equation can be used to interpolate tweak values for a given pixel or area value: $T_{CMY} = T_{Min} + (1+W)(T_{MAX} - T_{MIN})/2$, where W is a grayscale value of the watermark tile at a certain location and Tmin and Tmax are the min CMY tweak and max CMY tweak values, respectively. The result of this process for each watermark title value yields a modulated (e.g., watermarked or embedded) CMY tint. Of course, other types of encoding besides digital watermarking can be used to guide embedding of the CMY tints. For example, 2D barcodes, UPC barcodes, and other types of machine readable indicia, can be used to guide construction of an information signal to be hidden or embedded via CMY tint.

6. The modulated CMY tint is overprinted on the screened back spot color to yield a marked or embedded spot color.

Additional color blending, signal considerations, embedding and tweak value determination details, etc., are discussed below.

When embedding an information signal like a watermark tile into artwork, visibility of the embedded information signal as observed by a human user is often balanced with watermark robustness when scanning a package. Based a scanner response under red LED illumination shown in FIGS. 3 and 4, ink changes printed in Cyan or Black are visible to the scanner and thus can be useful for carrying an information signal. The human visual system, however, is significantly more sensitive to luminance changes (e.g., caused by changes in black ink) than chrominance changes (e.g., caused by changes in cyan ink). To reduce human visibility a watermark tile can be embedded by modifying each of the C, M, Y channels with grayscale values of the watermark tile W weighted by elements of the unit-length color weight vector $\omega=(\omega C, \omega M, \omega Y)$ and global signal strength $\alpha$:

$$C_i^I = C_i + \sigma \omega_C W_i, \quad M_i^I = M_i + \sigma \omega_M W_i, \quad Y_i^I = Y_i + \sigma \omega_Y W_i, \quad (7)$$

where index i denotes the pixel of each color separation. Color weights ω drive the color of watermark signal, while σ changes the overall strength of the signal. Both parameters influence the visibility of the watermark.

In general, the color weights ω may be associated with an ICC color profile for CMYK artwork which captures the color of CMYK ink overprints. For a typical GRACoL profile, the color weights can be set to, e.g., ωGRACoL for CMY=(0.69, −0.61, 0.39). Even though a red LED capture device does not see magenta and yellow changes, non-zero weights can be chosen to help minimize luminance changes introduced by embedding the watermark signal in Cyan. FIG. 9 shows sample patches embedded with this method. The left patch in FIG. 9 shows a watermark tile embedded in a mid-gray patch using the color weights mentioned in this paragraph. The right patch in FIG. 9 shows the same watermark tile embedded in the mid-gray patch with only changes introduced in a Cyan channel. The Cyan only patch (right patch) is visibly "grainy" or "noisy" compared to the chrominance (left patch, CMY embedded) patch.

Due to spectral dependency of a red LED capture device, only an information signal embedded in Cyan separation is available to the detector because signal in Yellow and Magenta are not seen by the capture device. In case of the ωGRACoL color weights mentioned above (0.69, −0.61, 0.39), this only represents about $0.69^2 = 48\%$ of the total signal energy embedded in the artwork that is extracted by a captured device. If a full-color image sensor is available, such as in a smart phone, the embedded watermark signal present in all CMY plates can be combined by aligning a grayscale conversion weight w:

$$G = \text{sensitivity} \cdot \sum_\lambda \omega(\lambda) R(\lambda) + \text{offset} \quad (8)$$

In RGB color space, this grayscale conversion can be approximated as 0.52·R−0.81·G+0.29·B.

When a CMY ink combination is overprinted with Black (K) to produce darker colors, the Black ink may act like an optical filter and reduce magnitude of changes introduced in Cyan separation. This may lead to a weaker watermark signal as seen by a red LED scanner and thus the robustness of the watermark can be degraded. This loss can be compensated either by increased signal strength σ, or by replacing a portion of the Black ink with a CMY combination making the final CMYK mix more suitable for watermarking, e.g., using a process known as Under Color Addition. Colors with either no or 100% Cyan component pose another challenge. If Eq. 7 is applied blindly, half of the waxels may not be embedded due to clipping resulting in a robustness loss. This could be resolved by compressing the color gamut of the artwork. For example an image with no Cyan, 2%-4% Cyan ink can be added in the original design. A watermark can then be inserted in this pre-conditioned artwork using methods described above.

In order to utilize the full potential of digital watermarking for product packaging, a large portion of the package surface can be watermarked (e.g., 80-100%). That is, a package may include many redundant instances of an information signal hidden therein. Some packages contain significant areas without any ink coverage. Such areas may lead to dead zones and reduce the full benefit of improved checkout speed. To resolve this, white areas can be covered by a light CMY tint which is can be modulated prior to printing to carry information signals. Tint including 4% C, 2% M and 2% Y can be used for offset printing white, open or behind text areas. An example of this tint is shown in FIG. 10, where the left patch includes the suggested 4% C, 2% M and 2% Y tint, and the left patch includes just cyan only.

When embedding a watermark in complex artwork, not just flat spot color areas as is the one of the focuses of FIG. 7, more signal can be embedded in textured areas than in flat regions because image texture masks the presence of the watermark signal. To better utilize this effect, both direction of the color weight vector and signal strength may vary spatially to equalize visibility of the watermark. This can be done either manually in image editing software or automatically as discussed in Reed et al., "Full-color visibility model using CSF which varies spatially with local luminance." In Q. Lin, J. P. Allebach, and Z. Fan, editors, Proceedings SPIE 9027, Imaging and Multimedia Analytics in a Web and Mobile World 2014, volume 9027, 2014, which is hereby incorporated herein by reference in its entirety. Similarly, form factor of a package may indicate that the signal strength to be increased. For example, the area of a soda can is significantly smaller than that of a cereal box. Larger objects provide more opportunities for a capture device to successfully read a hidden signal. So the soda can may have a signal strength that is stronger relative to the cereal box. Similarly, the geometry of a package may dictate increased signal strength. For example, curved surfaces and near corner areas (e.g., packaging for a can of soup or corner of a package, etc.) may warrant a stronger signal strength. 3D models or user defined areas can be used to identify corner areas for increase signal strength, or for curved surfaces, the signal strength across the entire surface can be increased.

Returning to the spot color embedding discussed relative to FIG. 7, the color difference between 100% spot and the screened 75% with overprinted CMY tint, denoted as $E_{CM}$, can be referred to as Color Match Error and can be measured using various color difference metrics as mentioned above. The CMY tint can be decomposed into so-called Max and Min Tweaks by, e.g., minimizing weighted color difference between them while achieving a detectable difference in spectral reflectance at 660 nm when overprinted with the screened 75% spot color.

Color difference between min and max tweaks overprinted with 75% spot, denoted $E_{WM}$, is called Watermark Error. A final watermark can be produced by overprinting 75% screened spot and the modulated CMY tint. In this process, both color errors are interconnected. In order to keep luminance changes minimal more space for CMY tweaks can be used and thus, possibly, increasing the color match error, $E_{CM}$. A spot screen of 75% is also a parameter that could be changed. Difference of spectral reflectance at 660 nm, denoted as $\Delta_{660}$, serves as a measure of watermark signal strength similar to parameter σ in Eq. (7). Given a value of $\Delta_{660}$, spectral ink overprint models can be used to find optimal value of spot screen and min and max tweak ink percentages minimizing weighted sum of both color errors:

$$\min_{\alpha_{min}, \alpha_{max}} E_{CM} + p \cdot E_{WM} = \tag{9}$$

$$\Delta E_{76}\left(R_S, \frac{R_{max} + R_{min}}{2}\right)^2 + p \cdot \Delta E_{WM}(R_{min}, R_{max})^2,$$

$$\text{s.t. } R_{max}(660) - R_{min}(660) \geq \Delta_{660}$$

$$0 \leq \alpha_{min}, \alpha_{max} \leq 1$$

where $R_{max}$ and $R_{min}$ correspond to Neugebauer spectral reflectance from Eq. (2) obtained for (spot and CMY) ink percentages $\alpha_{max}$ and $\alpha_{min}$, respectively. $R_S$ refers to spectral reflectance of the original spot color printed on a substrate. Color difference metrics $\Delta F_{76}$ and $\Delta E_{WM}$ are discussed above. Both metrics can be configured to return scalar values weighted by a constant penalty term p. In general, weight p is dependent on the color. From experiments conducted with professional designers, we now prefer to set the default value of the weight factor to p=1. Of course, varying p may result in additional or less signal detection robustness.

By formulating data hiding as an optimization problem, other printing press or design-related constraints can be put in place. For example, designers may not allow a spot color ink to be screened due to physical press reasons, or may limit the amount of screening. By including the spot ink in $\alpha_{min}$ and $\alpha_{max}$ without any constraint will allow the spot ink to be modulated by the watermark tile. For example, a specific spot ink is moved from the fixed-ink path in FIG. 7 to the optimization path and is included in the optimization process along with CMY inks. Min and max tweaks then may include a spot ink component and the watermark tile can be embedded by interpolating between these two colors as described previously for the CMY case.

The optimization problem in Eq. (9) can be solved numerically with, e.g., the IPOPT library, using the underlying technology detailed in A. Wächter and L. T. Biegler, "On the implementation of a primal-dual interior point filter line search algorithm for large-scale nonlinear programming." Mathematical Programming, Vol. 106, issue (1): pages 25-57, 2006, which is hereby incorporated herein by reference in its entirety. IPOPT code is available as open source, e.g., at http://www.coin-or.org/Ipopt.

Such an optimization can be carried out for a given image area, e.g., a spot color area have the same color values. Additionally, the optimization can be carried out for each image area including different color values. This might include optimizing an entire image or image area on a per pixel basis, or on an area by area basis.

Figure 11:
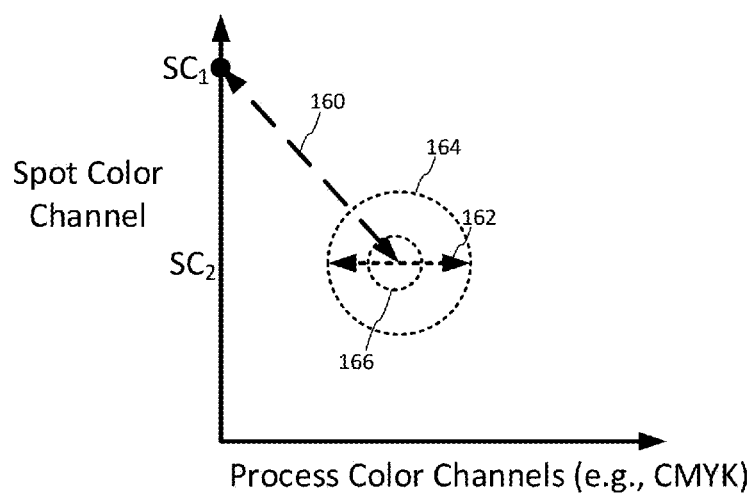
FIG. 11 is a diagram showing optimization tradeoffs when selecting a screened spot color and corresponding process colors.

FIG. 11 provides a graphical framework to consider some aspects of our color embedding optimization technology, e.g., as previously discussed relative to FIG. 7. SC1 represents a first color. To generalize an optimization system, there can be at least 3 components: i) system space, ii) variables to optimize, and iii) system constraints. In one implementation the space may include a color gamut defined by a first color channel (SC channel) and four process colors CMYK. Of course, the space may include additional color channels, e.g., two or more spot colors. In this implementation, the variables to optimize may include, e.g., eight (8) or more variables, e.g., SC2, CMY tint and ACMYK. The constraints may include, e.g., bounding features, ink properties, printer properties, use, package form factor (e.g., 3D model), detection criteria, performance standards and/or system limitations.

Returning to FIG. 11, SC1 could be a 100% value of a certain spot color. Unmodified, there is insufficient head room for SC1 to accommodate a hidden signal. So an approximation of SC1 can be achieved by moving along both the SC channel and combining with other color channels. The other colors can include, e.g., process color inks (CMYK). A distance (e.g., a color error metric) 160 is preferably minimized to achieve an approximation of SC1 using an SC color channel value, SC2, +some combination of the other color channels (e.g., CMYK). SC2 can be a screened version of SC1.

Tweak values 162, which are introduced in the other color channels to carry an information signal, are determined. A floor 166 can be set within an optimization function to maintain a particular robustness of the hidden data. For example, reflection at a certain spectral band can be considered. Other robustness factors may include expected print distortion (e.g., plate mis-registration), scanner noise, color screen properties, printer resolution, illumination considerations, image characteristics, color values, etc. The magnitude of the tweaks can be optimized to ensure desired robustness. A visibility ceiling 164 can also be set to establish a visibility constraints. Factors here may include ink gamut limits, ink properties (e.g., metal effect), appearance model outputs, image masking outputs, printing angles, images characteristics, HVS outputs, CSF outputs, etc. Such robustness factors and visibility factors may be used as constraints for an optimization function. There may be situations where robustness is key, so distance function 160 is less important relative to the floor established by 166. In other cases, visibility concerns my trump robustness causing the ceiling 164 to contract.

Spot color and process color embedding can be implemented in many forms. Our preferred approach utilizes a software application plugin that cooperates with digital imaging software such as Adobe Photoshop or Adobe Illustrator. The plugin can be crafted (e.g., using the Adobe Photoshop SDK or the Adobe Illustrator SDK and programming tools such as Microsoft's Visual Studio) to provide user interfaces to select areas within digital image files for data hiding. The plugin may include or call various functions, routines and/or libraries to perform the data hiding techniques disclosed herein, e.g., including optimization processes, e.g., the IPOPT libraries, information signal generation (e.g., watermark embedder libraries), etc. The user interfaces may allow a user to select a type of data hiding for different digital image areas, e.g., spot color embedding, process color tints, etc. The plugin can be constructed to provide user interfaces to accept parameters such as robustness requirements, visibility requirements, global signal gain, etc. Such parameters can be entered graphically by moveable scale, entering numerical values, setting relative settings, etc. The plugin can be configured to operate autonomously. For example, the plugin can scan a digital version of a package design, determine flat areas (e.g., spot colors), process color and white spaces. The plugin can run an optimization to determine process color equivalents and tweaks for the spot colors, and determine CMY(K) tints for any white spaces or text areas.

Figure 24:
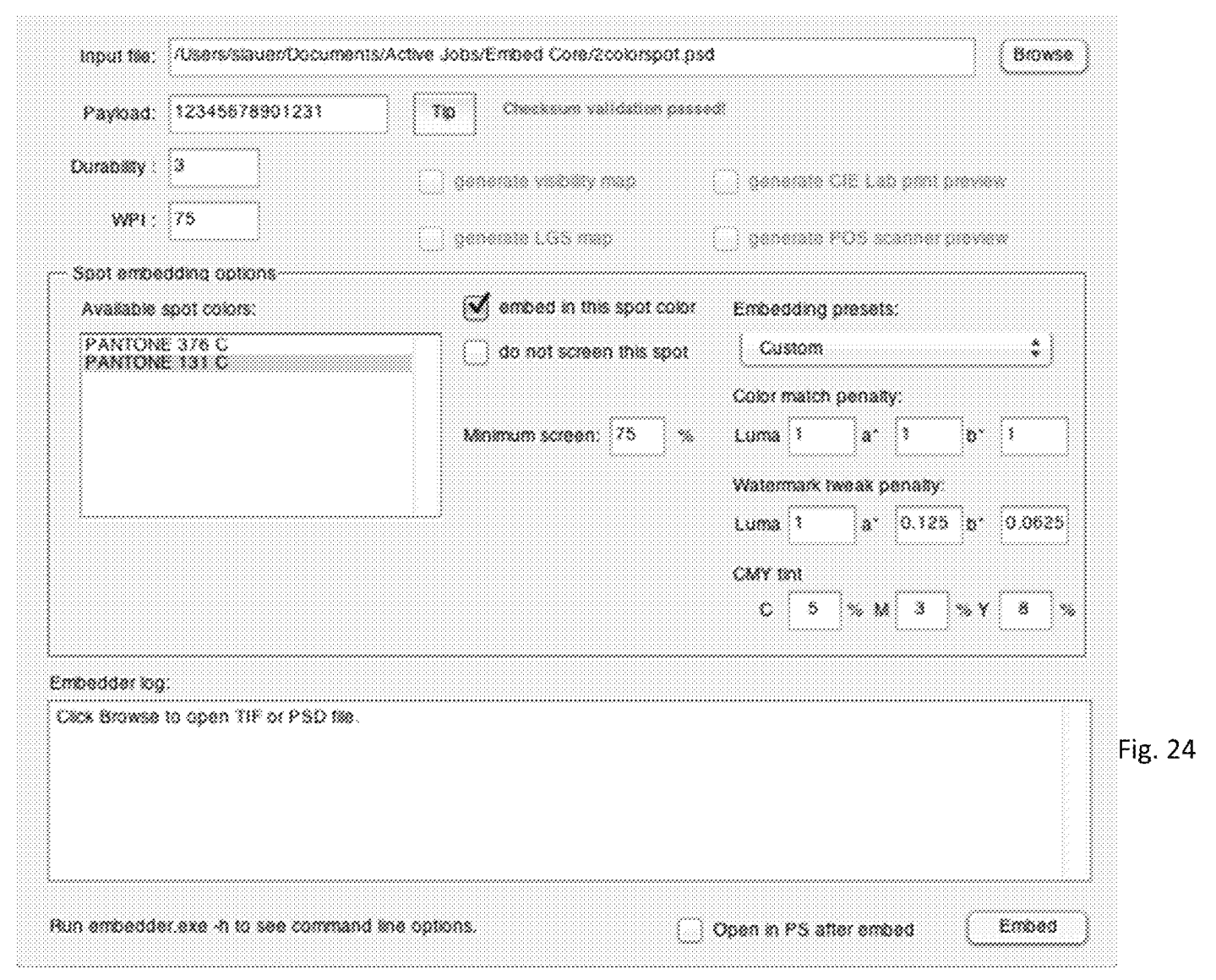

An example plugin user interface is shown in FIG. 24. The interface can provide various tunable options and displays, e.g., names of spot colors in a particular digital image, spot color screen amount, CMY tint values, payload information (and error correction checksum data), embed initiation tab, predicted detection maps ("LGS map," which is a heat map simulation how detectable an embedded signal is to a POS scanner), a tweak penalty to adjust global visibility of an embedded signal, a color match penalty to the adjust color hue or value due to watermark signal. In many cases the plugin is automated as discussed above, and can be configured to provide a reporting screen without (or prior to) user intervention.

Instead of a plugin in, the operations and functions described herein can be directly incorporated into digital image software applications or standalone applications.

Another implementation utilizes a web or cloud-based service. The web service provides user interfaces to upload or create digital imagery corresponding to product packaging. The web or cloud-based service houses or calls libraries, programs, functions and/or routines to achieve the spot color and process color embedding, including optimization, described herein.

The image processing operations for embedding and optimization may be implemented as instructions stored in a memory and executed in a programmable computer (including both software and firmware instructions) or executed on one or more processors, implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry may operate on electronic signals, or signals in other electromagnetic forms. These signals further represent physical signals like image signals, ink values and percentages, as well as other physical signal types captured in sensors. These electromagnetic signal representations are transformed to different states as detailed above to alter or modify ink values for physical product packaging.

This formulation of the embedding problem is not limited to spot ink being overprinted by CMY inks. The same formulation can be used with any set of inks that could be overprinted in the package design. For example, two spot colors could be used to embed information signals. This technique can be used for watermarking spot colors in Extended Gamut printing processes, e.g., such as Hexachrome printing. Constraints related to additional grayscale conversion weights from Eq. (7) can also be added to consider signal strength as seen by full-color devices such as mobile phones.

III. Additional Implementations and Description

Other implementations, description and embodiments are provided below.

One alternative but related embedding technology uses a blend model taking, e.g., a 4 color SWOP profile, and creates a 5 color profile (4 SWOP colors+S1$a$) to create a 5 color search space. The search space can be searched to find an optimized solution of robustness, readability, and minimized visibility changes. (Even if a black color is not used, it can be advantageous to search across a 4 color space.)

A SWOP profile refers to a profile provided by or following a specification of the "Specifications for Web Offset Publications." The SWOP specification covers many areas related to print production, complementing, extending and limiting those in other industry standards. The specification includes (but is not limited to) the following: I) A specification for the colors of the Cyan (C), Magenta (M), Yellow (Y) and key (Black) inks used in CMYK printing. Inks conforming to the specification can be called SWOP inks. The specifications make reference to, but are not identical to, the ISO standard ISO 2846-1:2006. II) A specification for the colors of proofs produced by various technologies, so they are close representation of the SWOP inks eventually used to print. Proofs made from systems that meet these specifications may be called SWOP Proofs. III) Specifications for expected dot gain (caused by ink dots enlarging over absorbent papers). IV) Requirements for producing halftones and color separation. V) Design constraints, such as the minimum size of type which is to be printed reversed or knocked out of a background, to keep legibility.

A first approximation of a combined color (e.g., S1$a$+CMY) may use the following process:

1. a) Reduce spot color (S1) percentage to yield a screened back spot color (S1$a$). This can aid in watermark detectability by a POS scanner, and b) estimate process color percentages (e.g., a CMY combination to overlay the spot color).

2. Estimate colorimetric coefficients for composite color, e.g., % S1a+xC+yM+zY, where % is the spot color screening percentage, and x, y and z are weighting or percentage coefficients for their respective process colors.

3. Correct color coefficients for spot overprint.

4. Determine values for overprint and percent spot color.

Predicting an actual color of a spot color ink when it is overprinted with another ink(s), or vice versa, can characterize each color individually and predict the color of overprinting solids and halftones by linearly combining the reflectance of all colors. Improvements can be made to this prediction by selectively weighting the combined colors. See, e.g., Deshpande, K. and Green, P. "A simplified method of predicting the colorimetry of spot colour overprints," 18th Color Imaging Conference: Color Science and Engineering Systems, Technologies and Applications, pg. 213-216, San Antonio, USA 2010, which is hereby incorporated herein by reference in its entirety.

Figure 13:
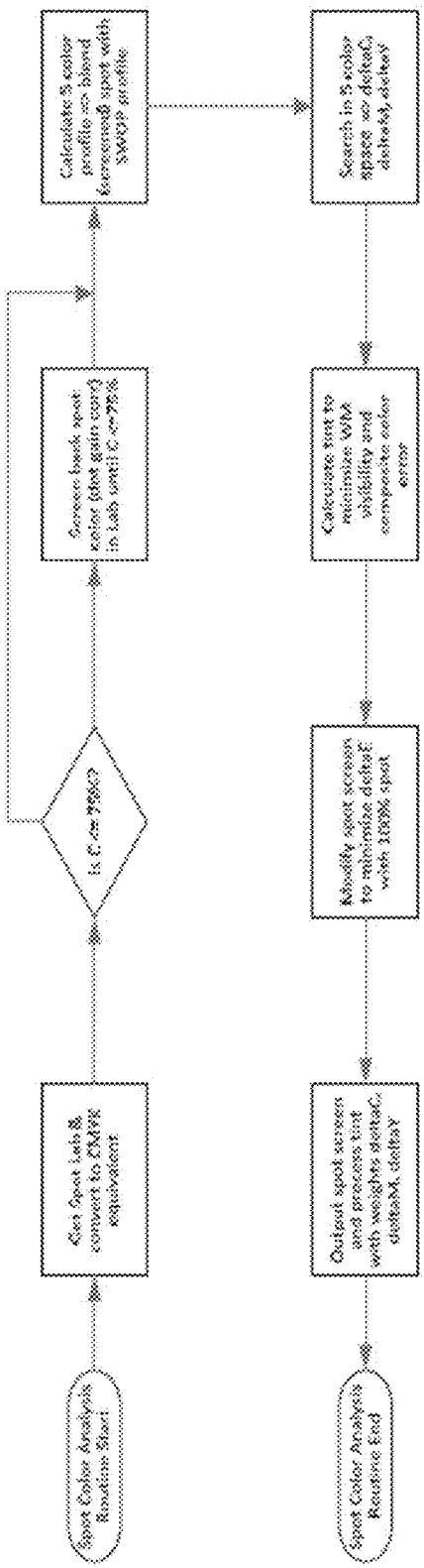
FIG. 13 is a flow diagram for a color embedding process.

FIG. 13 is a flow diagram illustrating one implementation of color blending to support digital watermarking with spot colors and process tints.

A spot color analysis starts with evaluating spot color S1. Spot color S1 can be represented in terms of its approximate Lab values, e.g., graphics software including Adobe Illustrator may include Lab libraries representing various spot colors. Ink manufactures will also likely have Lab values associated with each spot color. Once Lab values are obtained, the values can be converted to CMYK equivalents. Look up tables, data sheets, transformation equations and/or libraries can be consulted for this conversation. Of course, if CMYK values are originally available, one may be able to skip the Lab to CMYK conversion. It is then determined whether the Cyan component in the CMYK equivalent is less than or equal to 75%. If not, the spot color S1 is screened back (e.g., using dot gain correction to the Lab values) until the Cyan component is less than or equal to 75%.

Let's take a moment to discuss the focus on Cyan. Recall from above that we are contemplating use of a POS scanner with a red LED (or laser) which peaks at or around 660 nm. Cyan (like Black) has very low reflectivity at or around 660 nm.

Couple that with the spectral response of a RED LED scanner we would prefer to introduce watermark tweaks in the Cyan channel so they can be readily 'seen' with a red scanner/camera. Such a Red LED capture device is likely monochromatic. Thus, the capture device (e.g., camera) only 'sees' colors which reflect at or around 660 nm. If color strongly reflects at this wavelength the camera 'sees' white. Bright yellow, magenta, pink, orange and white are all 'seen' as white by the capture device. If color reflects 0% at this wavelength (e.g., absorbs the wavelength) the camera 'sees' black. Dark blue, Cyan, green, purple and black are all 'seen' as black by the camera.

Thus, when using a RED LED scanner, watermark detection includes a spectral dependence; successful watermark embedding, therefore, includes embedding receptive to the particular spectral dependence.

We left the FIG. 13 flow diagram discussion at screening back spot color S1 if the CMYK equivalent is not less than or equal to 75%. Recall that we are going to combine the screen backed spot color S1a with process color equivalents, with the watermark signal preferably being carried in the process colors. And, if using a red color laser or LED, we want to match the red with tweaks in Cyan so that they can be more readily seen by the capture device. So, if the spot color S1a is Cyan heavy, it may risk washing out the printed CMY. That is, the Cyan heavy S1a introduces noise such that the watermark tweaks in the underlying process colors are difficult to detect. Depending on the application and tolerance for noise, a Cyan trigger in the range of, e.g., 60-85%, can be used to decide whether to screen spot color S1.

The combined screened spot color+modulated process colors can be evaluated against the 100% spot to determine whether the combined tint has an acceptable luminance error. For example, $\Delta E76$, $\Delta E94$ and/or $\Delta E2000$ values can be calculated. If a combined tint shows a large error, then different watermark signal tweaks can be iteratively explored until and acceptable error is found. Acceptable in this context can be predetermined based on use. For example, if detection robustness is a primary concern, more watermark visibility can be tolerated.

Next, watermark tweaks are calculated for the CYM process colors. The tweaks can be represented as, e.g., magnitude changes to the determined process color percentage values. Once the tweaks are calculated, they can be used to selectively transform the process colors to convey the digital watermark signal. In some examples, determined tweaks are converted to linear RGB, and scaled for underlying spot reflectivity in linear RGB. These scaled values are converted back to CMY as embedding magnitudes or weights for magnitudes.

Figure 14:
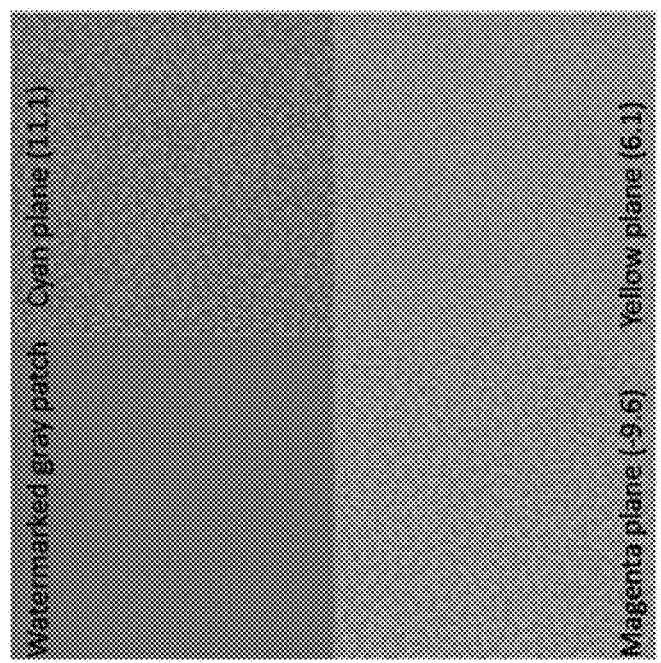
FIG. 14 show a watermarked gray patch (top left), watermark tweaks in a Cyan plane (top right, with a value of 11.1), watermark tweaks in a Magenta plane (bottom, left, value of −9.6), and watermark tweaks in a Yellow plane (bottom right, value of 6.1)

We have discussed a spectral dependency when reading watermarking with, e.g., a red LED capture device/camera. But using such a narrow band illumination leaves a lot of watermark signal unusable by a detector. Recall from above that watermark tweaks in cyan (and yellow) are offset with magenta changes having opposite polarity. This helps reduce watermark visibility by keeping luminance changes at a minimum. For example, a monochrome perspective (e.g., an ink view) of a Cyan plane, a Magenta plane and a Yellow plane are shown with relative magnitude tweak changes in FIG. 14. When the C, M and Y planes are superimposed in print (top left patch), luminance change attributable to the watermarking tweaks is reduced.

But, if captured with a red LED scanner/camera, only the cyan tweaks are seen for watermark reading purposes. Watermark signal per unit visibility can be increased by using, e.g., 2 or more color illuminations. For example, with reference to FIG. 15, relative signal standard deviation is increased (see middle bar) when illuminating with both a red and blue LED (with a monochrome sensor), and further increases when illuminating with a white light LED and capturing with RGB sensors (right bar). Cyan plane is seen by red LED scanner/sensor, magenta by green LED scanner/sensor and yellow by blue LED scanner/sensor.

Figure 16:
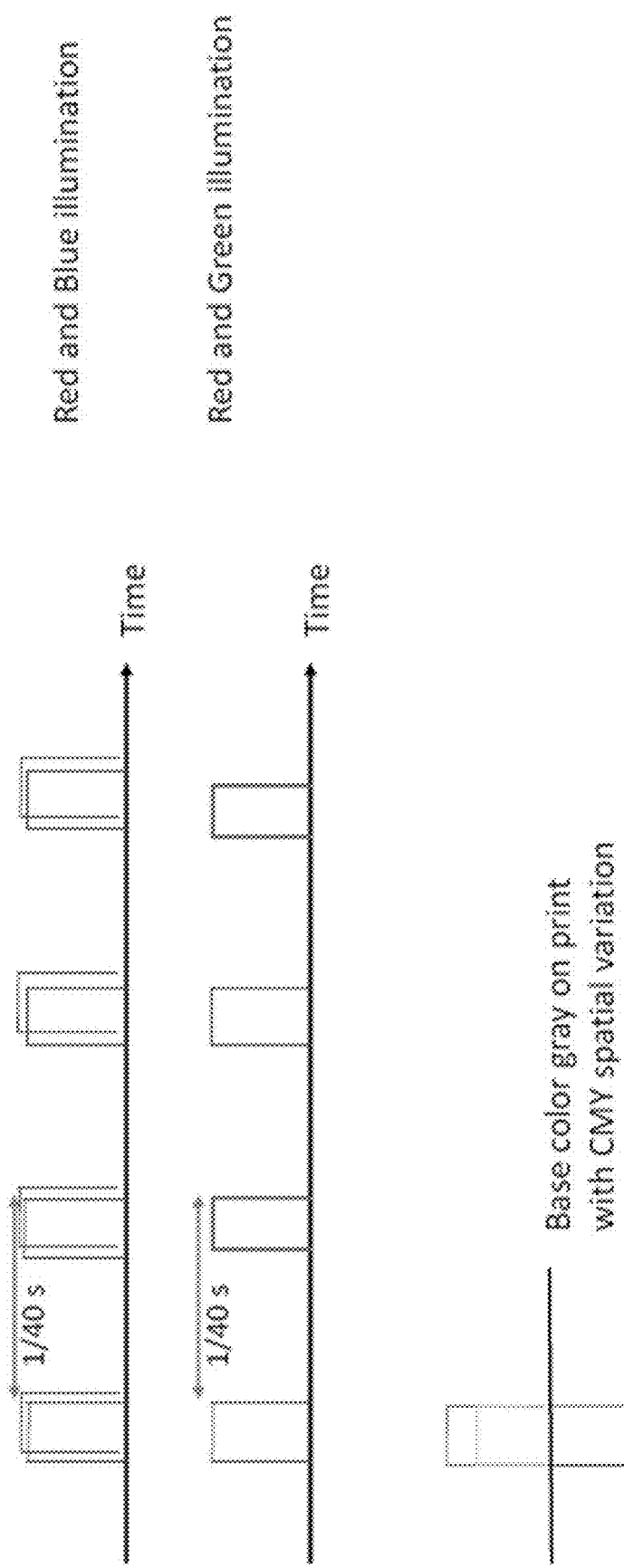
FIG. 16 shows relative illumination timing.

With reference to FIG. 16, we show relative timing with 2 color illumination with a monochromic sensor(s). Illumination with Red and Green LED may allow for better capture and timing. For example, if using only 1 monochromic sensor, the illumination of the red and green LEDs can be delayed or spaced to allow for image data corresponding to Red illumination to be captured and buffered before image data corresponding to Green illumination is captured on the same sensor. Data captured corresponding to red illumination can be combined with data captured corresponding to green illumination to bolster the hidden signal-to-noise ratio.

In other arrangements, e.g., 3 color illumination and multiple monochromatic sensors, each sensor includes its own particular color filter. For example, each sensor includes a particular filter so that it can see Cyan, Magenta or Yellow. Information from these sensors can be combined to further increase signal strength prior to embedding.

Flexo prints are sometimes used for plastics and foils, including those used in the food industry. This type of printing often is difficult when trying to introduce fine ink percentage changes (e.g., for watermarking), or to achieve close plate color registration. This type of printing typically uses spot colors, and typically not process color inks due to the large screen size.

Some of the above implementations utilize process colors+screened spot color, with a watermark signal conveyed by modulating the process colors. Since flexo printing does not typically include process colors, a different approach can be employed.

Figure 19:
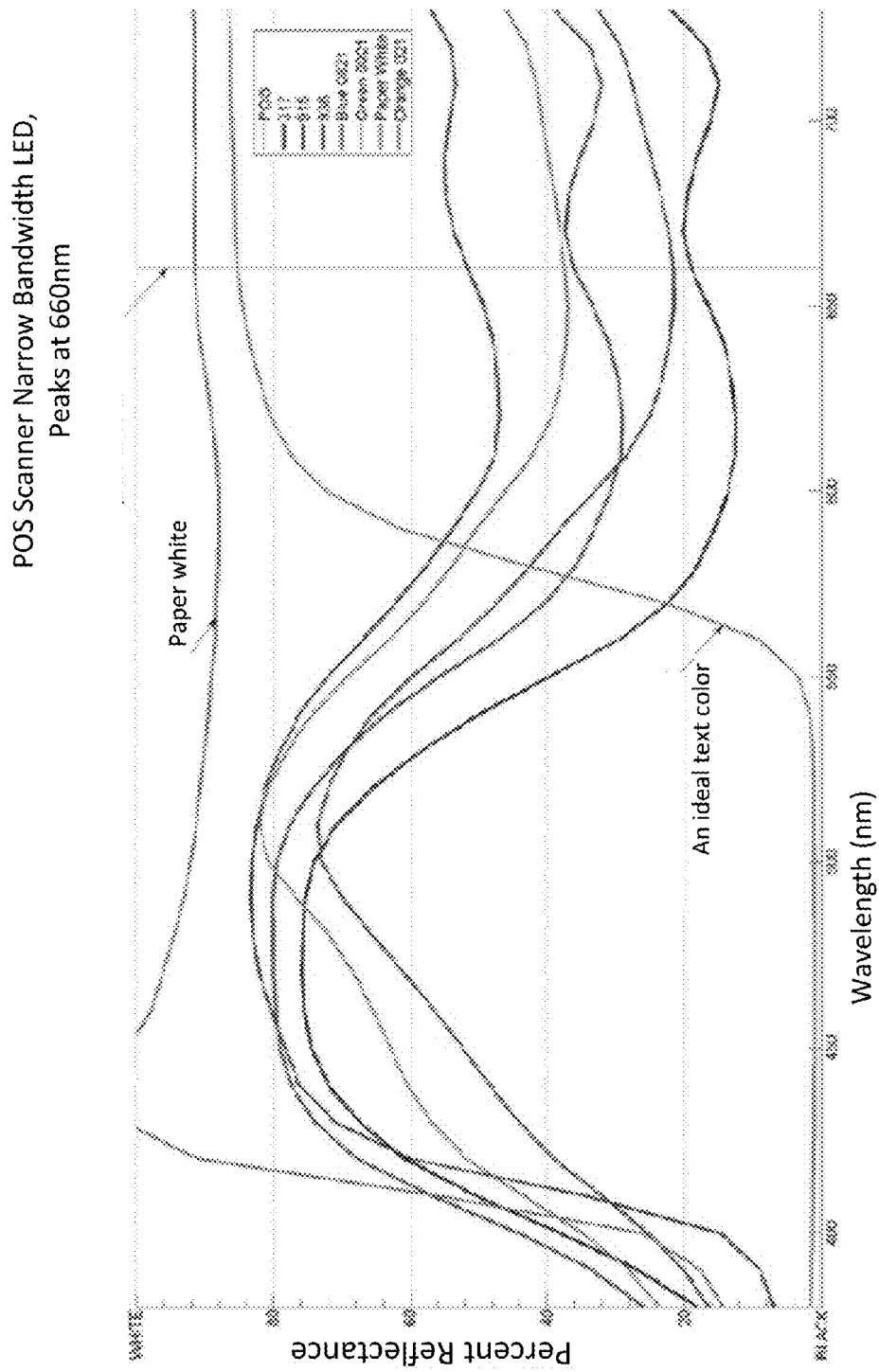
FIG. 19 is a graph showing percent reflectance at different wavelengths for various colors.

One such approach combines a flexo spot color, perhaps even a screened version of such, and combines with an additional spot color which is preferably light, has high reflectance at all wavelengths except at or around 660 nm, and potentially another area. FIGS. 17, 18 and 19 show some potential candidates for the additional spot color including cyans, greens, and purples. The original spot color is modulated with tweaks to convey a watermark signal, which can have a luminance offset from the additional spot color.

Some criteria for selecting suitable overprint spot colors may include:

(if using a red LED scanner) reflectance between 50%-80% at 660 nm; CIE L* between 82-90; and are a representative color in every CIE hue 18 degree increments/20 colors total in first investigation.

Another approach pairs spot colors. For example, given a spot color, two (2) different spot colors which can be each modulated to include a digital watermark signal are identified. The modulated 2 different spot colors when combined are visually a close approximation of the original spot color.

Figure 36:
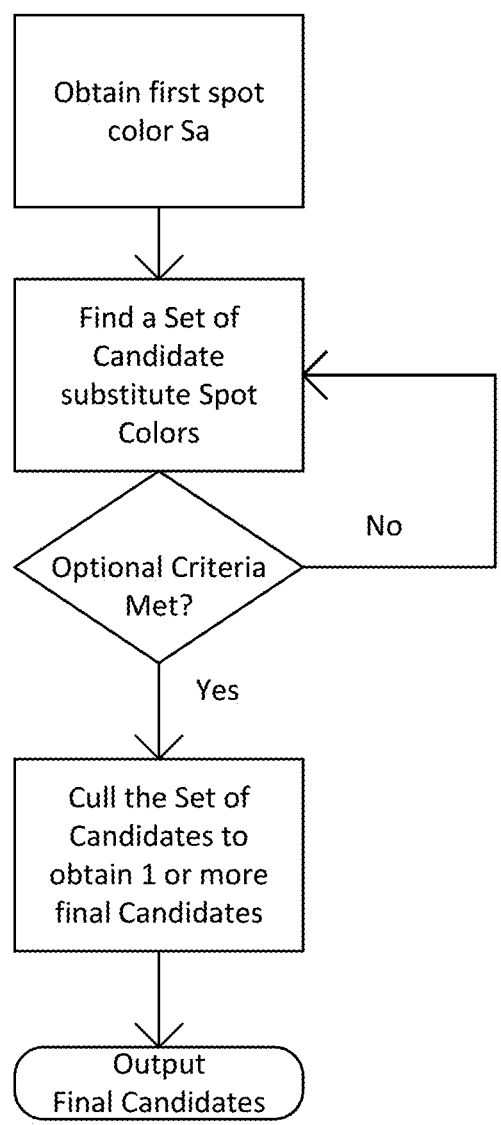
FIG. 36 is a flow diagram for obtaining one or more substitute spot colors.

With reference to FIG. 36, still another data hiding technology involves spot color substitution. For example, instead of screening back a spot color as discussed above, a first spot color $S_a$ can be replaced or substituted with a second spot color $S_b$+an overprinted CMY(K) tint. Selecting a second spot color $S_b$ avoids changing a workflow operation to include a color screen. Sometimes controlling a screen can be tricky, including being able to obtain a precise amount of screen. Some printers lack the ability to precisely screen colors and inks. To avoid screening, the substitute second spot color $S_b$ can be printed at 100%, and then a CMY(K) overprinted tint added. The overprinted CMY(K) tint preferably conveys a digital watermark signal. The overprinted second spot color $S_b$+CMY(K) tint is preferably a close approximation to 100% of the first spot color $S_a$.

The substitution process begins by selecting one or more substitute spot colors. For example, a database including spot color information (and, e.g., corresponding Lab, CMYK and/or RGB information) can be consulted to determine a set of candidates. Candidate selection may involve finding a set of "close" spot colors relative to the first spot color $S_a$. Close may be determined, e.g., by color distances metrics, based on corresponding Lab, CMYK or RGB values, between the first spot color $S_a$ and candidate substitute spot colors. A resulting set of candidates preferably includes 2 or more substitute spot colors, e.g., 2-12 spot colors (e.g., referred to as $S_{b1}$-$S_{b12}$).

An exhaustive search may be carried out over an entire spot color library to find close candidates. For example, the 2014 version of PANTONE+coated color book includes 1,755 spot colors, and if one of them is the first spot color $S_a$, then the other 1,754 can be evaluated relative to $S_a$ (e.g., a distance metric or color error metric for each of the 1,754 spot colors relative to $S_a$). The shortest distance or lowest error metric spot colors can be included in the set of candidates. (Since the PANTONE color book is not very well organized (e.g., similar colors are not always labeled with consecutive indices), an exhaustive search can likely find potential close candidates.

For a given spot color library, the search space can be limited prior to carrying out an exhaustive search. For example, printer gamut, reflectance criteria, etc. can be used to limit or prune the search space. The candidate search can be carried out against this limited or pruned search space.

Other constraints can be optionally considered when selecting candidates. For example, only those spot colors with a higher reflectance relative to cyan (C) at a predetermined wavelength (e.g., at or around 660 nm) can be considered as viable spot color substitutes.

As another optional constraint, after creating a short list for alternate spot colors (say, e.g., 3 spot colors B, C and D are identified as potential substitutes to an original spot color A), only those with relatively higher luminance are selected. For example, the top third or half (or top 2-5) candidates in terms of luminance are maintained. Considering luminance may help keep colors vivid and avoid making them dull after swapping out the original spot color A.

Once a set of candidates (e.g., $S_{b1}$-$S_{b12}$) is selected, a corresponding CMY(K) tint can be determined for each spot color $S_{bi}$, where i is an integer, within the set of candidate spot colors (e.g., $S_{b1}$-$S_{b12}$). For example, a table or database can be consulted to find the corresponding CMY color percentages or weightings corresponding to the first spot color $S_a$. These values can be used as the tint. In another alternative, for example, and with reference to FIG. 7, a candidate spot color $S_{bi}$ can be used instead of the 75% screened spot color (2). A color match error $E_{CM}$ between the $S_{bi}$+tint and the first spot color $S_a$ can be minimized in determining an optimal CMY tint for that particular $S_{bi}$. In alternative implementations, the optimization process discussed above with respect to Eq. 9 can be carried out with each $S_{bi}$ (instead of a spot color screen) to find an optimized $E_{CM}$ and $E_{WM}$ (watermark error). The resulting CMY tint as modulated by the watermark tile can be used in further evaluation.

Once a CMY tint is selected for each $S_{bi}$, one (1) or more final candidates are selected. For example, a digital simulation of the $S_{bi}$+overprinted CMY tint can be analyzed and compared to the first spot color $S_a$. Final candidates may include those with the smallest Lab distance or Chroma distance. For the Lab distance, and for $(L_1^*, a_1^*, b_1^*)$ and $(L_2^*, a_2^*, b_2^*)$, two colors in L*a*b*:

$$\Delta E_{ab}^* = \sqrt{(L_2^*-L_1^*)^2+(a_2^*-a_1^*)^2+(b_2^*-b_1^*)^2}.$$ A chroma distance may look similar, but without the first $(L_2-L_1)^2$ term. Of course, other distance metrics can be used, e.g., ΔE94. ΔE2000.

The final candidates can be provided through a user interface for consideration by a designer for selection as a substitute of the first spot color $S_a$. In some cases the best 1-4 final candidates as determined by a Lab distance metric and the best 1-4 final candidates as determined by a Chroma distance metric are all provided to the designer. In other implementations, the closest matching $S_{bi}$+tint (in terms of smallest distance values relative to $S_a$) can be automatically selected and used as a substitute. As an optional constraint, only those $S_{bi}$+tint candidates with a smaller reflectance relative to $S_a$ at a predetermined wavelength (e.g., at or around 660 nm) can be selected as a final candidate.

Once a $S_{bi}$+CMY tint is selected, the CMY tint can be modulated with a watermark tile so as to carry a watermark signal. The $S_{bi}$+modulated tint can be then printed, e.g., on product packaging.

A related process to determine substitute or alternative spot colors is discussed with reference to FIG. 37.

1. In step 31, it is determined how much an original spot color $S_a$ should be screened back. For example, and with reference to FIG. 7, we can again look to the optimization problem of Eq. 9 where one of the optimization solutions can be an amount or percentage of the spot color $S_a$ screen. The result is a spot color screen $S_s$ that can be evaluated relative to substitute candidates. Recall from FIG. 7 that we may seek to minimize color match error (e.g., between a 100% original spot color and a screened original spot color+a CMY(K) tint) and watermark error. Other constraints may include signal strength error and a spectral dependence (e.g., at or around 660 nm).

2. In step 32, the Pantone spot color universe is examined to find 1–i (where i is an integer) candidate spot color substitutes $S_{bi}$ having: i) a low color error (or shortest distance) between the candidate substitute spot color $S_{bi}$ and the screened back version $S_s$ of the original spot color, and also ii) a candidate $S_{bi}$ with a color value that is brighter than the screened backed version $S_s$ of the original spot color. Color error or color distance metrics can be determined using, e.g., Lab distance, Chroma distance, ΔE94, ΔE2000 or CIEDE2000, etc. "Low" can be determined relative to a predetermined threshold value or by a relative evaluation, e.g., the "lowest" 1-5 substitute spot colors are selected for further evaluation. The second prong, a color value that is brighter than the screened back version $S_s$, can be viewed from a scanner's perspective, e.g., what is the substitute spot color's spectral reflectance at or around 660 nm. Generally, the bigger the brightness value is, the brighter the color is. In step 32, if the original spot color is brighter than paper white (e.g., like the florescent colors such as Pantone 804, 805 and 806) or other threshold, the process can be optionally configured to not enforce the $2^{nd}$ prong constraint of "brighter than" when searching for substitute spot color candidates.

3. In step 33, choose the top candidate $S_{b1}$ from the list of candidates $S_{bi}$ (from step 32) and determine a CMY tint such that the 100% $S_{b1}$ (i.e., not screened) plus (+) the overprinted CMY tint is close to the 100% original spot color. "Closeness" can be determined by Lab distance, Chroma distance, ΔE94, ΔE2000 or CIEDE2000, e.g., relative to a predetermined target value (e.g., at or below a JND). Of course, the target value can be above a JND in other implementations. The changing variable here is the CMY tint, since we are using 100% $S_{b1}$. Additionally, we prefer to determine color closeness for the CMY tint plus the selected substitute spot color $S_{b1}$ only; that is, prior to modulating the CMY tint to carry a watermark signal. In some case we can iteratively vary the CMY process color tint until the color error or color distance between i) a combination of a CMY color tint and the substitute spot color candidate Sb1, and ii) the spot color Sa, is minimized. In other cases, we using an optimization function to minimize error or distance.

4. In step 34, and after the amount of CMY tint has been decided, a watermark signal (e.g., with the watermark tile in FIG. 7) is used to modulate the CMY tint, while maintaining $S_{b1}$ at 100% (i.e., not screened). $S_{b1}$ and the watermarked CMY tint are combined (or they can be combined at printing).

5. As an optional step 35, repeat steps 32-34 for additional substitute spot color candidates $S_{b2}$–$S_{bi}$. While this step is optional, practice has shown that designers like to make choices.

6. In step 35, test or proof prints are printed, which includes at least one substitute spot color candidate $S_{b1}$ with its watermarked CMY tint. A final candidate can selected or approved after a visual inspection. The CMY tint and substitute spot color candidate $S_{b1}$ can be combined at printing or beforehand.

As an optional step, steps 32 and 33 are carried out while simulating printing with different substrates. Thus, the closeness determination takes into account the $S_{b1}$, CMY tint and substrate relative to the original spot color.

Added text on packaging can sometimes interfere with a watermark signal. For example, black text may been seen by a red LED camera as black (high absorption). Colors with high reflectance at the target peak scanner response can instead be used for text. Referring again to FIG. 19, orange is an ideal color for text.

Oftentimes printed packaging is applied to non-flat surfaces. For example, printed plastic foil can be shrink-wrapped on and around a container. Examples include, e.g., yogurt cups, energy drink bottles, toppings containers, etc. The plastic foil can be modeled to the container with shrink wrapping, e.g., heat wrapped. Heat wrapping introduces distortion to the printing. Distortion is modeled for printed foil intended for a yogurt cup in FIGS. 20a and 20b. Item B is a printed plastic foil pre-shrink wrap. Item A includes distortion modeling of the post shrink wrapped version of item B. In FIG. 20b, a trapezoid distortion is shown by the gridding.

One method for modeling trapezoidal distortion determines circumference points for the top and bottom of the yogurt cup. A linear transformation maps points from the top (wider) circumference into the bottom (smaller) circumference points, with transformation distortion depending on a target 3D container's shape. Of course, other 3D models can be used to estimate or predict how a watermark signal will be mapped onto a 3D object like product packaging. Such transformations can be used to pre-condition host images. For example, various 3D models are discussed, e.g., in U.S. Pat. No. 8,570,343, which is hereby incorporated herein by reference in its entirety, can be used.

Such distortion will adversely affect watermark detection. For example, a watermark may include an orientation component that can be compared against a reference template to help determine distortion of captured imagery including the orientation component. The shrink wrap process can further complicate the interpretation of the orientation and distortion.

One method addresses distortion by warping (e.g., transforming) a host image prior to watermark embedding. For example, if item B is a host image, then a transformation T1 which models expected distortion is applied to item B to yield item A. A watermark signal is embedded in image A, and then image A is inversely transformed to yield item B. The inversely transformed item B, which includes a distorted watermark signal, can then be shrink-wrapped or otherwise applied to the container (yogurt cup). The shrink wrapping introduces distortions estimated for by the transformation T1, which yields a watermark signal which is more closely aligned to the originally embedded watermark (e.g., as embedded in image A).

We designed a test to investigate whether watermark detection robustness is better if:

Image transformed T1 and then watermarked=>A

Image watermarked and then Transformed T2=>B

Figure 21:
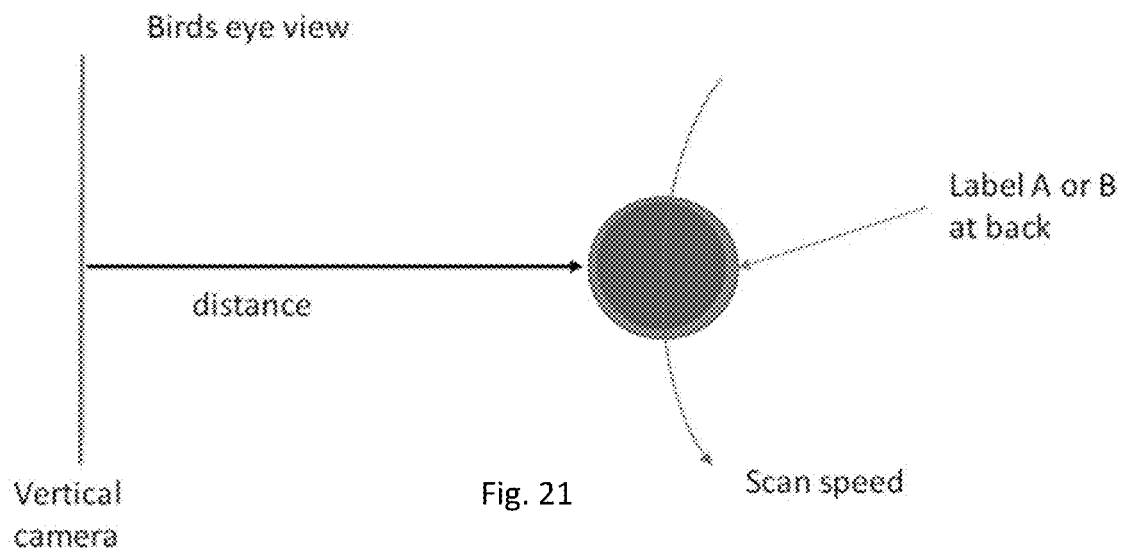
FIG. 21 is diagram showing scanning of a packaged product at different scanning speeds.
Figure 22:
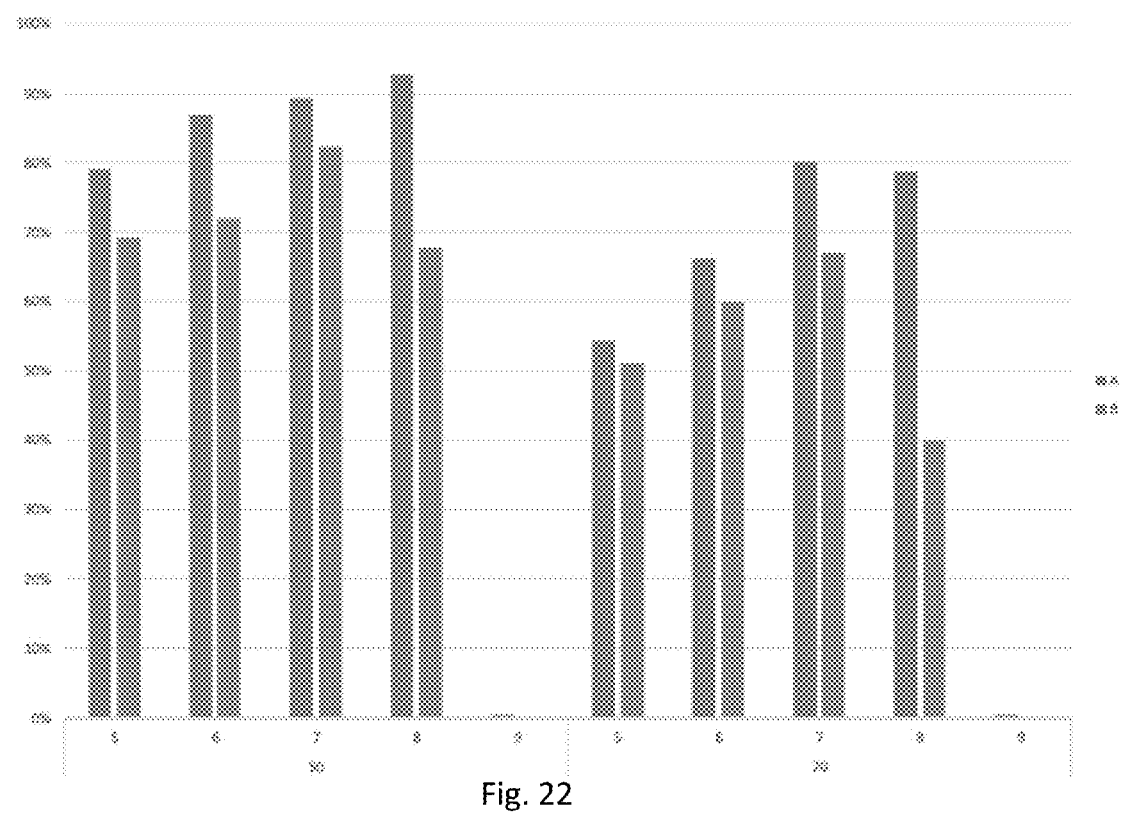
FIG. 22 is a bar chart showing percentage of successful watermark detections at different watermark resolutions (50 & 70 watermark per inch) and increasing scanning speeds/ inch in a simulated test.

In this test we simulated a marked yogurt cup moving parallel to a red LED scanner bed about ¼" above a bottom scanner to simulate a checker scanning the yogurt cup. The cup was simulated by two different A & B printed graphic on a paper substrate, and then wrapped around a yogurt container. The simulated cup is then passed in front of a vertical camera at various speeds as shown in FIG. 21. The results are shown in FIG. 22, where percentage of successful watermark detections at different watermark resolutions (50 & 70 watermark per inch) and increasing scanning speeds/ inch is shown. At each tested scanning speed, the watermark was detected with a higher percentage when embedded after image transformation (B).

In assignee's U.S. Provisional Patent Application Nos. 60/032,077, filed Aug. 1, 2014, and 62/102,270, filed January 12, each of which is hereby incorporated herein by reference, we discussed various digital watermarking embedding Workflow Processes.

Figure 23:
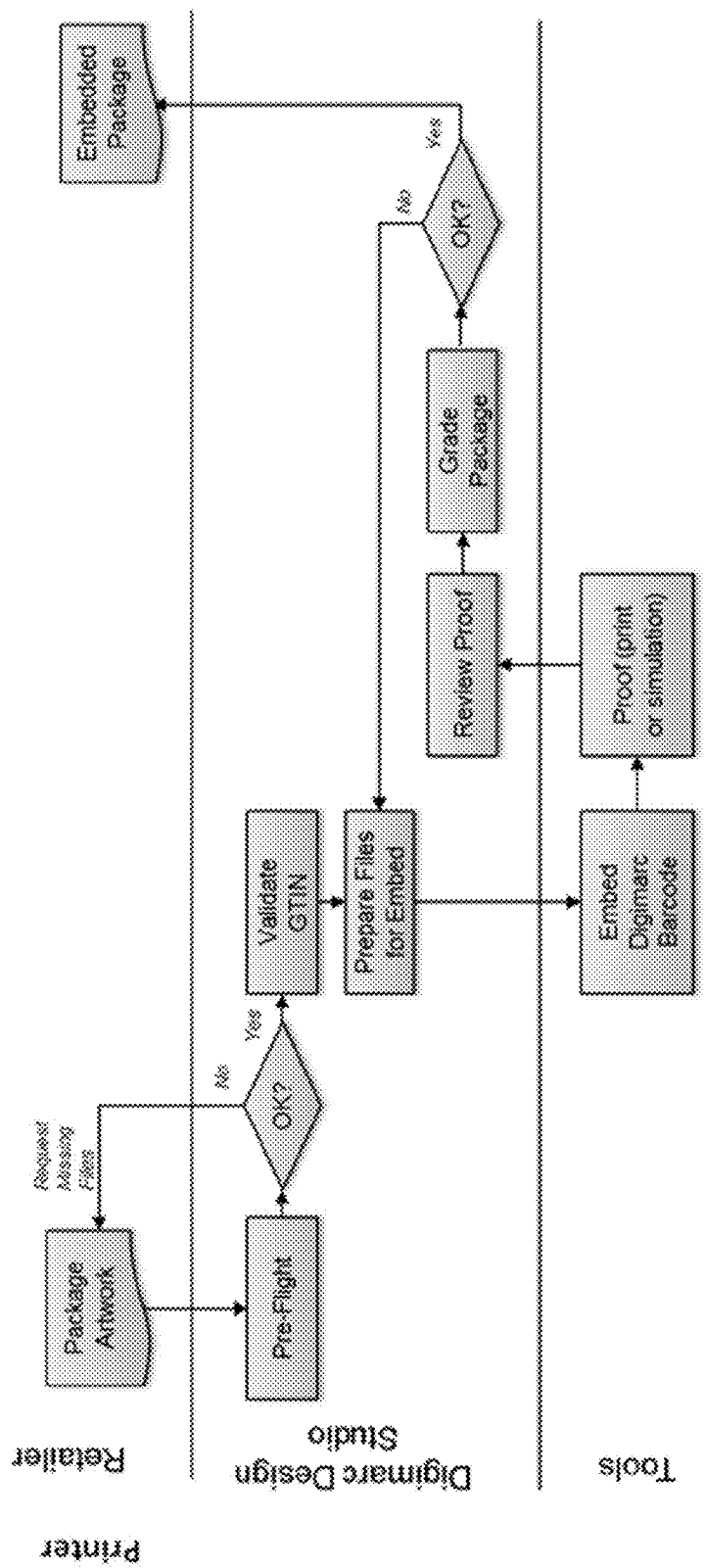
FIG. 23 is a flow diagram for a package design and data hiding work flow.

A related process may include one or more of the following processes, with general reference to FIG. 23:

1) Receive digital package files from, e.g., via a secure FTP.

2) Pre-Flight to determine that we have all info. Pre-flight is a term used to describe a preliminary step that evaluates received information, and may include reformatting, decompressing files, and an overall evaluation whether the received digital page files can be assembled into a printable package. Package artwork is typically represented by a collection of files in a variety of different formats e.g., Bitmaps (*.tiff, *.psd, etc.), vector imagery (*.ps, *.ai, etc.), and fonts (*.abf, *.ttf, etc.). A final rendered packaged can be "built" using the aforementioned files using a variety of different strategies, from a 1-layer bitmap to numerous layers of vector and bitmap imagery utilizing multiple fonts.

3) Enter Package/Retailer/Printer/Supplier in CRM system, e.g., Microsoft Dynamics CRM (not shown). Optionally, the materials may include an XML file which can be used to automatically enter the information. In this case, a manual check will help ensure accuracy.

4) Assign to Teams. For example, different tasks can be assigned to different work stations, or to available operators. An operator queue can be examined to determine availability.

5) Create an identity file in an identity management system (e.g., housed in the cloud) and associate the GTIN. The creation and management of these services can be accomplished through a web-portal to the identity management system or programmatically through Web APIs. If the packaging materials includes a barcode number, e.g., in a GTIN format, this information can be obtained and provided as a watermark payload or part of a watermark payload, or to a storage location at which a watermark will point to.

6) Review Files—Different Classifications. These classification may include assignment of package embedding difficulty. This may prompt additional resources or billing requirements.

7) Print-out Initial Client Proof.

8) EMBED Digimarc Barcode. For example, the spot color and process color embedding methods and technology disclosed herein can be employed at this step.

8a) In the digital realm, grade the embedded Digimarc Barcode. For example, watermark signal strength across the package can be assigned values, and based on corresponding reads for the values a grade can be assigned per package side or area.

9) Print Watermarked Proof

10) Test on POS Scanner. This is a preliminary test to see if the proof will read.

11) Assemble Package for Manual Test

12) Manual Test. This can be a detailed process, where each package face is tested, e.g., at different reading angles. For example, each side is tested on a POS scanner with a vertical camera and a horizontal camera. The package is passed over the scanner, e.g., 2, 4 or 8 times per side and then number of reads is recorded. The side is rotated, e.g., 90 degrees and the process is repeated for that side, rotated again and retested, etc. Each package side can be so tested and the results recorded. A grade can be assigned based on successful reads. Of course, the process is benefited from automation where a package is passed in front of a scanner, e.g., with a robot arm, conveyor belt or some other movement mechanism.

13) Complete QC Checklist 13a) compare results of digital grade and manual grade; decide whether to accept or refine embedded package.

14) Send Approved file to Customer via FTP

IV. Implementations of Adaptive Embedding Framework

One goal of a color visibility model is to create an objective visual degradation model due to digital watermarking of an image. For example, a model may predict how noticeable or visible image changes will be due to watermark insertion. Highly noticeable changes can be reduced or modified to reduce watermark visibility, and/or to create equal watermark visibility (or lack thereof) across an image. For example, an error metric above or relative to the standard "Just Noticeable Difference" (JND) can be used to determine noticeable changes.

Figure 25:
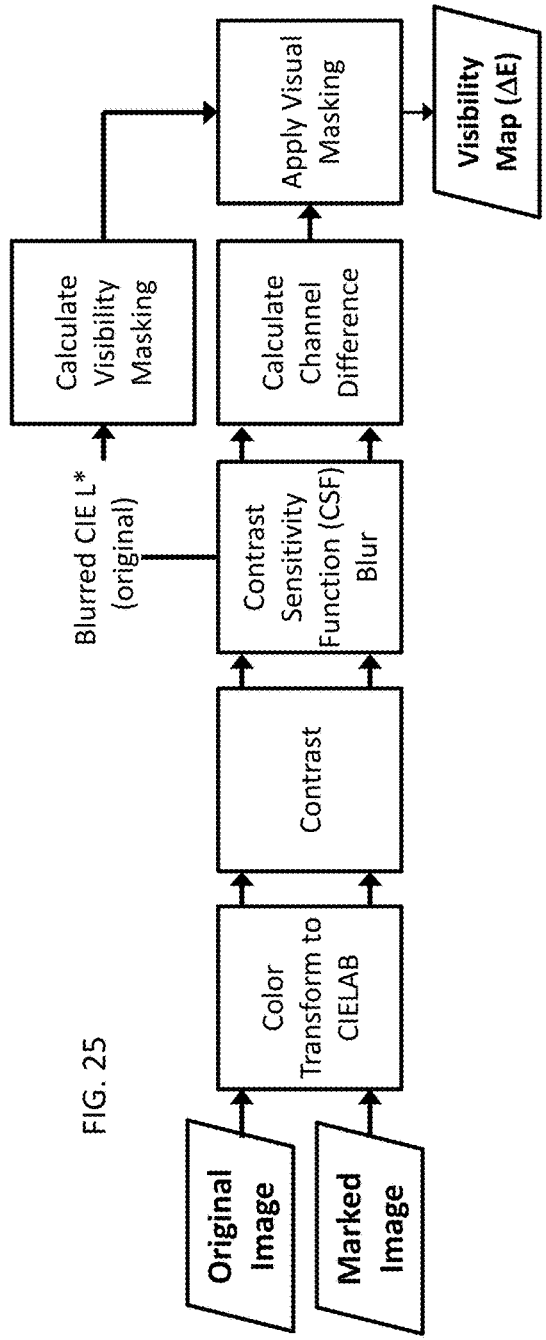
FIG. 25 is a block diagram for a color visibility model.

In a first implementation, with reference to FIG. 25, a digital watermarked image is compared to a processed version of an original image to determine a visibility map. The visibility map can be used to weight watermark embedding of the original image, e.g., to reduce watermark strength in high visibility areas. The process starts with conversion of an original image into the so-call CIELAB space, resulting in L*, a* and b* color representations. As mentioned above, the L* coordinate represents the perceived lightness or luminance, an L* value of 0 indicates black and a value of 100 indicates white. The CIE a* coordinate position goes between "redness" (positive) and "greenness" (negative), while the CIE b* goes between "yellowness" (positive) and "blueness" (negative). The original image is digitally watermarked and then converted into the CIELAB space. For example, the watermarking for this initial process may use a uniform embedding strength across the entire image.

Contrast between the original image and the marked image can be determined, and then contrast sensitivity functions (CSFs) can be applied to each of the L*, a* and b* channels. For example, the L* CSFs discussed in Daly, "Visible differences predictor: an algorithm for the assessment of image fidelity," F. L. van Nes et al. "Spatial Modulation Transfer in the Human Eye," J. Opt. Soc. Am., Vol. 57, Issue 3, pp. 401-406 (1967), or Johnson et al, "On Contrast Sensitivity in an Image Difference Model," PICS 2002: Image Processing, Image Quality, Image Capture Systems Conference, Portland, Oreg., April 2002; p. 18-23 (which is herein incorporated herein in its entirety), can be used. In other cases a bandpass filter, with a drop off toward low-frequencies, can be applied to the L*. The processed or blurred L* channel (from the original image) can be used to determine visibility masking. For example, areas of high contrast, edges, features, high variance areas, can be identified for inclusion of more or less watermarking strength. Some areas (e.g., flat area, edges, etc.) can be entirely masked out to avoid watermarking all together.

For the a* and b* channels, chrominance CSFs can be applied to the respective channels, e.g., such CSFs as discussed in Johnson et al, "Darwinism of Color Image Difference Models;" G. J. C. van der Horst et al., "Spatiotemporal chromaticity discrimination," J. Opt. Soc. Am., 59(11), 1482-1488, 1969; E. M. Granger et al., "Visual chromaticity modulation transfer function," J. Opt. Soc. Am., 63(9), 73-74, 1973; K. T. Mullen, "The contrast sensitivity of human colour vision to red-green and blue-yellow chromatic gratings," J. Physiol., 359, 381-400, 1985; each of which are hereby incorporated herein by reference in their entirety. In other cases, a low-pass filter is used which has a lower cut-off frequency relative to the CSF of luminance.

Channel error difference can then be determined or calculated. For example, on a per pixel basis, L*, a* and b* data from the original image are compared to the blurred (e.g., processed with respective CSFs) L*, a* and b*channels from the watermarked image. One comparison utilizes $\Delta E_{76}$: Using $(L_1^*, a_1^*, b_1^*)$ and $(L_2^*, a_2^*, b_2^*)$, two colors in L*a*b*, the error between two corresponding pixel values is:

$$\Delta E_{ab}^* = \sqrt{(L_2^* - L_1^*)^2 + (a_2^* - a_1^*)^2 + (b_2^* - b_1^*)^2},$$

where $\Delta E_{ab}^* \approx 2.3$ corresponds to a JND (just noticeable difference). Other comparisons may utilize, e.g., $\Delta E_{94}$ or $\Delta E_{2000}$.

Of course, and more preferably used, is an error determination for the blurred (CSF processed) L*a*b* from the original image and the CSF blurred L*a*b* from the watermarked image.

The output of the Calculate Channel Difference module identifies error metrics. The error metrics can be used to identify image areas likely to include high visibility due to the inserted digital watermark signal. We sometimes refer to this output as an "error map". Typically, the lower the error, the less visible the watermark is at a particular area, image blocks or even down to a signal pixel.

The visibility mask and the error map can be cooperatively utilized to guide digital watermarking. For example, watermark signal gain can be varied locally according to the error map, and areas not conducive to receive digital watermark, as identified in the visibility mask, can altogether be avoided or receive a further signal reduction.

Figure 26:
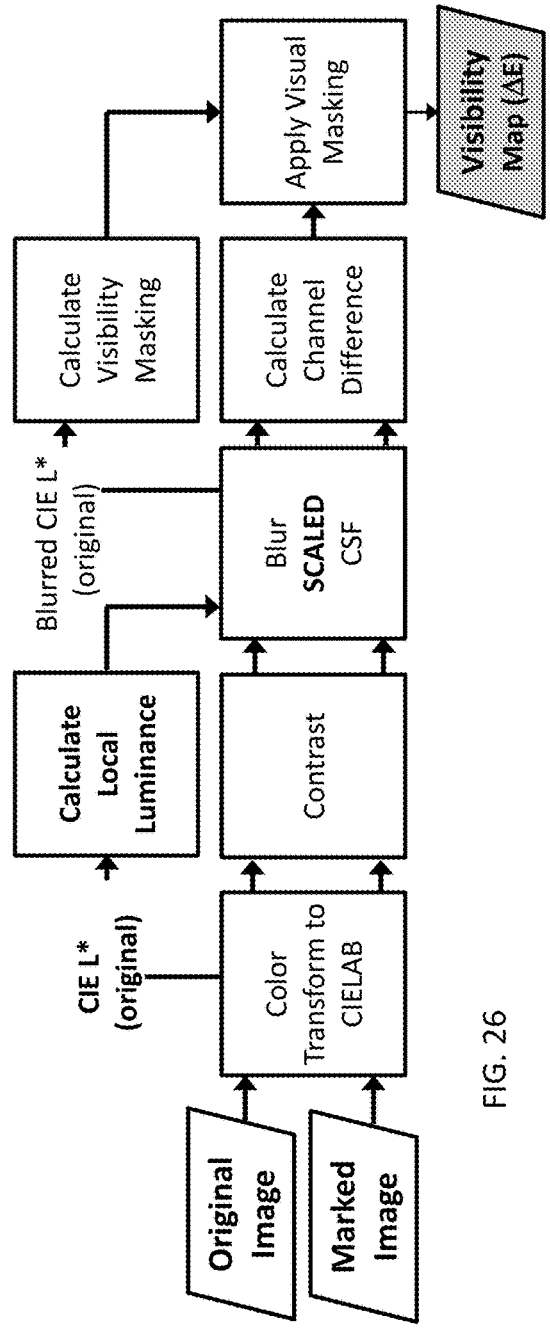
FIG. 26 is a block diagram for a color visibility model with CSFs varied according to image local luminance.

One limitation of the FIG. 25 model is that it does not take into account local luminance influences for Contrast Sensitivity Functions (CSF), particularly for the a* and b* chrominance channels. With reference to FIG. 26, we propose a color visibility model for use with a digital watermark embedder that seeks equal visibility across an image by locally varying watermarking embedding strength based on predicted visibility influenced, e.g., by local image luminance. A CSF for each color channel can be varied spatially depending on the luminance of the local image content.

The luminance content of the original image provides potential masking of changes due to watermarking in chrominance as well as luminance. For example, where a watermark signal comprises mostly high frequency components, the masking potential of the original image is greater at regions with high frequency content. We observe that most high frequency content in a typical host image is in the luminance channel. Thus, the luminance content of the host is the dominant contributor to masking potential for luminance changes and chrominance changes for high frequency components of the watermark signal.

Returning to FIG. 26, we may add several modules relative to the FIG. 25 system, e.g., "Calculate Local Luminance" and "blur SCALED CSF" modules. The FIG. 26 visibility model system uses separate CSFs for contrast variations in luminance and chrominance (red-green and blue-yellow) channels. The width, characteristics or curve of the CSF in each channel can be scaled or modified depending on the luminance of the local image content. For example, for a given pixel, local luminance in a neighborhood around the pixel can be evaluated to determine a local brightness value. The local brightness value can be used to scale or modified a CSF curve. The neighborhood may include, e.g., 4, 8 or more pixels. In some cases, the CSF is adjusted so that more blurring occurs as the luminance of the local region decreases. The error difference between the contrast of the blurred (or unblurred) original and the blurred marked image can be measured using a color difference metric, e.g., $\Delta E76$, $\Delta E94$ or $\Delta E2000$.

Figure 27A:
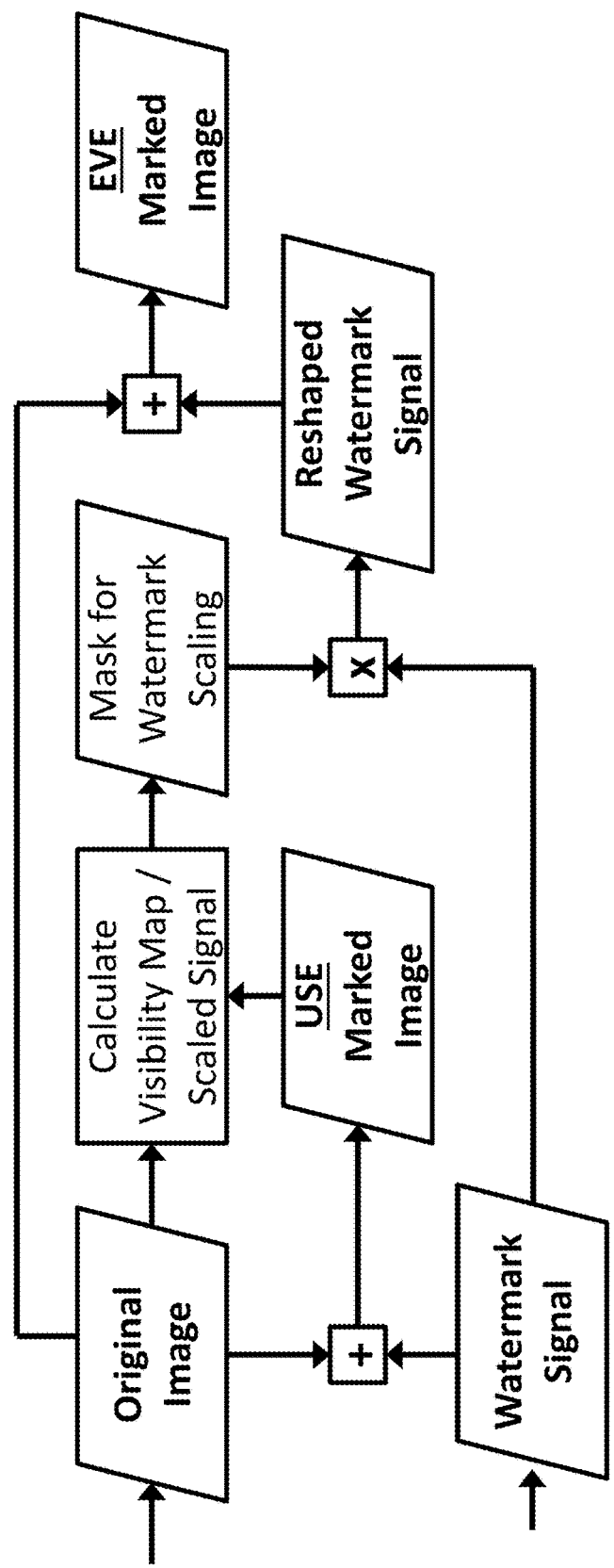
FIG. 27a is a block diagram for a color visibility model to achieve equal visibility embedding (EVE).

With reference to FIG. 27a, one objective may include embedding digital watermarking into images with equal visibility. That is, the image includes watermarking embedded therein at different signal strength values to achieve uniform or equal visibility. During the embedding stage, the visibility model can predict the visibility of the watermark signal and then adjust the embedding strength. The result will be an embedded image with a uniform watermark signal visibility, with the embedding strength varying locally across the image depending on characteristics of the cover image's content. For example, a visibility map generated from the FIG. 26 system is used to reshape (e.g., locally scale according to an error map and/or mask embedding or avoidance areas according to a visibility map) a watermark signal. The original signal is then embedded with the reshaped watermark signal to create an equal visibility embedded (EVE) image. In such a case, the watermark signal locally varies to achieve an overall equal visibility.

Figure 27B:
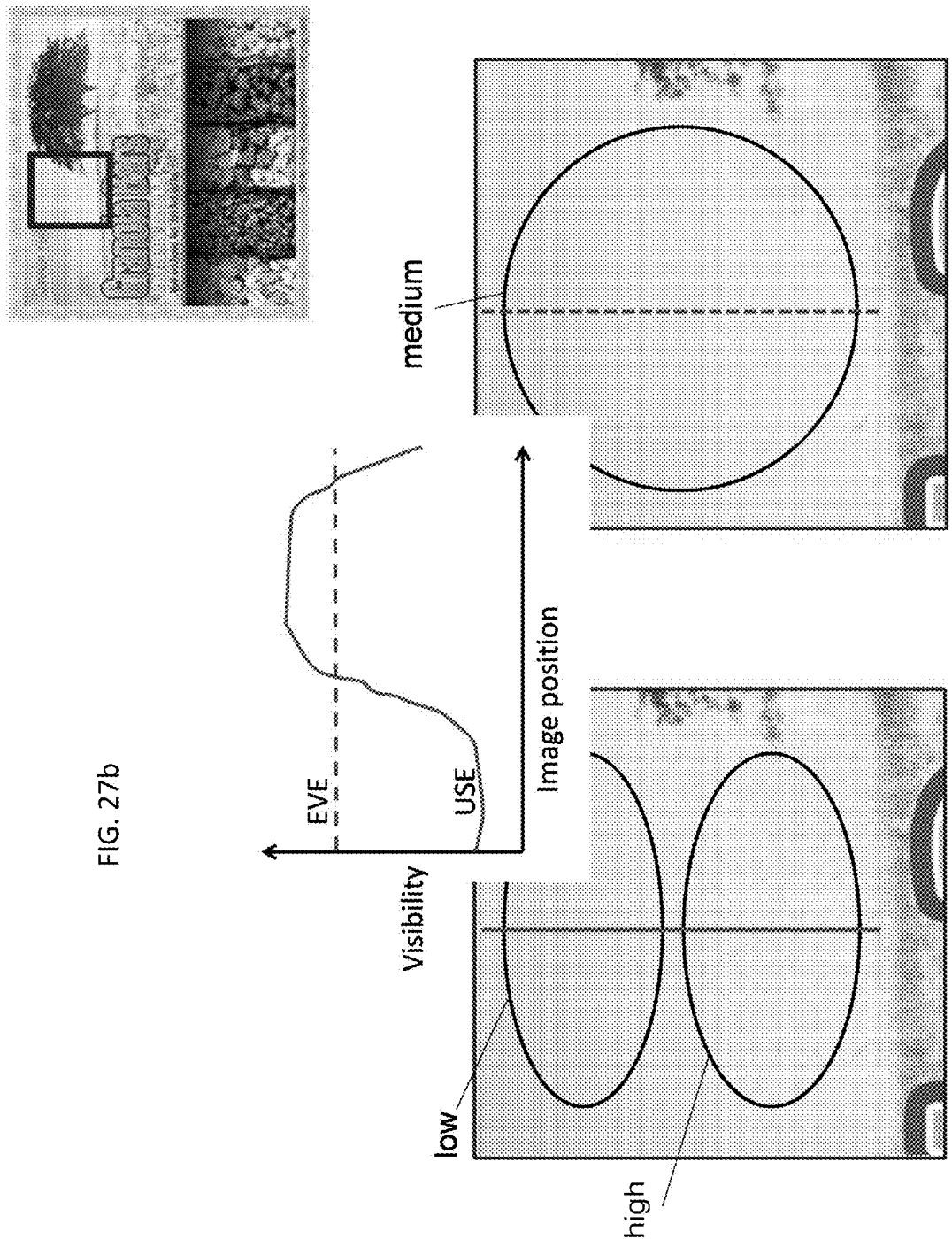
FIG. 27b is a diagram showing EVE embedding compared to uniform embedding.

Some visibility advantages of EVE vs. uniform strength embedding (USE) are shown in FIG. 27b. The visibility of the USE varies from area to area, as see in the bottom left image. In comparison, when embedding the same image area with EVE (bottom right image), the watermark visibility appears equal. The bottom left and right images represent the same image area highlighted in blue in the upper right image.

An additional implementation involving CSFs modified to consider local luminance is discussed below.

In image fidelity measures, the CSF is commonly used as a linear filter to normalize spatial frequencies such that they have perceptually equal contrast thresholds. This can be described by the following shift invariant convolution:

$$\tilde{f}(x, y) = h(x, y) * f(x, y) = \sum_m \sum_n h(m, n) f(x - m, y - n), \quad (10)$$

where f(x,y) is an input image, h(x,y) is the spatial domain CSF, and f̃(x,y) is the frequency normalized output image.

For a luminance dependent CSF model, we allow the CSF to vary spatially according to the local luminance of the image, e.g.:

$$\tilde{f}(x, y) = \sum_m \sum_n h(m, n; x, y) f(x - m, y - n). \quad (11)$$

Since evaluating this shift variant convolution directly can be computationally expensive, in some implementations we seek an approximation that can be more computationally efficient. The use of image pyramids for fast image filtering is well-established. An image pyramid can be constructed as a set of low-pass filtered and down-sampled images $f_l(x,y)$, typically defined recursively as follows:

$$f_0(x, y) = f(x, y) \tag{12}$$

and $$f_l(x, y) = \sum_m \sum_n h_0(m, n) f_{l-1}(2x - m, 2y - n) \tag{13}$$

for l>0 and generating kernel $h_0(m,n)$. It is easily shown from this definition that each level $f_l(x,y)$ of an image pyramid can also be constructed iteratively by convolving the input image with a corresponding effective kernel $h_l(m, n)$ and down-sampling directly to the resolution of the level, as follows:

$$f_l(x, y) = \sum_m \sum_n h_l(m, n) f_0(2^l x - m, 2^l y - n), \tag{14}$$

where $h_l(m,n)$ is an l-repeated convolution of $h_0(m,n)$ with itself.

For image filtering, the various levels of an image pyramid can be used to construct basis images of a linear decomposition representing the point-spread response of the desired filtering, e.g.:

$$\tilde{f}(x, y) = \sum_l a_l \tilde{f}_l(x, y), \tag{15}$$

where $a_l$ is the coefficient of the basis function $\tilde{f}_l(x,y)$ obtained by up-sampling the corresponding pyramid level $f_l(x,y)$ back to the base resolution.

We can use the effective convolution kernel $h_l(x,y)$ as an interpolating kernel, e.g., $$\tilde{f}_l(x, y) = 4^l \sum_m \sum_n h_l(x - 2^l m, y - 2^l n) f_l(m, n), \tag{16}$$

such that each basis function $\tilde{f}_l(x,y)$ can be described by a simple shift-invariant convolution of the input image with a composite kernel $\tilde{h}_l(x,y)$:

$$\tilde{f}_l(x,y) = \tilde{h}_l(x,y) * f(x,y), \tag{17}$$

where $\tilde{h}_l(x,y) = h_l(x,y) * h_z(x,y)$. Thus, considering Eq. (15), we assert that the optimal representation is obtained by minimizing the sum of the squared error between the desired CSF and the Gaussian representation; e.g., $$a = \underset{a}{\operatorname{argmin}} E, \tag{18}$$

where $$E = \sum_x \sum_y \left( h(x, y) - \sum_l a_l \tilde{h}_l(x, y) \right)^2, \tag{19}$$

and $a=[a_1, a_2, \ldots]$. A linear least-squares problem, which can be solved using software packages such as, e.g., Matlab® or GNU Octave, can be utilized to solve equation 18. Further, the optimization can be pre-calculated for each local luminance of interest and stored in a look-up table, noting that for one example application each coefficient $a_l$ is spatially varying according to the local luminance level $L_f = L_f(x,y)$ of $f(x,y)$, i.e., $a_l = a_l(L_f) = a_l(L_f(x,y))$.

While the development of our approach has been conducted for a basis image at the resolution of an input image, our methods can be conducted within a multi-resolution scheme, reducing the calculation of the spatially variant convolution into a pyramid reconstruction with spatially variant analysis coefficients.

Results and examples varying a CSF in each channel depending on the luminance of the local image content is described in Appendix B, included as part of this specification, and which is hereby incorporated herein by reference in its entirety.

The following documents are hereby incorporated herein by reference: Lyons, et al. "Geometric chrominance watermark embed for spot color," Proc. Of SPIE, vol. 8664, Imaging and Printing in a Web 2.0 World IV, 2013; Zhang et al. "A spatial extension of CIELAB for digital color-image reproduction" Journal of the Society for Information Display 5.1 (1997): 61-63; Van Nes et al. "Spatial modulation transfer in the human eye," Journal of Optical Society of America, vol. 57, issue 3, pp. 401-406, 1967; Van der Horst et al. "Spatiotemporal chromaticity discrimination," Journal of Optical Society of America, vol. 59, issue 11, 1969; and Watson, "DCTune," Society for information display digest of technical papers XXIV, pp. 946-949, 1993.

In some cases, even better results can be achieved by combining an attention model with our above visibility model when embedding watermarks in color image data. An attention model generally predicts where the human eye is drawn to when viewing an image. For example, the eye may seek out flesh tone colors and sharp contrast areas. One example attention model is described in Itti et al., "A Model of Saliency-Based Visual Attention for Rapid Scene Analysis," IEEE TRANSACTIONS ON PATTERN ANALYSIS AND MACHINE INTELLIGENCE, VOL. 20, NO. 11, NOVEMBER 1998, pgs. 1254-1259, which is hereby incorporated herein by reference. High visual traffic areas identified by the attention model, which would otherwise be embedded with a relatively strong or equal watermark signal, can be avoided or minimized by a digital watermark embedder.

Disclosure from Appendix B is provided below:
Full-Color Visibility Model Using CSF which Varies Spatially with Local Luminance Abstract:

A full color visibility model has been developed that uses separate contrast sensitivity functions (CSFs) for contrast variations in luminance and chrominance (red-green and blue-yellow) channels. The width of the CSF in each channel is varied spatially depending on the luminance of the local image content. The CSF is adjusted so that more blurring occurs as the luminance of the local region decreases. The difference between the contrast of the blurred original and marked image is measured using a color difference metric.

This spatially varying CSF performed better than a fixed CSF in the visibility model, approximating subjective measurements of a set of test color patches ranked by human observers for watermark visibility. The effect of using the CIEDE2000 color difference metric compared to CIEDE1976 (i.e., a Euclidean distance in CIELAB) was also compared.

Introduction

A full color visibility model is a powerful tool to measure the visibility of the image watermark. Image watermarking is a technique that covertly embeds additional information in a cover image, such that the ownership, copyright and other details about the cover image can be communicated. Watermarks used for packaging are inserted in the chrominance domain to obtain the best robustness per unit visibility. See Robert Lyons, Alastair Reed and John Stach, "Geometric chrominance watermark embed for spot color," Proc. Of SPIE, vol. 8664, Imaging and Printing in a Web 2.0 World IV, 2013. The chrominance image watermark is embedded in a way that the color component in the cover image is minimally altered and is hardly noticeable, due to human vision system's low sensitivity to color changes.

This visibility model is similar to Spatial CIELAB (S-CIELAB). See Xuemei Zhang and Brian A. Wandell, "A spatial extension of CIELAB for digital color-image reproduction" Journal of the Society for Information Display 5.1 (1997): 61-63. The accuracy of this model was tested by comparing it to subjective tests on a set of watermarked color patches. The model was found to significantly overestimate the visibility of some dark color patches. A correction was applied to the model for the variation of the human contrast sensitivity function (CSF) with luminance as described below. After luminance correction, good correlation was obtained with the subjective tests.

The luminance and chrominance CSF of the human visual system has been measured for various retinal illumination levels. The luminance CSF variation was measured by Floris L. Van Nes and Maarten Bouman, "Spatial modulation transfer in the human eye," Journal of Optical Society of America, vol. 57, issue 3, pp. 401-406, 1967 and the chrominance CSF variation by GJ Van der Horst and Maarten Bouman, "Spatiotemporal chromaticity discrimination," Journal of Optical Society of America, vol. 59, issue 11, 1969. These measurements show a variation in peak sensitivity of about a factor of 8 for luminance and 5 for chrominance over retinal illumination levels which change by about a factor of 100.

Since the retinal illumination can change by about a factor of 100 between the lightest to darkest area on a page, the CSF peak sensitivity and shape can change significantly. The function is estimated by the average local luminance on the page, and a spatially dependent CSF is applied to the image. This correction is similar to the luminance masking in adaptive image dependent compression. See GJ Van der Horst and Maarten Bouman, "Spatiotemporal chromaticity discrimination," Journal of Optical Society of America, vol. 59, issue 11, 1969.

The luminance dependent CSF performed better than a fixed CSF in the visibility model, when compared to subjective measurements of a set of test color patches ranked by human observers for watermark visibility. Results of our model with and without luminance correction are compared to S-CIELAB in Section 2, Visual Model Comparison. The method of applying a spatially dependent CSF which depends on local image luminance is described in Section 3, Pyramid Processing Method.

The visibility model is then used to embed watermark into images with equal visibility. During the embedding stage, the visibility model can predict the visibility of the watermark signal and then adjust the embedding strength. The result will be an embedded image with a uniform watermark signal visibility, with the embedding strength varying depending on the cover image's content. This method was compared to a uniform strength embed in terms of both visibility and robustness, and the results are shown in Section 4, Watermark Equal Visibility Embed.

Visual Model Comparison
Psychophysical Experiment

To test the full-color visibility model a psychophysical experiment was conducted. The percept of degradation caused by the watermark was compared to the results of the visibility model, as well as to the S-CIELAB metric.

A set of observers were asked to rate their perception of the image degradation of 20 color patch samples using a quality ruler. The quality ruler (illustrated in [FIG. 13a]) increases in watermark strength from left (B) to right (F). The color samples were viewed one at a time at a viewing distance of approximately 12 inches. The samples were presented using the Latin square design (see Geoffrey Keppel and Thomas Wickens, "Design and analysis: A researcher's handbook." Prentice Hall, pp. 381-386, 2004) to ensure a unique viewing order for each observer.

Figure 28A:
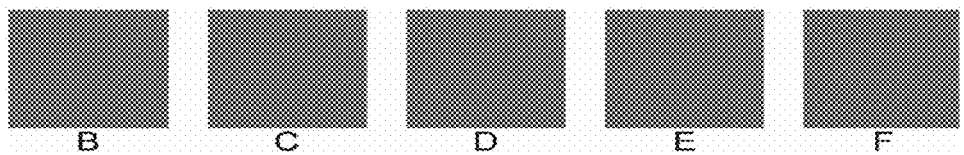
FIG. 28a corresponds to Appendix B's FIG. 1, which shows a quality ruler increasing in degradation from B (slight) to F (strong).

See [FIG. 28a] Quality ruler increasing in degradation from B (slight) to F (strong).

All 22 participants passed the Ishihara color test. There were eight female and 14 male participants, with an average age of 43. Their professions and experience varied. Four people had never participated in a visibility experiment, 12 had some experience and six had participated on several occasions.

Figure 28B:
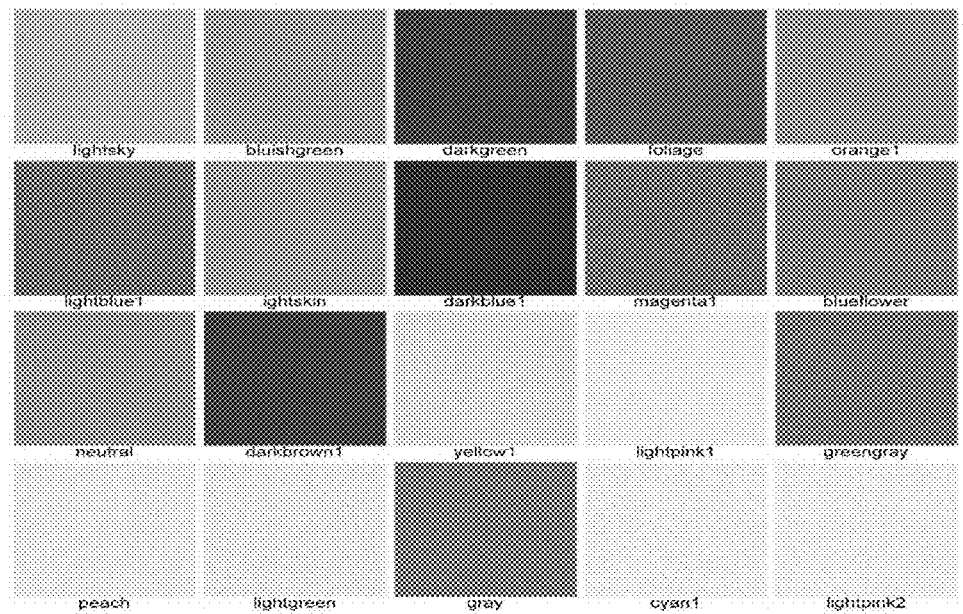
FIG. 28b corresponds to Appendix B's FIG. 2, which shows thumbnails of the 20 color patch samples with a watermark applied.

Thumbnails of the 20 color patches are illustrated in See [FIG. 28b]. The color samples were chosen largely based on the results of a previous experiment; where it was observed that the visibility model had difficulty accurately predicting the observer response with darker color patches. Additionally, one color patch had a much higher perceived and predicted degradation. Ten of the original samples were included in the second experiment. Dark patches, patches which were expected to have a higher perception of degradation and memory colors were added to complete the set of 20 patches. The experiment and the quality ruler patches were all printed with an Epson Stylus 4880 on Epson professional photo semi-gloss 16 inch paper.

See [FIG. 28b] Thumbnails of the 20 color patch samples with the watermark applied.

Figure 29:
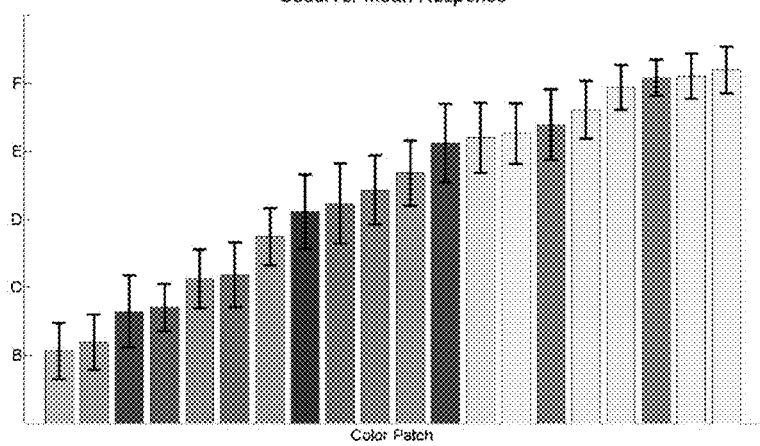
FIG. 29 corresponds to Appendix B's FIG. 3, which shows a mean observer responses with 95% confidence intervals for color patches.

The mean observer scores for the 20 color samples are plotted in See [FIG. 29]. In general the colors on the far right are lighter. As discussed in the previous experiment, the cyan1 patch was observed to have a higher level of degradation. In this second experiment, other colors with similar properties were determined to have a similarly high perception of degradation.

See [FIG. 29] The mean observer responses with 95% confidence intervals.

Validation of the Visibility Model

Figure 30:
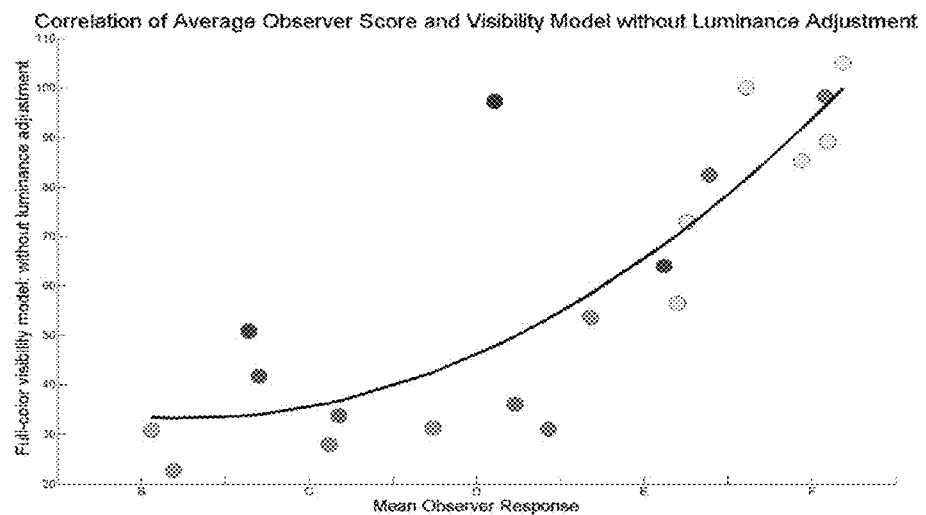
FIG. 30 corresponds to Appendix B's FIG. 4, which shows mean observer response compared with a proposed visibility model.
Figure 31:
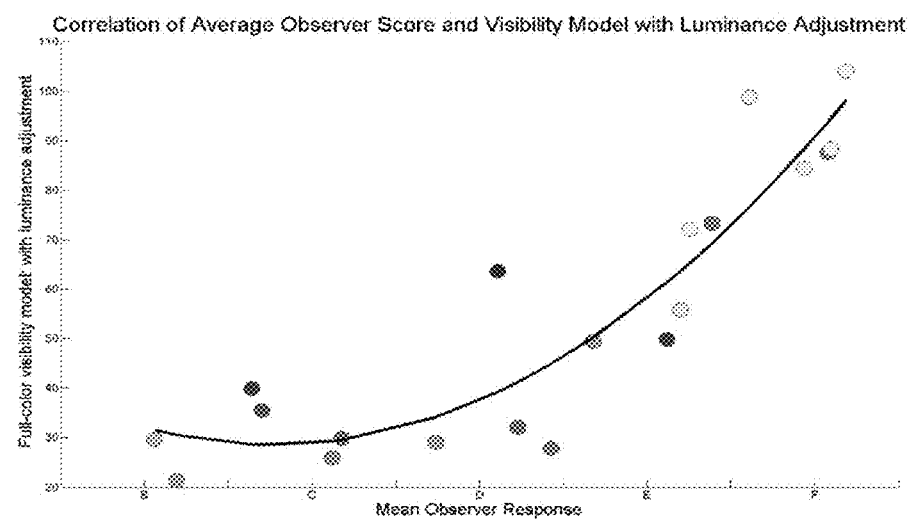
FIG. 31 corresponds to Appendix B's FIG. 5, which shows mean observer response compared with the proposed visibility model with luminance adjustment.

The motivation for the psychophysical experiment is to test how well the proposed full-color visibility model correlates to the perception of the degradation caused by the watermark signal. The model without and with the luminance adjustment are plotted in See [FIG. 30] and See [FIG. 31], respectively.

Figure 15:
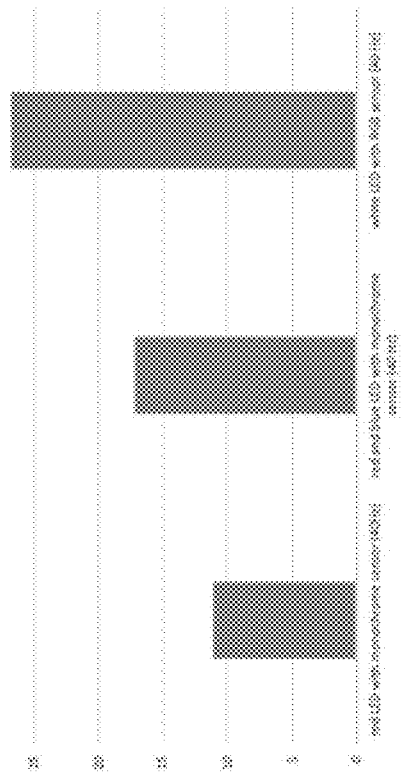
FIG. 15 is a diagram showing relative signal standard deviation for signal capture with a monochrome sensor with red illumination & red and blue illumination and white illumination (with an RGB sensor)

See [FIG. 15] Mean observer response compared with the proposed visibility model. The solid black line is the polynomial trendline.

See [FIG. 16] Mean observer response compared with the proposed visibility model with luminance adjustment.

The addition of the luminance adjustment primarily affected the darker color patches, darkgreen, foliage and darkblue1. CIEDE94 and CIEDE2000 color difference models were also considered, however there was not a clear advantage to using the more complex formulas.

Figure 32:
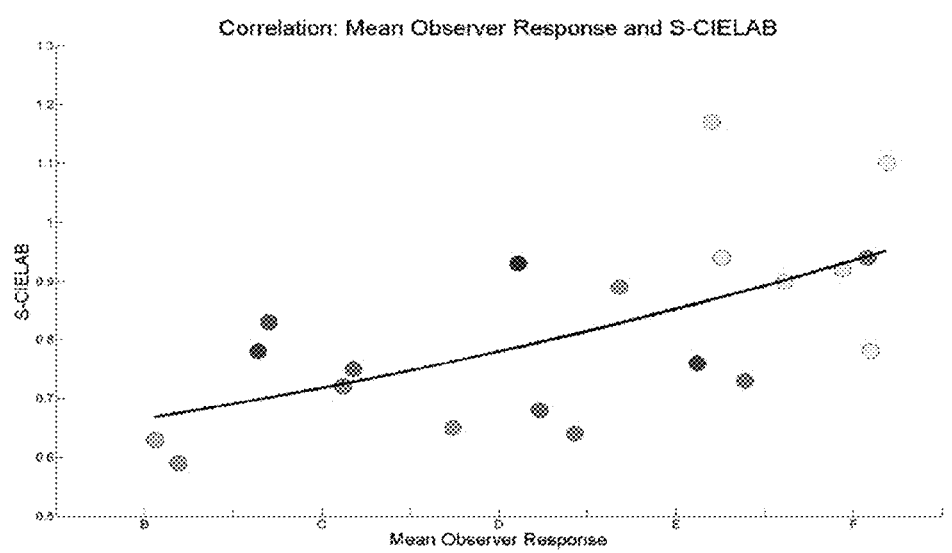
FIG. 32 corresponds to Appendix B's FIG. 6, which shows mean observer response compared with S-CIELAB.

See [FIG. 32] Mean observer response compared with S-CIELAB.

The S-CIELAB values are also plotted against the mean observer response See [FIG. 32].

Two different methods were used to compare the different metrics to the observer data, Pearson's correlation and the coefficient of determination ($R^2$). Both correlation techniques describe the relationship between the metric and observer scores. The coefficient indicates the relationship between two variables on a scale of +/−1, the closer the values are to 1 the stronger the correlation is between the objective metric and subjective observer results. The correlations are summarized in Table 1.

| | Visibility model using CIE $\Delta E_{76}$ | | |
|---|---|---|---|
| | No Adjust | With Adjust | S-CIELAB |
| Pearson | 0.81 | 0.86 | 0.61 |
| $R^2$ | 0.70 | 0.85 | 0.38 |

Table 1 Pearson and $R^2$ correlation between the observers' mean responses and the objective metrics. For both tests, the proposed full-color visibility model with the luminance adjustment shows the highest correlation.

As shown in Table 1, all three objective methods have a positive correlation to the subjective results with both correlation methods. The full-color visibility model with the luminance adjustment had the highest correlation with both the Pearson and $R^2$ correlation tests, while S-CIELAB had the lowest.

Pyramid Processing Method

In image fidelity measures, the CSF is commonly used as a linear filter to normalize spatial frequencies such that they have perceptually equal contrast thresholds. This can be described by the following shift invariant convolution:

$$\tilde{f}(x, y) = h(x, y) * f(x, y) = \sum_m \sum_n h(m, n) f(x - m, y - n),\quad (1a)$$

where f(x,y) is an input image, h(x,y) is the spatial domain CSF, and $\tilde{f}$(x,y) is the frequency normalized output image.

For our luminance dependent CSF model, we allow the CSF to vary spatially according to the local luminance of the image, i.e.:

$$\tilde{f}(x, y) = \sum_m \sum_n h(m, n; x, y) f(x - m, y - n).\quad (2a)$$

Since evaluating this shift variant convolution directly can be computationally expensive, we seek an approximation that is more efficient.

The use of image pyramids for fast image filtering is well-established. An image pyramid can be constructed as a set of low-pass filtered and down-sampled images $f_l(x,y)$, typically defined recursively as follows:

$$f_0(x, y) = f(x, y) \quad (3a)$$

and $$f_l(x, y) = \sum_m \sum_n h_0(m, n) f_{l-1}(2x - m, 2y - n) \quad (4a)$$

for l>0 and generating kernel $h_0$(m,n). It is easily shown from this definition that each level $f_l$(x,y) of an image pyramid can also be constructed iteratively by convolving the input image with a corresponding effective kernel $h_l$(m, n) and down-sampling directly to the resolution of the level, as follows:

$$f_l(x, y) = \sum_m \sum_n h_l(m, n) f_0(2^l x - m, 2^l y - n),\quad (5a)$$

where $h_l$(m,n) is an l-repeated convolution of $h_0$(m,n) with itself.

For image filtering, the various levels of an image pyramid are used to construct basis images of a linear decomposition representing the point-spread response of the desired filtering, i.e.:

$$\tilde{f}(x, y) = \sum_l a_l \tilde{f}_l(x, y),\quad (6a)$$

where $a_l$ is the coefficient of the basis function $\tilde{f}_l$(x,y) obtained by up-sampling the corresponding pyramid level $f_l$(x,y) back to the base resolution.

We use the effective convolution kernel $h_l$(x,y) as an interpolating kernel, i.e., $$\tilde{f}_l(x, y) = 4^l \sum_m \sum_n h_l(x - 2^l m, y - 2^l n) f_l(m, n),\quad (7a)$$

such that each basis function $\tilde{f}_l$(x,y) can be described by a simple shift-invariant convolution of the input image with a composite kernel $\tilde{h}_l$(x,y).

$$\tilde{f}_l(x,y) = \tilde{h}_l(x,y) * f(x,y),\quad (8a)$$

where $\tilde{h}_l$(x,y)=$h_l$(x,y). Thus, considering Eq. (6a), we assert that the optimal representation is obtained by minimizing the sum of the squared error between the desired CSF and the Gaussian representation; i.e., $$a = \underset{a}{\mathrm{argmin}} E,\quad (8a)$$

where $$E = \sum_x \sum_y \left( h(x, y) - \sum_l a_l \tilde{h}_l(x, y) \right)^2,\quad (9a)$$

and a=[$a_1$,$a_2$ . . . ]. This is a standard linear least-squares problem and can be solved using standard software packages, like Matlab® or GNU Octave. Further, the optimization can be pre-calculated for each local luminance of interest and stored in a look-up table, noting that for our application each coefficient $a_l$ is spatially varying according to the local luminance level $L_f$=$L_f$(x,y) of f(x,y), i.e., $a_l$=$a_l$($L_f$)=$a_l$($L_f$(x,y)).

While the development of our approach has been conducted for basis image at the resolution of the input image, the procedure can be conducted within a multi-resolution scheme, reducing the calculation of the spatially variant convolution in Eq. (3.2) into a pyramid reconstruction with spatially variant analysis coefficients.

Watermark Equal Visibility Embed

Figure 33:
FIG. 33 corresponds to Appendix B's FIG. 7, which shows watermark embedding with uniform signal strength (left) and equal visibility from a visibility model (right). The insets are magnified to show image detail.

FIG. 33 shows an example from a cover image mimicking a package design. The design has two embedding schemes:

on the left the watermark signal strength is uniform across the whole image, and on the right the watermark signal strength is adjusted based on the prediction from the visibility model. Since the human visual system is approximately a peak error detector, the image degradation caused by the watermark signal is determined by the most noticeable area. In this example, the hilly area in the background has the most noticeable degradation, as shown in the magnified insets. The visibility model is used to find this severe degradation. The signal strength in this area is reduced which improves the overall visibility of the embedded image, making it more acceptable. The total watermark signal on the right is 40% more than that on the left, but visually, the marked image on the right is preferable to the left one, because the degradation in the most noticeable area is reduced significantly.

Figure 34:
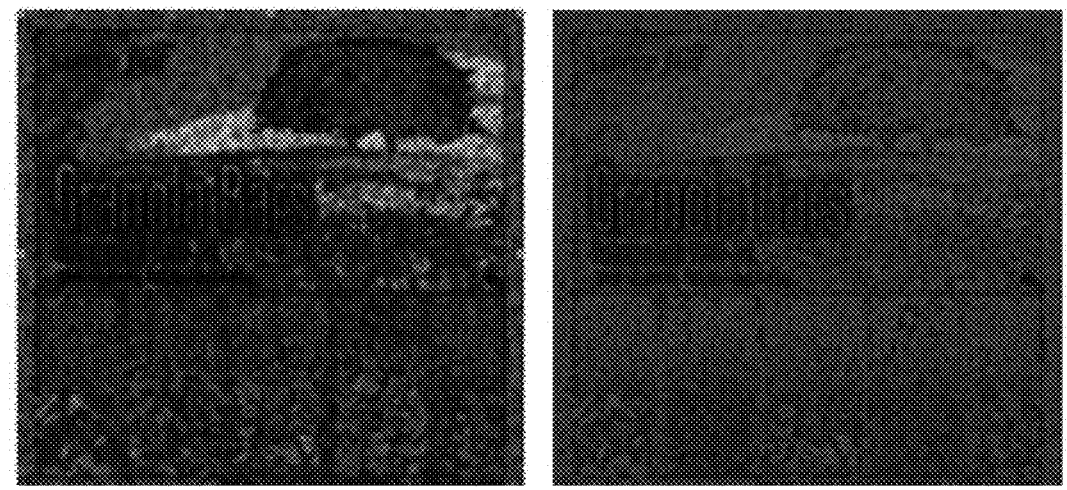
FIG. 34 corresponds to Appendix B's FIG. 8, which shows visibility map from uniform signal strength embedding (left) and equal visibility embedding (right) from FIG. 18.

FIG. 34 shows the calculated visibility for the uniform signal strength embedding (left) and the visibility model adjusted embedding (right). Notice that the visibility map is smoother on the right than on the left.

In terms of watermark detection, the embedding scheme with visibility model based adjustment can accommodate more watermark signal without creating a very noticeable degradation, thus making the detection more robust. To demonstrate the powerfulness of applying the visibility model, we performed a stress test with captures of 4 images from the two embedding schemes at various distances and perspectives. The other 3 images from the uniform visibility embedding are shown in See [FIG. 35]. Their visibility maps are not included but instead the standard deviation of each visibility map is listed in Table 2. The percentage of successful detection is shown in Table 3.

These two tables show that the equal visibility embedding showed a significant visibility improvement over the uniform strength embedding scheme, together with robustness that was about the same or better.

See [FIG. 33] Watermark embedding with uniform signal strength (left) and equal visibility from the visibility model (right). The insets are magnified to show image detail.

See [FIG. 34] Visibility map from uniform signal strength embedding (left) and equal visibility embedding (right).

Figure 35:
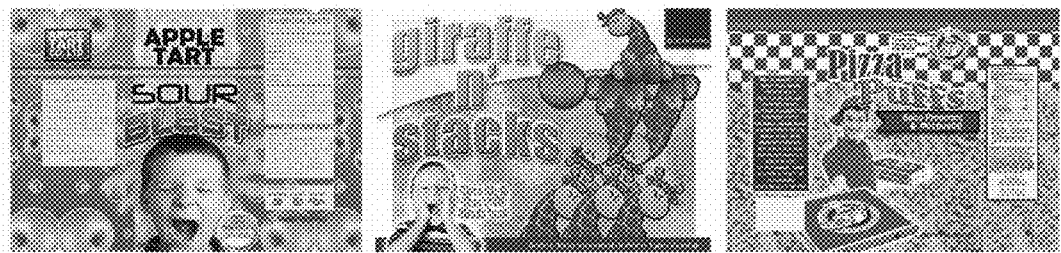
FIG. 35 corresponds with Appendix B's FIG. 9, which shows Apple tart, Giraffe stack and Pizza puff design used in tests.

See [FIG. 35] Apple tart, Giraffe stack and Pizza puff design used in tests.

TABLE 2

Standard deviation of the visibility maps on the 4 images from the two embedding schemes.

| Test image | Uniform strength embedding | Equal visibility embedding |
| --- | --- | --- |
| Granola | 18.32 | 9.71 |
| Apple Tart | 8.19 | 4.96 |
| Giraffe Stack | 16.89 | 11.91 |
| Pizza Puff | 11.81 | 8.27 |

TABLE 3

Detection rate on 4 images from the two embedding schemes, out of 1000 captures each image/embedding.

| Test image | Uniform strength embedding | Equal visibility embedding |
| --- | --- | --- |
| Granola | 18% | 47% |
| Apple Tart | 50% | 58% |
| Giraffe Stack | 47% | 49% |
| Pizza Puff | 63% | 61% |

CONCLUSIONS

A full color visibility model has been developed which has good correlation to subjective visibility tests for color patches degraded with a watermark. The best correlation was achieved with a model that applied a luminance correction to the CSF.

The model was applied during the watermark embed process, using a pyramid based method, to obtain equal visibility. Better robustness and visibility was obtained with equal visibility embed than uniform strength embed. Additional Reference: Andrew Watson, "DCTune," Society for information display digest of technical papers XXIV, pp. 946-949, 1993.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Appendix A and B are expressly included as part of this specification and are incorporated herein by reference in their entirety.

The modules, methods, processes, components, technology, apparatus and systems described above may be implemented in hardware, software or a combination of hardware and software. For example, the visibility model systems (e.g., FIGS. 25, 26 and 27), spot color and process color embedding and optimizations may be implemented in software, firmware, hardware, combinations of software, firmware and hardware, a programmable computer, electronic processing circuitry, digital signal processors (DSP), graphic processing units (GPUs), a programmable computer, electronic processing circuitry, and/or by executing software or instructions with a processor, parallel processors, multi-core processor and/or other multi-processor configurations.

The methods and processes described above (e.g., watermark embedders and detectors) also may be implemented in software programs (e.g., written in C, C++, C#, R, Assembly, Objective-C, Shell, Scheme, Scratch, MATLAB, Visual Basic, Java, Python, Tcl, Perl, Scheme, Ruby, executable binary files, etc.) stored in memory (e.g., a computer readable medium, such as an electronic, optical or magnetic storage device) and executed by one or more processors, multi-core processors, distributed systems (or electronic processing circuitry, hardware, digital circuit, etc.).

The particular combinations of elements and features in the above-detailed embodiments (including Appendices A & B) are exemplary only; the interchanging and substitution of these teachings with other teachings in this and the incorporated-by-reference patents and documents are also contemplated.

What is claimed is:

1. A digital watermark embedding method comprising:
obtaining data associated with a spot color $S_a$, the spot color $S_a$ comprising a component of a color design;
using one or more configured processors, determining a screen $S_s$ of the spot color $S_a$;
selecting a substitute spot color candidate $S_{b1}$ by: i) evaluating color distance or color error between the substitute spot color candidate $S_{b1}$ and the screen $S_s$, and ii) evaluating brightness of the substitute spot color candidate $S_{b1}$ and the screen $S_s$;
using one or more configured processors, determining a Cyan (C), Magenta (M) and Yellow (Y) process color tint that when combined with the substitute spot color candidate $S_{b1}$ approximates the spot color $S_a$;

transforming a determined CMY process color tint with a digital watermark signal to embed the digital watermark signal in the CMY process color tint, said transforming yielding a watermarked CMY process color tint; and combining the watermarked CMY process color tint and the substitute spot color candidate $S_{b1}$, said combining yielding a digital watermarked substitute spot color.

2. The method of claim 1 in which said selecting a substitute spot color candidate $S_{b1}$ evaluates the brightness of the spot color $S_a$.

3. The method of claim 1 in which said determining a CMY process color tint determines by minimizing color error or color distance between i) a combination of a CMY color tint and the substitute spot color candidate $S_{b1}$, and ii) the spot color $S_a$, in which the substitute spot color candidate $S_{b1}$ and the spot color $S_a$ remain constant during the minimizing.

4. The method of claim 1 in which said selecting selects a plurality of substitute spot color candidates $S_{bi}$, where i is a positive integer.

5. The method of claim 4 further comprising: using one or more configured processors, determining a plurality of CMY process color tints that when combined respectively with their substitute spot color candidate $S_{bi}$ each approximates the spot color $S_a$.

6. The method of claim 1 further comprising substituting the digital watermarked substitute spot color for the spot color $S_a$ within the color design, said substituting yielding a transformed color design.

7. The method of claim 6 further comprising printing the transformed color design on a physical substrate.

8. A product package including the physical substrate printed according to claim 7, in which the physical substrate includes the transformed color design printed thereon.

9. The method of claim 1 in which the CMY process color tint comprise a Black (K) process color component, and said determining a CMY process color tint comprises determining a CMYK process color tint.

10. The method of claim 1 in which said determining a screen $S_s$ of the spot color $S_a$ determines the screen $S_s$ with consideration of the screen $S_s$ being combined with a Cyan (C), Magenta (M) and Yellow (Y) process color tint.

11. An embedding system comprising:
an input to receive color data;
memory comprising data associated with a spot color $S_a$, the spot color $S_a$ comprising a component of a color design;
one or more processors configured for: generating a screen $S_s$ of the spot color $S_a$;
means for evaluating substitute spot color candidates to select a substitute spot color candidate $S_{b1}$ including: i) means for evaluating color distance or color error between the substitute spot color candidate $S_{b1}$ and the screen $S_s$, and ii) means for evaluating brightness of the substitute spot color candidate $S_{b1}$ and the screen $S_s$;
in which said one or more processors are configured for: determining a CMY process color tint that when combined with the substitute spot color candidate $S_{b1}$ approximates the spot color $S_a$;
means for embedding a digital watermark signal in the CMY process color tint, said means for embedding producing a digital watermarked CMY process color tint; and in which said one or more processors are configured for: merging the watermarked CMY process color tint and the substitute spot color candidate $S_{b1}$, the merging yielding a digital watermarked substitute spot color.

12. The system of claim 11 in which said means for evaluating substitute spot color candidates comprises means for evaluating the brightness of the spot color $S_a$.

13. The system of claim 11 in which the determining a CMY process color tint determines through minimizing color error or color distance between i) a combination of a CMY color tint and the substitute spot color candidate $S_{b1}$, and ii) the spot color $S_a$, in which the substitute spot color candidate $S_{b1}$ and the spot color $S_a$ remain constant during the minimizing.

14. The system of claim 11 in which said means for evaluating substitute spot color candidates selects a plurality of substitute spot color candidates $S_{bi}$, where i is a positive integer, and said one or more processors are configured for: determining a plurality of CMY process color tints that when combined respectively with their substitute spot color candidate $S_{bi}$ each approximates the spot color $S_a$.

15. The system of claim 11 in which said one or more processors are configured for substituting the digital watermarked substitute spot color for the spot color $S_a$ within the color design, said substituting yielding a transformed color design.

16. An image signal processing method comprising:
obtaining data associated with a first spot color $S_a$, the first spot color $S_a$ comprising a component of a color design;
determining a plurality of spot color candidates $S_{b1}$-$S_{bi}$, where i is an integer, by evaluating—for each spot color candidate—color distance metrics between data associated with the spot color candidate and the data associated with the first spot color $S_a$;
determining a Cyan (C), Magenta (M) and Yellow (Y) tint for each of the plurality of spot color candidates $S_{b1}$-$S_{bi}$;
using one or more electronic processors, simulating an overprint of each of the plurality of spot color candidates $S_{b1}$-$S_{bi}$ with its respective CMY tint, and for each of the overprinted spot color candidates, generating an Lab or Chroma distance metric relative to the first spot color $S_a$;
based on generated distance metrics, determining final spot color candidates;
for at least one of the final spot color candidates, and using one or more electronic processors, transforming its respective CMY tint with an encoded signal; and
using the at least one of the final spot color candidates plus its transformed CMY tint instead of the first spot color $S_a$ in the color design.

17. The method of claim 16 in which the data associated with the candidate spot color comprises Lab data.

18. The method of claim 16 in which the data associated with the candidate spot color comprises RGB or CMYK data.

19. The method of claim 16 in which said determining final spot color candidates comprises determining Lab distance values or Chroma distance values relative to the first spot color $S_a$ for each of the plurality of spot color candidates $S_{b1}$-$S_{bi}$.

20. The method of claim 16 in which said determining final spot color candidates comprises determining Lab distance values and Chroma distance values relative to the first spot color $S_a$ for each of the plurality of spot color candidates $S_{b1}$-$S_{bi}$.

21. A non-transitory computer readable medium comprising instructions stored therein, that, when executed, cause one or more processors to perform the following:
   access data associated with a first spot color $S_a$, the first spot color $S_a$ comprising a component of a color design;
   generate a plurality of spot color candidates $S_{b1}$-$Sb_{bi}$, where i is an integer, by evaluating—for each spot color candidate—color distance metrics between data associated with the spot color candidate and the data associated with the first spot color $S_a$;
   generate a Cyan (C), Magenta (M) and Yellow (Y) tint for each of the plurality of spot color candidates $S_{b1}$-$S_{bi}$;
   simulate an overprint of each of the plurality of spot color candidates $S_{b1}$-$S_{bi}$ with its respective CMY tint, and for each of the overprinted spot color candidates, generate an Lab or Chroma distance metric relative to the first spot color $S_a$;
   based on generated distance metrics, identify final spot color candidates;
   for at least one of the final spot color candidates, alter its respective CMY tint with an encoded signal; and
   use the at least one of the final spot color candidates plus its altered CMY tint instead of the first spot color $S_a$ in the color design.

22. The non-transitory computer readable medium of claim 21 in which the data associated with the candidate spot color comprises Lab data.

23. The non-transitory computer readable medium of claim 21 in which the data associated with the candidate spot color comprises RGB or CMYK data.

24. The non-transitory computer readable medium of claim 21 in which said identify final spot color candidates comprises determining Lab distance values or Chroma distance values relative to the first spot color $S_a$ for each of the plurality of spot color candidates $S_{b1}$-$S_{bi}$.

25. The non-transitory computer readable medium of claim 21 in which said identify final spot color candidates comprises determining Lab distance values and Chroma distance values relative to the first spot color $S_a$ for each of the plurality of spot color candidates $S_{b1}$-$S_{bi}$.

* * * * *